(12) United States Patent
Koo et al.

(10) Patent No.: US 10,856,001 B2
(45) Date of Patent: Dec. 1, 2020

(54) POLYGON UNIT-BASED IMAGE PROCESSING METHOD, AND DEVICE FOR SAME

(71) Applicant: LG Electronics Inc., Seoul (KR)

(72) Inventors: Moonmo Koo, Seoul (KR); Sehoon Yea, Seoul (KR); Eunyong Son, Seoul (KR); Jin Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 279 days.

(21) Appl. No.: 15/553,078

(22) PCT Filed: Feb. 15, 2016

(86) PCT No.: PCT/KR2016/001521
§ 371 (c)(1),
(2) Date: Aug. 23, 2017

(87) PCT Pub. No.: WO2016/137149
PCT Pub. Date: Sep. 1, 2016

(65) Prior Publication Data
US 2018/0041768 A1 Feb. 8, 2018

Related U.S. Application Data

(60) Provisional application No. 62/119,814, filed on Feb. 24, 2015.

(51) Int. Cl.
*H04N 19/513* (2014.01)
*H04N 19/96* (2014.01)
(Continued)

(52) U.S. Cl.
CPC ......... *H04N 19/513* (2014.11); *H04N 19/119* (2014.11); *H04N 19/132* (2014.11);
(Continued)

(58) Field of Classification Search
CPC .... H04N 19/513; H04N 19/537; H04N 19/70; H04N 19/52; H04N 19/132;
(Continued)

(56) References Cited

U.S. PATENT DOCUMENTS

2003/0048955 A1* 3/2003 Pardas .................... G06T 9/001
382/243
2005/0249426 A1* 11/2005 Badawy .................. G06T 9/001
382/241
(Continued)

FOREIGN PATENT DOCUMENTS

KR     20090047506 A    5/2009
KR     20130063285 A    6/2013
(Continued)

OTHER PUBLICATIONS

Yao Wang et al., Evaluation of Mesh-Based Motion Estimation in H.263-Like Coders, Jun. 30, 1998, IEEE Xplore Digital Library, IEEE-SA, IEEE Spectrum, IEEE Transactions on Circuits and Systems for Video Technology, vol. 8, Issue 3, Dept. of Electrical Engineering, Polytech. University, Brooklyn, NY, USA.

*Primary Examiner* — Nasim N Nirjhar
(74) *Attorney, Agent, or Firm* — Dentons US LLP

(57) ABSTRACT

A polygon unit-based image processing method, and a device for the same are disclosed. Specifically, a method for decoding an image on the basis of a polygon unit can comprise the steps of: deriving a motion vector predictor for a polygon apex forming the polygon unit; deriving a motion vector for the polygon apex on the basis of a motion vector difference for the polygon apex and the motion vector predictor; and deriving a prediction sample for the polygon unit from a division unit, which is specified by the motion vector, in a reference picture.

10 Claims, 32 Drawing Sheets

(51) Int. Cl.

| | | |
|---|---|---|
| *H04N 19/17* | (2014.01) | |
| *H04N 19/14* | (2014.01) | |
| *H04N 19/119* | (2014.01) | |
| *H04N 19/70* | (2014.01) | |
| *H04N 19/52* | (2014.01) | |
| *H04N 19/537* | (2014.01) | |
| *H04N 19/132* | (2014.01) | |
| *H04N 19/176* | (2014.01) | |
| *H04N 19/103* | (2014.01) | |
| *H04N 19/117* | (2014.01) | |
| *H04N 19/124* | (2014.01) | |

(52) U.S. Cl.
CPC ............ *H04N 19/14* (2014.11); *H04N 19/17* (2014.11); *H04N 19/176* (2014.11); *H04N 19/52* (2014.11); *H04N 19/537* (2014.11); *H04N 19/70* (2014.11); *H04N 19/96* (2014.11); *H04N 19/103* (2014.11); *H04N 19/117* (2014.11); *H04N 19/124* (2014.11)

(58) Field of Classification Search
CPC .... H04N 19/176; H04N 19/119; H04N 19/17; H04N 19/14; H04N 19/96; H04N 19/124; H04N 19/117; H04N 19/103
See application file for complete search history.

(56) References Cited

U.S. PATENT DOCUMENTS

| | | | |
|---|---|---|---|
| 2008/0031325 A1* | 2/2008 | Qi | ........................ H04N 19/176 |
| | | | 375/240.09 |
| 2011/0142132 A1* | 6/2011 | Tourapis | .............. H04N 19/597 |
| | | | 375/240.16 |
| 2012/0075302 A1* | 3/2012 | Cai | ........................ G06T 9/001 |
| | | | 345/420 |

FOREIGN PATENT DOCUMENTS

| | | |
|---|---|---|
| KR | 20130067280 A | 6/2013 |
| KR | 20140065013 A | 5/2014 |

\* cited by examiner

<Complex polygon>
(a)

<Simple polygon>
(b)

(c)

POLYGON UNIT-BASED IMAGE PROCESSING METHOD, AND DEVICE FOR SAME

CROSS-REFERENCE TO RELATED APPLICATIONS

This application is the National Stage filing under 35 U.S.C. 371 of International Application No. PCT/KR2016/001521, filed on Feb. 15, 2016, which claims the benefit of U.S. Provisional Application No. 62/119,814, filed on Feb. 24, 2015, the contents of which are all hereby incorporated by reference herein in their entirety.

TECHNICAL FIELD

The present invention relates to a method of encoding/decoding a still image or a moving image and, more particularly, to a method of encoding/decoding a still image or a moving image based on a polygon unit and an apparatus supporting the same.

BACKGROUND ART

A compression encoding means a series of signal processing techniques for transmitting digitized information through a communication line or techniques for storing the information in a form that is proper for a storage medium. The media including a picture, an image, an audio, and the like may be the target for the compression encoding, and particularly, the technique of performing the compression encoding targeted to the picture is referred to as a video image compression.

The next generation video contents are supposed to have the characteristics of high spatial resolution, high frame rate and high dimensionality of scene representation. In order to process such contents, drastic increase of memory storage, memory access rate and processing power will be resulted.

Accordingly, it is required to design the coding tool for processing the next generation video contents efficiently.

DISCLOSURE

Technical Problem

In the conventional compression technique of a still image or a video, the block-based image compression method is used. In the block-based image compression method, the images are compressed by being divided in a fixed form of a squire. Accordingly, the method may not properly reflect the characteristics of images. Specifically, the method is not proper for coding of complex textures.

In order to solve the problem above, an object of the present invention is to propose a method for encoding/decoding a still image or a video based on a polygon unit that has a triangle shape or an arbitrary shape.

Furthermore, an object of the present invention is to propose a method of predicting the motion vector of a vertex forming a polygon unit.

Furthermore, an object of the present invention is to propose a method of predicting a sample of a polygon unit.

The objects of the present invention are not limited to the technical objects described above, and other technical that are objects not mentioned herein may be understood to those skilled in the art from the description below.

Technical Solution

In an aspect of the present invention, a method of decoding an image based on a polygon unit may include the steps of deriving a motion vector predictor for a polygon vertex forming the polygon unit, deriving a motion vector of the polygon vertex based on a motion vector difference for the polygon vertex and the motion vector predictor, and deriving a prediction sample of the polygon unit from a partition unit specified by the motion vector within a reference picture.

In another aspect of the present invention, an apparatus for decoding an image based on a polygon unit may include a motion vector predictor derivation unit deriving a motion vector predictor for a polygon vertex forming the polygon unit, a motion vector derivation unit deriving a motion vector of the polygon vertex based on a motion vector difference for the polygon vertex and the motion vector predictor, and a prediction sample derivation unit deriving a prediction sample of the polygon unit from a partition unit specified by the motion vector within a reference picture.

Preferably, the prediction sample may be determined to be a corresponding sample value within the partition unit using affine transform.

Preferably, a candidate list of the motion vector predictor may include a motion vector of a block neighboring the polygon vertex and/or a motion vector of a polygon vertex neighboring the polygon vertex, and the motion vector predictor may be derived from the candidate list of the motion vector predictor.

Preferably, the candidate list of the motion vector predictor may be configured based on a decoding order of a polygon vertex forming the polygon unit.

Preferably, after a motion vector for four vertexes corresponding to the corners of a processing block including the polygon unit is derived, a motion vector for remaining polygon vertexes of the processing block may be derived.

Preferably, a motion vector of a polygon vertex of a processing block including the polygon unit may be derived based on a raster-scan order.

Preferably, a representative motion vector of a processing block including the polygon unit may be derived, and the motion vector predictor may be derived from the representative motion vector.

Preferably, the motion vector predictor may be determined by interpolating a motion vector of a plurality of polygon vertexes close to the polygon vertex or determined to be a motion vector of a polygon vertex closest to the polygon vertex.

Preferably, a motion vector predictor for a polygon vertex located within a processing block including the polygon unit may be determined by interpolating a motion vector of four vertexes corresponding to corners of the processing block or determined to be a motion vector of a polygon vertex closest to the polygon vertex.

Preferably, the motion vector predictor may be derived from a motion vector of a vertex having the same location as the polygon vertex in a block neighboring a processing block including the polygon unit.

Advantageous Effects

In accordance with an embodiment of the present invention, a complicated image can be processed more efficiently by encoding/decoding a still image or a moving image based on a polygon unit having a triangle or a specific shape.

Furthermore, in accordance with an embodiment of the present invention, a complicated image can be processed more efficiently by predicting a motion vector for each of vertexes forming a polygon unit and also predicting a sample value for each sample of a polygon unit.

The technical effects of the present invention are not limited to the technical effects described above, and other technical effects not mentioned herein may be understood to those skilled in the art from the description below.

DESCRIPTION OF DRAWINGS

The accompanying drawings, which are included herein as a part of the description for help understanding the present invention, provide embodiments of the present invention, and describe the technical features of the present invention with the description below.

MODE FOR INVENTION

Hereinafter, a preferred embodiment of the present invention will be described by reference to the accompanying drawings. The description that will be described below with the accompanying drawings is to describe exemplary embodiments of the present invention, and is not intended to describe the only embodiment in which the present invention may be implemented. The description below includes particular details in order to provide perfect understanding of the present invention. However, it is understood that the present invention may be embodied without the particular details to those skilled in the art.

In some cases, in order to prevent the technical concept of the present invention from being unclear, structures or devices which are publicly known may be omitted, or may be depicted as a block diagram centering on the core functions of the structures or the devices.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

Specific terminologies used in the description below may be provided to help the understanding of the present invention. Furthermore, the specific terminology may be modified into other forms within the scope of the technical concept of the present invention. For example, a signal, data, a sample, a picture, a frame, a block, etc may be properly replaced and interpreted in each coding process.

Figure 1:
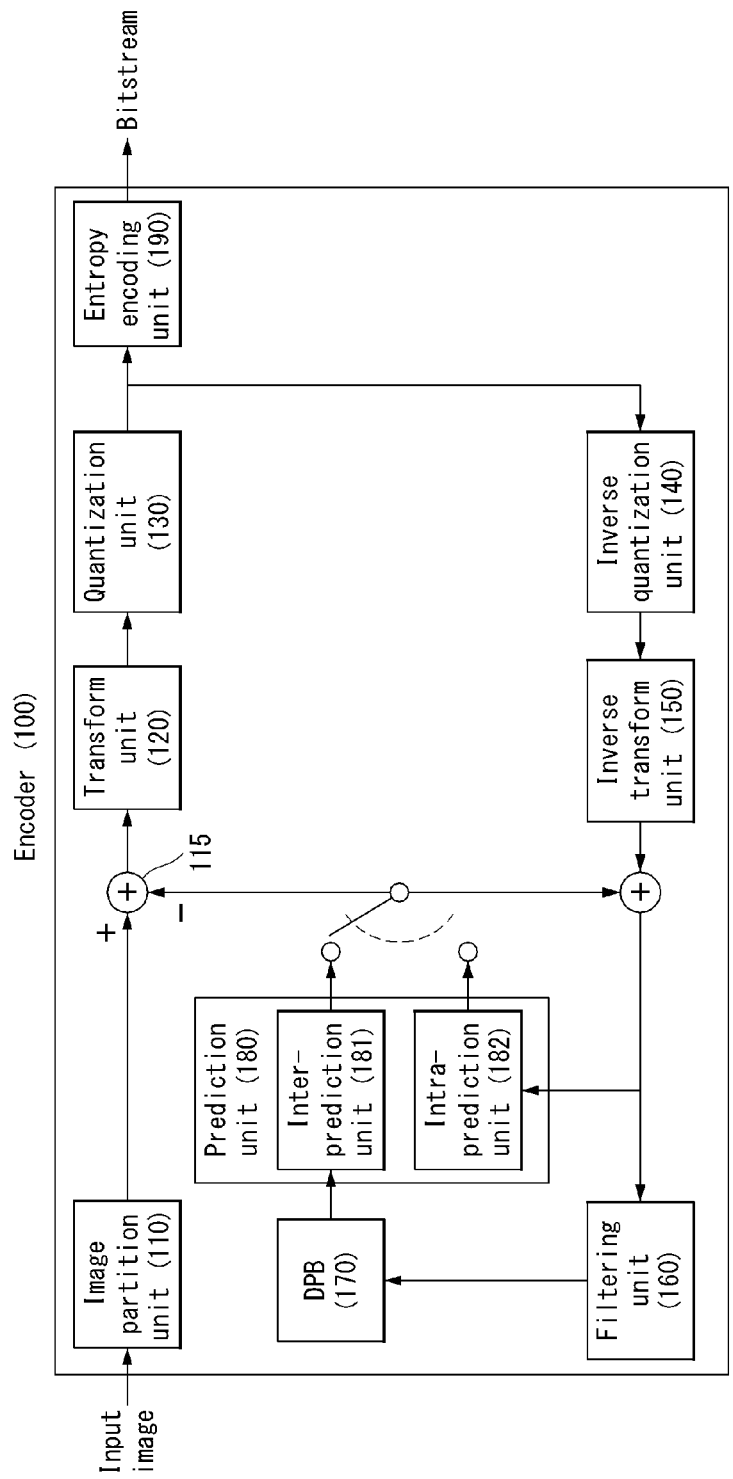
FIG. 1 is illustrates a schematic block diagram of an encoder in which the encoding of a video signal is performed, as an embodiment to which the present invention is applied.

FIG. 1 is illustrates a schematic block diagram of an encoder in which the encoding of a video signal is performed, as an embodiment to which the present invention is applied.

Referring to FIG. 1, an encoder 100 may include a picture partitioning unit 110, a subtract unit 115, a transform unit 120, a quantization unit 130, a dequantization unit 140, an inverse transform unit 150, a filtering unit 160, a decoded picture buffer (DPB) 170, a prediction unit 180 and an entropy encoding unit 190. And the prediction unit 180 may include an inter-prediction unit 181 and an intra-prediction unit 182.

The picture partitioning unit 110 partitions an input video signal (or, picture frame) inputted to the encoder 100 into one or more process unit blocks (hereinafter, referred to 'processing block' or 'block'). Here, the process unit block may be a coding tree unit (CTU), a coding unit (CU), a prediction unit (PU) or a transform unit (TU).

Specifically, in the present invention, the picture partitioning module 110 may divide a single processing block into one or more polygon units. The polygon unit according to the present invention is a basic unit of encoding and decoding for an input picture, and means a unit of polygon shape which is divided from a block based on three or more pixels.

The picture partitioning unit 110 may implement the partitioning process and/or method of the polygon unit that is proposed in the embodiment described below. More detailed description of the partitioning method of the polygon unit will be described below.

The subtract unit 115 generates a residual signal by subtracting the prediction signal that is outputted from the prediction unit 180 (i.e., the inter-prediction unit 181 or the intra-prediction unit 182) from the input video signal. The generated residual signal is transmitted to the transform unit 120.

The transform unit 120 generates a transform coefficient by applying a transform technique to the residual signal.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal that is outputted from the quantization unit 130 may be used for generating a prediction signal. For example, by applying dequantization and inverse transformation to the quantized signal through the dequantization unit 140 and the inverse transform unit 150, the residual signal may be reconstructed. By adding the reconstructed residual signal to the prediction signal that is outputted from the inter-prediction unit 181 or the intra-prediction unit 182, a reconstructed signal may be generated.

On the other hand, during such a compression process, adjacent blocks are quantized by different quantization parameters from each other, and accordingly, an artifact in which block boundaries are shown may occur. Such a phenomenon is referred to blocking artifact, which is one of the important factors for evaluating image quality. In order to decrease such an artifact, a filtering process may be performed. Through such a filtering process, the blocking artifact is removed and the error for the current picture is decreased at the same time, thereby the image quality being improved.

The filtering unit 160 applies filtering to the reconstructed signal, and outputs it through a play-back device or transmits it to the decoded picture buffer 170. The filtered signal transmitted to the decoded picture buffer 170 may be used as a reference picture in the inter-prediction unit 181. As such, by using the filtered picture as a reference picture in an inter-picture prediction mode, the encoding rate as well as the image quality may be improved.

The decoded picture buffer 170 may store the filtered picture in order to use it as a reference picture in the inter-prediction unit 181.

The prediction unit 180 includes an inter-prediction unit which performs inter-prediction and an intra-prediction unit which performs intra-prediction, as described later.

The prediction unit 180 generates a prediction block by performing prediction on the processing unit of a picture in the image partition unit 110. The processing unit of a picture in the prediction unit 180 may be a CU, may be a TU or may be a PU.

Furthermore, the prediction unit 110 may determine whether prediction performed on a corresponding processing unit is inter-prediction or intra-prediction and may determine the detailed contents of (for example, a prediction mode) of each prediction method. In this case, a processing unit by which the detailed contents of a processing unit by which prediction is performed, a prediction method and a prediction method are determined may be different. For example, the prediction method and the prediction mode may be determined in a PU unit, and prediction may be performed in a TU unit.

The inter-prediction unit 181 performs temporal prediction and/or spatial prediction in order to remove temporal redundancy and/or spatial redundancy with reference to a reconstructed picture.

As an inter-prediction method, a skip mode, a merge mode, motion vector prediction (MVP), etc. may be used. The inter-prediction unit 181 may select a reference picture with reference to a current PU and select a reference block corresponding to the PU. The reference block may be selected in an integer pixel unit. Next, the inter-prediction unit 181 generates a prediction block whose residual signal with a current PU is minimized and whose motion vector size is also a minimum.

A prediction block may be generated in an integer sample unit or may be generated in a pixel unit of an integer or less as in a ½ pixel unit or a ¼ pixel unit. In this case, a motion vector may also be represented in a unit of an integer pixel or less.

A method of generating a prediction block may be different depending on a prediction mode of a current block. A prediction mode applied for inter-prediction may include an advanced motion vector predictor (AMVP), merge, etc. The encoder may provide the decoder with a skip flag indicating whether the skip mode is applied or not, a merge flag indicating whether the merge mode is applied or not, etc. so that the decoder can also identify an inter-prediction mode.

For example, if the advanced motion vector predictor (AMVP) is applied, the inter-prediction unit 181 may generate a motion vector candidate list using the motion vector of a reconstructed neighbor block and/or the motion vector of a co-located block. That is, the motion vector of the reconstructed neighbor block and/or the motion vector of the co-located block may be used as motion vector candidates.

Furthermore, the inter-prediction unit 181 may derive (i.e., motion vector prediction) the motion vector predictor (MVP) of a current block from motion vector candidates included in a motion vector candidate list. The encoder may select a motion vector predictor index indicative of an optimum motion vector from the motion vector candidates included in the motion vector candidate list and provide the decoder with the selected motion vector predictor index so that the decoder can also derive the motion vector predictor of the current block.

Furthermore, the inter-prediction unit 181 may derive the motion vector of a current block through the sum of a motion vector difference (MVD) and a motion vector predictor. The encoder may calculate a motion vector difference between the motion vector of a current block and a motion vector predictor, may encode the motion vector difference, and may provide the encoded motion vector difference to the decoder so that the decoder can also derive the motion vector of the current block.

Furthermore, the inter-prediction unit 181 may generate the prediction block of a current block based on a derived motion vector and the reference picture of the current block. The encoder may provide the decoder with a reference picture index indicative of a reference picture, etc. so that the decoder can also generate the prediction block.

For another example, if merge is applied, the inter-prediction unit 181 may generate a merge candidate list using motion information of a reconstructed neighbor block and/or motion information of a co-located block. That is, if motion information of a reconstructed neighbor block and/or a co-located block is present, the motion information may be used as the merge candidate of a current block.

Furthermore, the inter-prediction unit 181 may derive a motion vector and reference picture for a current block based on a merge candidate that belong to merge candidates included in a merge candidate list and that may provide optimum efficiency. The encoder may provide a merge index indicative of the selected merge candidate to the decoder so that the decoder can also derive the motion vector and reference picture for the current block.

Furthermore, the inter-prediction unit 181 may generate the prediction block of a current block based on a derived motion vector and reference picture.

For yet another example, if the skip mode is applied, information of a neighbor block may be used in a current block without any change. Accordingly, in the case of the skip mode, the encoder may provide the decoder with only information indicating that motion information of which block will be used as motion information of a current block.

The inter-prediction unit 181 may generate the prediction block of a current block by performing motion compensation on the current block based on derived motion information. That is, the inter-prediction unit 181 may obtain the reference region (or reference block) of the current block using the motion information. Furthermore, the inter-prediction unit 181 may use the pixel value or interpolated value of a reference region specified by the motion information as the predictor of a current processing block.

In this case, the prediction block may mean a motion-compensated block formed of a predictor generated as a result of the execution of motion compensation for the current block. Furthermore, a plurality of motion-compensated blocks may form a single motion-compensated image.

In this case, a reference picture used to perform prediction may include a blocking artifact or a ringing artifact because it is a signal that has experienced quantization and dequantization in a block unit upon performing the coding/decoding on a previous time.

Accordingly, in order to solve the discontinuity of such a signal or a reduction in performance attributable to quantization, the inter-prediction unit 181 may interpolate a signal between pixels in a subpixel unit by applying a lowpass filter. In this case, the subpixel means a virtual pixel generated by applying an interpolation filter, and an integer pixel means an actual pixel present in a reconstructed picture. Linear interpolation, bi-linear interpolation, a Wiener filter, etc. may be applied as the interpolation method.

The interpolation filter may be applied to a reconstructed picture, thus being capable of improving the accuracy of prediction. For example, the inter-prediction unit 181 may generate an interpolation pixel by applying the interpolation filter to an integer pixel, and may perform prediction using an interpolated block formed of interpolated pixels as a prediction block.

The intra-prediction unit 182 predicts a current block with reference to samples in the periphery of a block on which coding is to be now performed.

In intra-prediction, a prediction mode may have 33 directional prediction modes and at least two non-directional modes. The non-directional prediction mode may include an intra DC mode and an intra planar mode.

The intra-prediction unit 182 predicts the current block by referring to the samples adjacent the block that is to be encoded currently. The intra-prediction unit 182 may perform the following procedure in order to perform the intra-prediction. First, the intra-prediction unit 182 may prepare a reference sample that is required for generating a prediction signal. Furthermore, the intra-prediction unit 182 may generate a prediction signal by using the reference sample prepared. Later, the intra-prediction unit 182 may encode the prediction mode. In this case, the reference sample may be prepared through reference sample padding and/or reference sample filtering. Since the reference sample goes through the prediction and the reconstruction process, there may be a quantization error. Accordingly, in order to decrease such an error, the reference sample filtering process may be performed for each prediction mode that is used for the intra-prediction.

The prediction signal that is generated through the inter-prediction unit 181 or the intra-prediction unit 182 may be used for generating the reconstructed signal or the residual signal.

Figure 2:
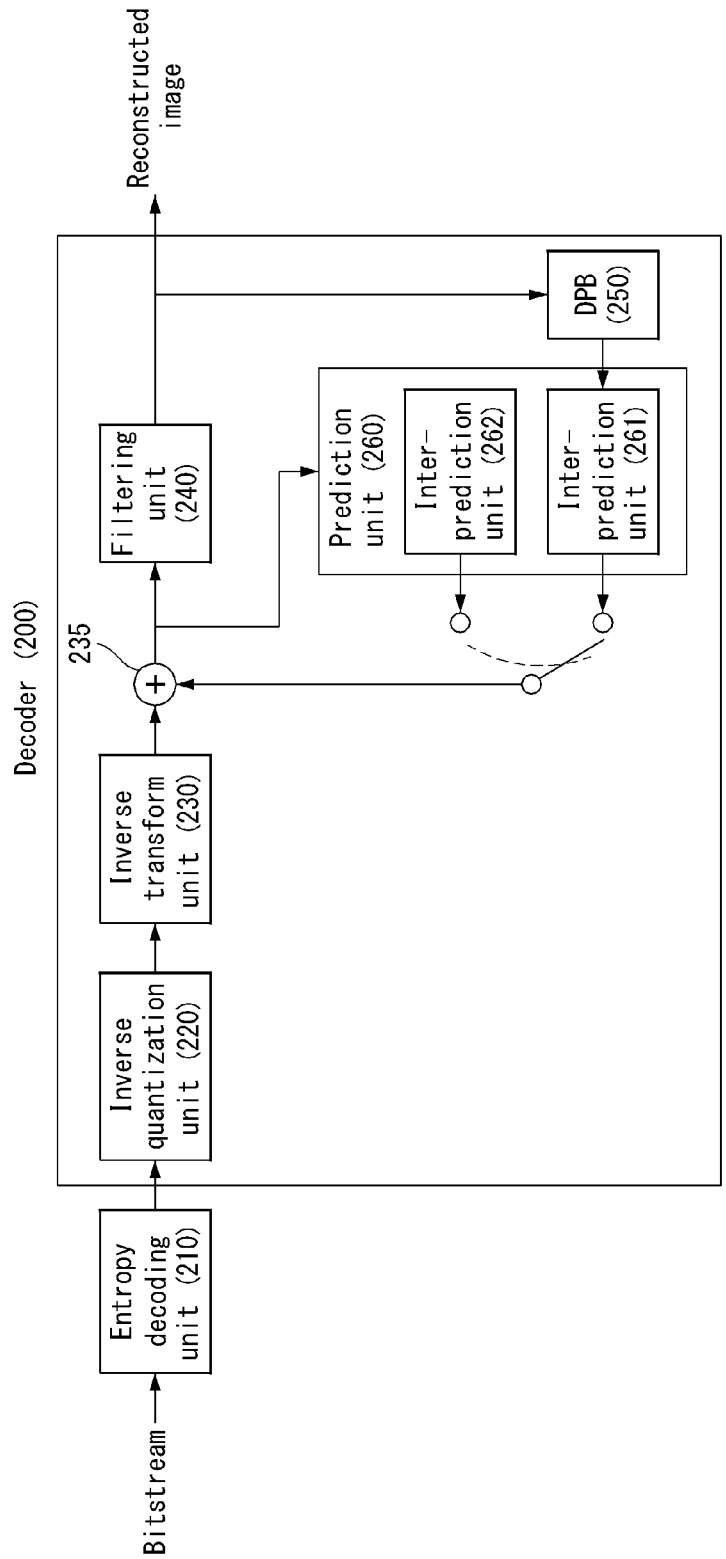
FIG. 2 illustrates a schematic block diagram of a decoder in which decoding of a video signal is performed, as an embodiment to which the present invention is applied.

FIG. 2 illustrates a schematic block diagram of a decoder in which decoding of a video signal is performed, as an embodiment to which the present invention is applied.

Referring to FIG. 2, the decoder 200 may include an entropy decoding unit 210, a dequantization unit 220, an inverse transform unit 230, an add unit 235, a filtering unit 240, a decoded picture buffer (DPB) 250 and a prediction unit 260. And the prediction unit 260 may include an inter-prediction unit 261 and an intra-prediction unit 262.

Furthermore, the reconstructed video signal outputted through the decoder 200 may be played through a play-back device.

The decoder 200 receives the signal (i.e., bit stream) outputted from the encoder 100 shown in FIG. 1, and the entropy decoding unit 210 performs an entropy decoding operation of the received signal.

The dequantization unit 220 acquires a transform coefficient from the entropy-decoded signal using quantization step size information.

The inverse transform unit 230 acquires a residual signal by inverse-transforming the transform coefficient.

The add unit 235 generates a reconstructed signal by adding the acquired residual signal to the prediction signal that is outputted from the prediction unit 260 (i.e., the inter-prediction unit 261 or the intra-prediction unit 262).

Specifically, in the present invention, the inter-prediction unit 261 or the intra-prediction unit 262 may implement the process and/or method for a division structure (i.e., a vertex position) of the polygon unit or predicting a motion vector of the polygon unit that are proposed in the embodiments of the present invention.

The filtering unit 240 applies filtering to the reconstructed signal, and outputs it through a play-back device or transmits it to the decoded picture buffer 250. The filtered signal transmitted to the decoded picture buffer 250 may be used as a reference picture in the inter-prediction unit 261.

In this specification, the embodiments described in the filtering unit 160, the inter-prediction unit 181 and the intra-prediction unit 182 of the encoder 100 may also be applied to the filtering unit 240, the inter-prediction unit 261 and the intra-prediction unit 262 of the decoder, respectively, in the same way.

Generally, the block-based image compression method is used in the compression technique (e.g., HEVC) of a still image or a video. The block-based image compression method is a method of processing an image by partitioning it into a specific block unit, and may decrease the use of memory and the amount of operation.

Figure 3:
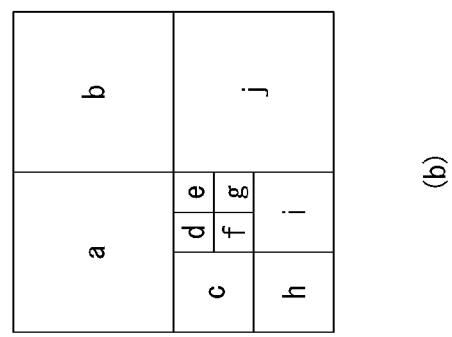
FIG. 3 is a diagram for describing a partition structure of a coding unit that may be applied to the present invention.
Figure 3:
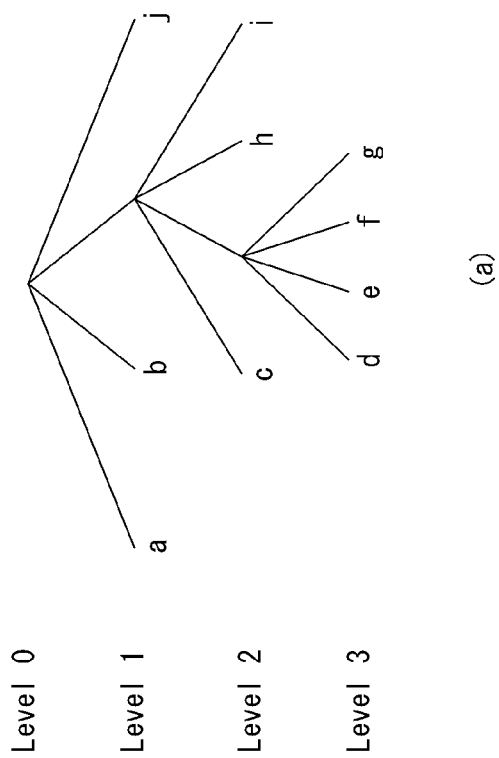

FIG. 3 is a diagram for describing a partition structure of a coding unit that may be applied to the present invention.

An encoder partitions a single image (or picture) in a coding tree unit (CTU) of a rectangle shape, and encodes the CTU sequentially one by one according to a raster scan order.

In the HEVC, a size of CTU may be determined by one of 64×64, 32×32 and 16×16. The encoder may select and use the size of CTU according to the resolution of input image or the characteristics of input image. The CTU includes a coding tree block (CTB) for a luma component and the CTB for two chroma components that correspond to it.

A single CTU may be partitioned into a Quad-tree structure. A single CTU may have a square shape and may be partitioned into four units of which a length of each side decreases by half. Such a partitioning of the Quad-tree structure may be performed recursively.

Referring to FIG. 3, the root node of the Quad-tree is related to the CTU. The Quad-tree is partitioned until it reaches to a leaf node, and the leaf node is referred to as a coding unit (CU).

The CU means a basic unit of processing process of an input image, for example, the coding in which the intra/inter prediction is performed. The CU includes a coding block (CB) for a luma component and the CB for two chroma components that correspond to it. In the HEVC, a size of CU may be determined by one of 64×64, 32×32, 16×16 and 8×8.

Referring to FIG. 3, the CTU corresponds to a root node, and has a smallest depth value (i.e., level 0). According to the characteristics of an input image, the CTU may not be partitioned. In this case, the CTU corresponds to a CU.

The CTU may be partitioned in a Quad-tree shape, and as a result, the lower nodes that have a depth of level 1 are generated. Furthermore, the node (i.e., leaf node) that is not partitioned anymore from the lower node that has a depth of level 1 corresponds to a CU. For example, in FIG. 3(b), each of CU(a), CU(b) and CU(j) that corresponds to node a, node b and node j, respectively, is partitioned once in the CTU, and has a depth of level 1.

Any one of the node that has a depth of level 1 may be further partitioned into a Quad-tree shape again. Furthermore, the node (i.e., leaf node) that is not partitioned anymore from the lower node that has a depth of level 2 corresponds to a CU. For example, in FIG. 3(b), each of CU(c), CU(h) and CU(i) that corresponds to node c, node h and node i, respectively, is partitioned twice in the CTU, and has a depth of level 2.

In addition, any one of the node that has a depth of level 2 may be further partitioned into a Quad-tree shape again. Furthermore, the node (i.e., leaf node) that is not partitioned anymore from the lower node that has a depth of level 3 corresponds to a CU. For example, in FIG. 3(b), each of CU(d), CU(e), CU(f) and CU(g) that corresponds to node d, node e, node f and node g, respectively, is partitioned three times in the CTU, and has a depth of level 3.

In an encoder, the maximum size or the minimum size of a CU may be determined according to the characteristics of a video image (e.g., resolution) or by considering encoding rate. Furthermore, the information for this or the information that may derive this may be included in a bit stream. The CU that has the maximum size is referred to as a largest coding unit (LCU), and the CU that has the minimum size is referred to as a smallest coding unit (SCU).

In addition, the CU that has a tree structure may be hierarchically partitioned with predetermined maximum depth information (or maximum level information). Furthermore, each partitioned CU may have the depth information. Since the depth information represents a partitioned count and/or degree of a CU, the depth information may include the information of a size of CU.

Since the LCU is partitioned in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a partition CU flag (split_cu_flag)) that represents whether the corresponding CU is partitioned may be forwarded to the decoder. This partition information is included in all CUs except the SCU. For example, when the value of the flag that represents whether to partition is '1', the corresponding CU is further partitioned into four CUs, and when the value of the flag that represents whether to partition is '0', the corresponding CU is not partitioned any more, and the processing process for the corresponding CU may be performed.

Although the partition process of a CU is described as an example in the embodiment of FIG. 3, the Quad-tree structure described above may also be applied to the partition process of a transform unit (TU) that is a basic unit of performing a transformation.

The TU is partitioned hierarchically in a Quad-tree structure from the CU that is to be coded. That is, the CU corresponds to a root node of the tree for a transform unit (TU).

Since the TU is partitioned in a Quad-tree structure, the TU that is partitioned from a CU may be further partitioned into a smaller lower TU. In the HEVC, a size of CU may be determined by one of 32×32, 16×16, 8×8 and 4×4.

For a single TU, the information (e.g., a partitioned TU flag (split_transform_flag)) that represents whether the corresponding TU is partitioned may be forwarded to the decoder. This partition information is included in all TUs except the TU of minimum size. For example, when the value of the flag that represents whether to partition is '1', the corresponding TU is further partitioned into four TUs, and when the value of the flag that represents whether to partition is '0', the corresponding TU is not partitioned any more.

As described above, the CU is a basic unit of the coding in which the intra-prediction or the inter-prediction is performed. The HEVC partitions the CU in a prediction unit (PU) for coding an input image more effectively.

The PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

The PU is not partitioned in the Quad-tree structure, but is partitioned once in a single CU in a predetermined shape. This will be described by reference to the drawing below.

Figure 4:
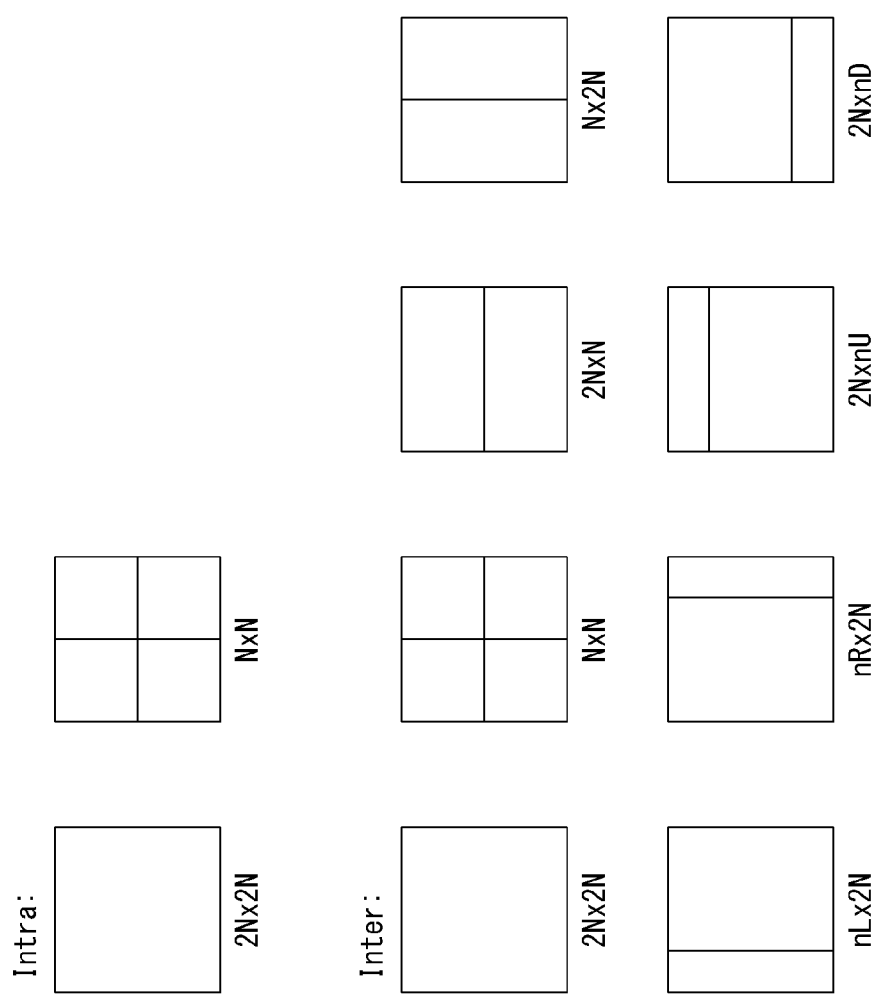
FIG. 4 is a diagram for describing a prediction unit that may be applied to the present invention.

FIG. 4 is a diagram for describing a prediction unit that may be applied to the present invention.

A PU is differently partitioned depending on whether the intra-prediction mode is used or the inter-prediction mode is used as the coding mode of the CU to which the PU belongs.

FIG. 4(a) illustrates a PU of the case that the intra-prediction mode is used, and FIG. 4(b) illustrates a PU of the case that the inter-prediction mode is used.

Referring to FIG. 4(a), assuming the case that the size of a single CU is 2N×2N (N=4, 8, 16 and 32), a single CU may be partitioned into two types (i.e., 2N×2N or N×N).

Here, in the case that a single CU is partitioned into the PU of 2N×2N shape, it means that only one PU is existed in a single CU.

On the other hand, in the case that a single CU is partitioned into the PU of N×N shape, a single CU is partitioned into four PUs, and different prediction blocks are generated for each PU unit. However, such a PU partition may be performed only in the case that the size of CB for the luma component of CU is the minimum size (i.e., the case that a CU is an SCU).

Referring to FIG. 4(b), assuming the case that the size of a single CU is 2N×2N (N=4, 8, 16 and 32), a single CU may be partitioned into eight PU types (i.e., 2N×2N, N×N, 2N×N, N×2N, nL×2N, nR×2N, 2N×nU and 2N×nD)

Similar to the intra-prediction, the PU partition of N×N shape may be performed only in the case that the size of CB for the luma component of CU is the minimum size (i.e., the case that a CU is an SCU).

The inter-prediction supports the PU partition in the shape of 2N×N that is partitioned in a horizontal direction and in the shape of N×2N that is partitioned in a vertical direction.

In addition, the inter-prediction supports the PU partition in the shape of nL×2N, nR×2N, 2N×nU and 2N×nD, which is an asymmetric motion partition (AMP). Here, 'n' means ¼ value of 2N. However, the AMP may not be used in the case that the CU to which the PU is belonged is the CU of minimum size.

In order to encode the input image in a single CTU efficiently, the optimal partition structure of the coding unit (CU), the prediction unit (PU) and the transform unit (TU) may be determined based on a minimum rate-distortion value through the processing process as follows. For example, as for the optimal CU partition process in a 64×64 CTU, the rate-distortion cost may be calculated through the partition process from the CU of 64×64 size to the CU of 8×8 size. The detailed process is as follows.

1) The optimal partition structure of PU and TU that generates the minimum rate distortion value is determined through performing the inter/intra-prediction, the transformation/quantization, the dequantization/inverse transformation and the entropy encoding for the CU of 64×64 size.

2) The optimal partition structure of PU and TU is determined to partition the 64×64 CU into four CUs of 32×32 size and to generate the minimum rate distortion value for each 32×32 CU.

3) The optimal partition structure of PU and TU is determined to further partition the 32×32 CU into four CUs of 16×16 size and to generate the minimum rate distortion value for each 16×16 CU.

4) The optimal partition structure of PU and TU is determined to further partition the 16×16 CU into four CUs of 8×8 size and to generate the minimum rate distortion value for each 8×8 CU.

5) The optimal partition structure of CU in the 16×16 block is determined by comparing the rate-distortion value of the 16×16 CU that is obtained in the process of 3) above with the addition of the rate-distortion value of the four 8×8 CUs that is obtained in the process of 4) above. This process is also performed for remaining three 16×16 CUs in the same manner.

6) The optimal partition structure of CU in the 32×32 block is determined by comparing the rate-distortion value of the 32×32 CU that is obtained in the process of 2) above with the addition of the rate-distortion value of the four 16×16 CUs that is obtained in the process of 5) above. This process is also performed for remaining three 32×32 CUs in the same manner.

7) Lastly, the optimal partition structure of CU in the 64×64 block is determined by comparing the rate-distortion value of the 64×64 CU that is obtained in the process of 1) above with the addition of the rate-distortion value of the four 32×32 CUs that is obtained in the process of 6) above.

As described above, the block-based image compression method is used for most of the conventional compression technique for a still image or a video (e.g., HEVC).

However, such a block-based image compression method may not properly reflect the characteristics of image since the partition shape of image is fixed by a square shape, and particularly, is not proper for coding of a complex texture. According to this, an image compression technique is required to compress images more efficiently.

Accordingly, the present invention proposes a method of compressing images as a unit of a polygon unit. The polygon unit proposed in the present invention will be described by reference to the drawings below.

Figure 5:
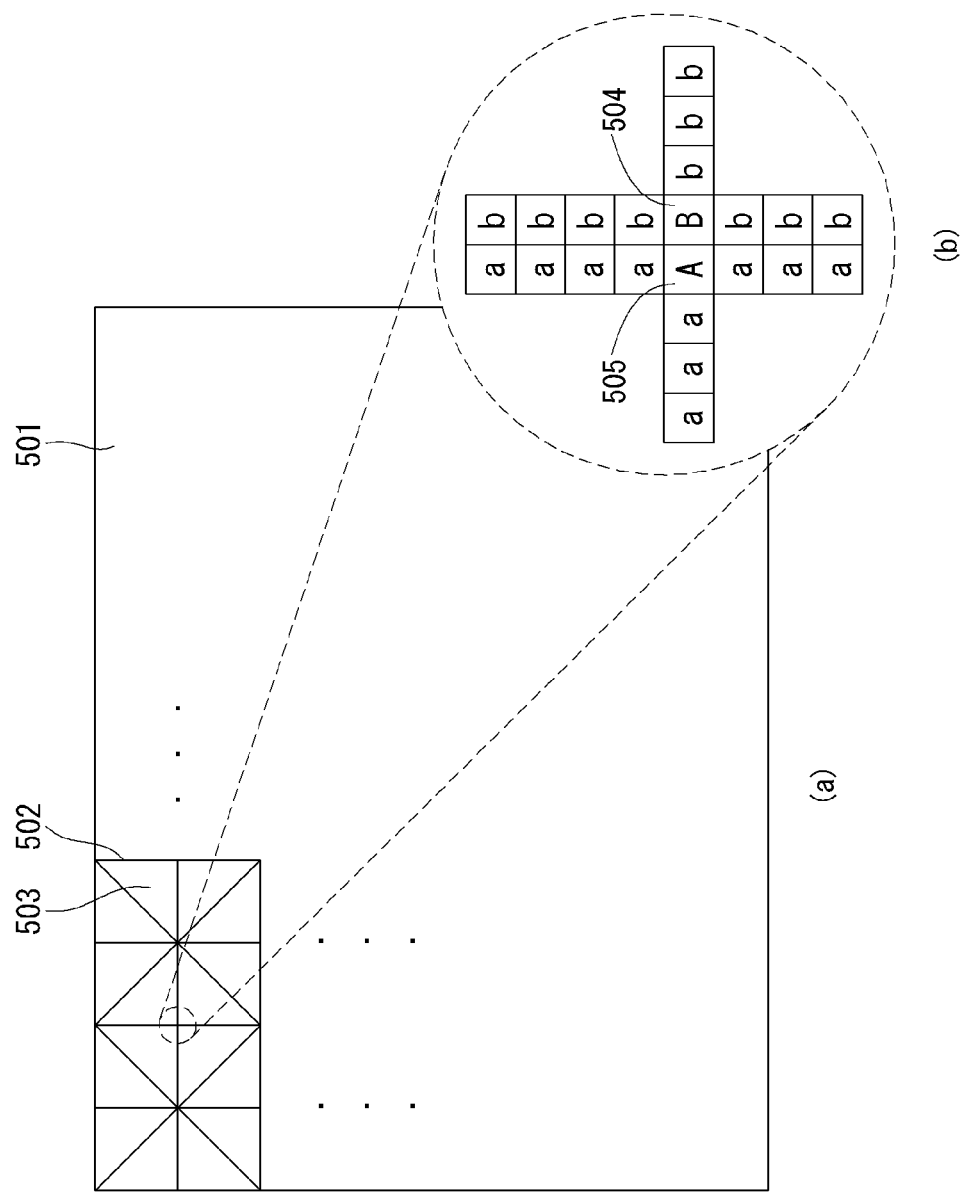
FIG. 5 is a diagram for describing a polygon unit according to an embodiment of the present invention.

FIG. 5 is a diagram for describing a polygon unit according to an embodiment of the present invention.

Referring to FIG. 5, a single image (or picture) 501 is partitioned into a processing block 502 of a square shape. Herein, the processing block 502 may be understood as a concept of embracing the coding tree unit (CTU) and the coding unit (CU) described above.

A single processing block 502 may be partitioned into one or more polygon units 503 that are formed based on three or more pixels.

As described above, the polygon unit 503 means a basic unit of an input image for encoding and decoding. That is, the polygon unit 503 may be understood as a concept of embracing the coding unit (CU), the prediction unit (PU) and the transform unit (TU) described above. In addition, a single polygon unit 503 may be further partitioned into lower polygon units of which sizes are smaller.

Hereinafter, for the convenience of description in this specification, a 'pixel' is referred to as a 'point'. Furthermore, a set of consecutive points that construct a segment that connects two points is referred to as a 'side'. Consequently, each side of a single processing block 502 and each side of a polygon unit includes a plurality of consecutive points.

Actually, two sides that belong to each processing block 502 include a plurality of consecutive points which are different from each other. The points denoted by 'a' in FIG. 5(b) represent a right side of a left processing block, and the points denoted by 'b' represent a left side of a right processing block. However, for the convenience of description, similar to the denotation that each of the right side of the left processing block and the left side of the right processing block is shown by one side, in the drawings illustrated below, the side that is adjacent to the adjacent processing blocks is denoted by a single side and described.

In addition, the point denoted by 'A' in FIG. 5(b) is a vertex of the polygon unit located at a right side of the left processing block, and the point denoted by 'B' is a vertex of the polygon unit located at a left side of the right processing block. However, for the convenience of description, in the case that a vertical index (or coordinate) and/or a horizontal index (or coordinate) is identical between adjacent points of the adjacent processing blocks with each other, the adjacent points will be denoted by a single point in the following drawings illustrated, similar to the denotation that 'A' and 'B' are shown by a single point in FIG. 5(a).

Figure 6:
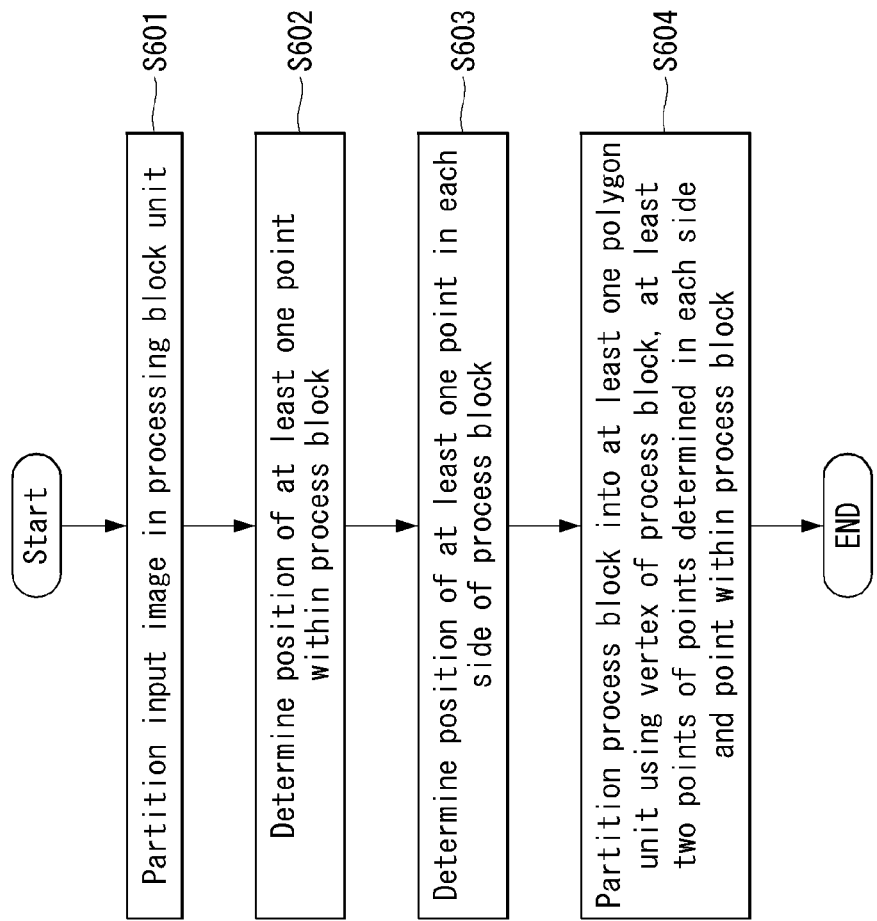
FIG. 6 is a diagram illustrating a coding method based on a polygon unit according to an embodiment of the present invention.

FIG. 6 is a diagram illustrating a coding method based on a polygon unit according to an embodiment of the present invention.

Referring to FIG. 6, an encoder partitions an input image by a unit of processing block (step, S601). Herein, the processing block means a block of a square shape.

The encoder determines a position of at least one point within the processing block now being coded (step, S602). Furthermore, the encoder determines a position of at least one point in each side of the processing block now being coded (step, S603).

Here is exemplified the method for the encoder to determine a position of at least one point within the processing block now being coded, and to determine a position of at least one point in each side of the processing block now being coded, it is also permissible to perform in reverse order. That is, the encoder may determine a position of at least one point in each side of the processing block now being coded, and then, determine a position of at least one point within the processing block now being coded. In this case, the order of step, S602 and step, S603 may be interchanged.

The method of determining the point in the processing block or in each side will be described below in detail.

The encoder generates a polygon unit by partitioning the current processing block into at least one polygon unit using a vertex of the processing block currently to be coded, at least two points of the points determined in each side and the point determined within the current processing block (step, S604).

Furthermore, the encoder performs coding by a unit of polygon unit.

Figure 7:
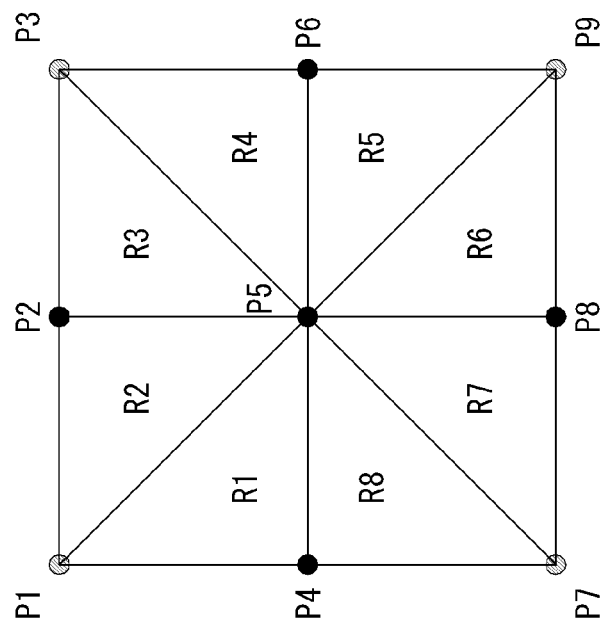
FIG. 7 is a diagram illustrating a polygon unit partition according to an embodiment of the present invention.

FIG. 7 is a diagram illustrating a coding method based on a polygon unit according to an embodiment of the present invention.

Hereinafter, for the convenience of description, it is assumed and described that a single point is determined within a single processing block, and a single point is determined within each side of a processing block, but the present invention is not limited thereto. That is, a plurality of points may be determined within a single processing block, and similarly, a plurality of points may be determined in each side of a processing block.

FIG. 7 is a diagram illustrating a polygon unit partition according to an embodiment of the present invention.

Referring to FIG. 7, when a single point is determined inside a processing block and a single point is determined in each side of the processing block, the eight polygon units (R1, R2, R3, R4, R5, R6, R7 and R8 regions) are generated to maximum for each processing block. That is, the polygon unit may be generated by using at least two points of four points (P1, P3, P7 and P9) which are vertexes of the processing block and points (P2, P4, P6 and P8) in each side, and a single point (P5) within the processing block.

Herein, four points (P1, P3, P7 and P9) which are vertexes of the processing block may be fixed, and the remaining five points (e.g., P2, P4, P5, P6 and P8) may have changeable positions.

Hereinafter, for the convenience of description, Px, Py and Pz are referred to as polygon units whose vertexes are Px, Py and Pz. For example, (P1, P2, P5) is referred to as the polygon unit (i.e., R2 in FIG. 7) whose vertexes are p1, p2 and p5.

The method for determining the positions of the points (P2, P4, P5, P6 and P8) that have changeable positions will be described in more detail.

First, P5 may be freely located within the processing block, and the encoding apparatus determines the position of P5 within the processing block.

The single point P5 within the processing block may be determined by using a full search method or other various fast search methods. Herein, all of the available methods that were used in the conventional image coding technique may be applied to the full search method or the fast search method. As an example of the fast search method, a diamond search, a cross diamond search, a new cross diamond search, and so on may be used.

The encoder generates four polygon units (i.e., (P1, P3, P5), (P1, P7, P5), (P3, P9, P5) and (P7, P9, P5)) by assuming that all points (in the case of the full search) within the processing block or a candidate point (in the case of the fast search) are points located in the processing block. Furthermore, the encoder may calculate a distortion (e.g., sum of square difference (SSD), sum of absolute difference (SAD), or the like) or a rate-distortion value (or cost) by comparing the four polygon unit with an original image, and may determine the point of which distortion value or the rate-distortion cost is to minimum as P5.

In addition, in order to determine the partition structure of the polygon unit more quickly, the encoder may determine the single point P5 within the processing block to be the center point of the processing block.

When the position of P5 is determined using the method above, four regions (or polygon units) including (P1, P3, P5) (i.e., R2+R3 region), (P1, P7, P5) (i.e., R1+R8 region), (P3, P9, P5) (i.e., R4+R5 region) and (P7, P9, P5) (i.e., R6+R7 region) are generated.

Furthermore, the encoding apparatus determines four points (i.e., P2, P4, P6 and P8) located in each side of the processing block. Herein, P2 may be freely located between P1 and P3, and P4 may be freely located between P1 and P7. And P6 may be freely located between P3 and P9, and P8 may be freely located between P7 and P9.

The positions of four points (i.e., P2, P4, P6 and P8) located in each side of the processing block may be determined as the point that minimize the rate-distortion cost of each polygon unit. For example, polygon units R2 and R3 may be determined to be the position that minimizes the rate-distortion cost of R2 and R3 by adjusting the position of P2 in the R2+R3 region that is generated based on P1, P3 and P5. In the same way, the polygon units of R1, R4, R5, R6, R7 and R8 are determined by adjusting positions of P4, P6 and P8.

Further, the positions of four points (i.e., P2, P4, P6 and P8) located in each side of the processing block may be determined as the position in which the gradient in each side of the processing block is the greatest. For example, the position of P2 may be determined to be the point at which a change is the greatest between adjacent points of the points that construct the side formed by connecting P1 and P3. In the same way, the position of P4 may be determined between P1 and P7, the position of P6 may be determined between P3 and P9, and the position of P8 may be determined between P7 and P9.

As such, when the positions of four points (i.e., P2, P4, P6 and P8) located in the side of the processing block are determined, eight polygon units such as (P1, P4, P5) (R1 polygon unit), (P1, P2, P5) (R2 polygon unit), (P2, P3, P5) (R3 polygon unit), (P3, P6, P5) (R4 polygon unit), (P6, P9, P5) (R5 polygon unit), (P8, P9, P5) (R6 polygon unit), (P7, P8, P5) (R7 polygon unit) and (P4, P7, P5) (R8 polygon unit) are generated.

Although the method of determining the point located in each side of the processing block after determining a single point located within the processing block is described in the description above, on the contrary, a single point located within the processing block may be determined first after determining the point located in each side of the processing block.

Meanwhile, in the above embodiment according to FIG. 7, although the partition structure of polygon unit in which total eight polygon units are generated within a single processing block is described, the less polygon units may also be generated in a single processing block. That is, the four points P2, P4, P6 and P8 located in each side of the processing block are determined and total eight polygon units are generated, and then the adjacent polygon units with each other may be merged. This will be described by reference to the drawing below.

Figure 8:
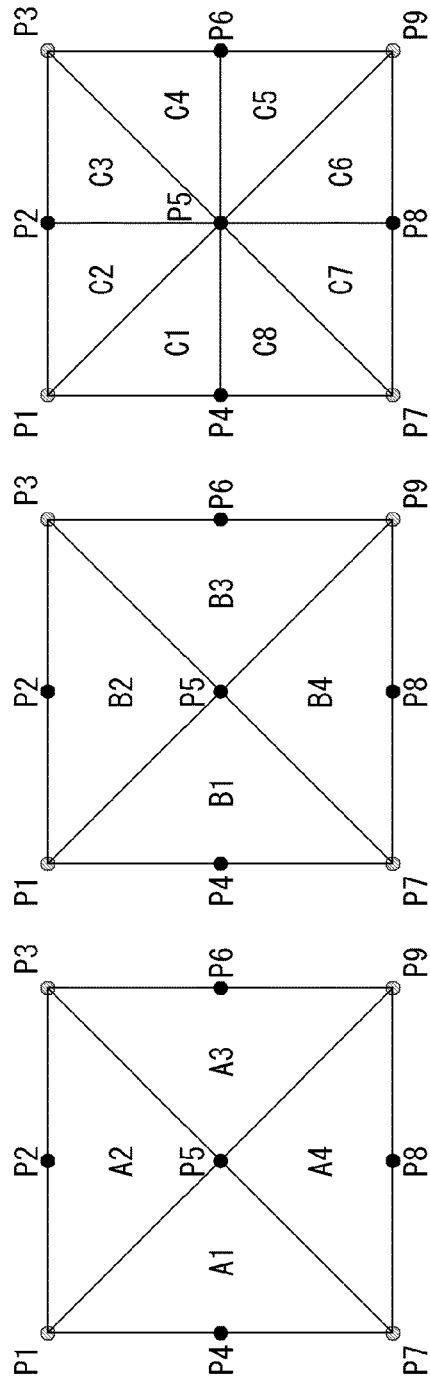
FIG. 8 is a diagram illustrating a polygon unit partition according to an embodiment of the present invention.
Figure 8:
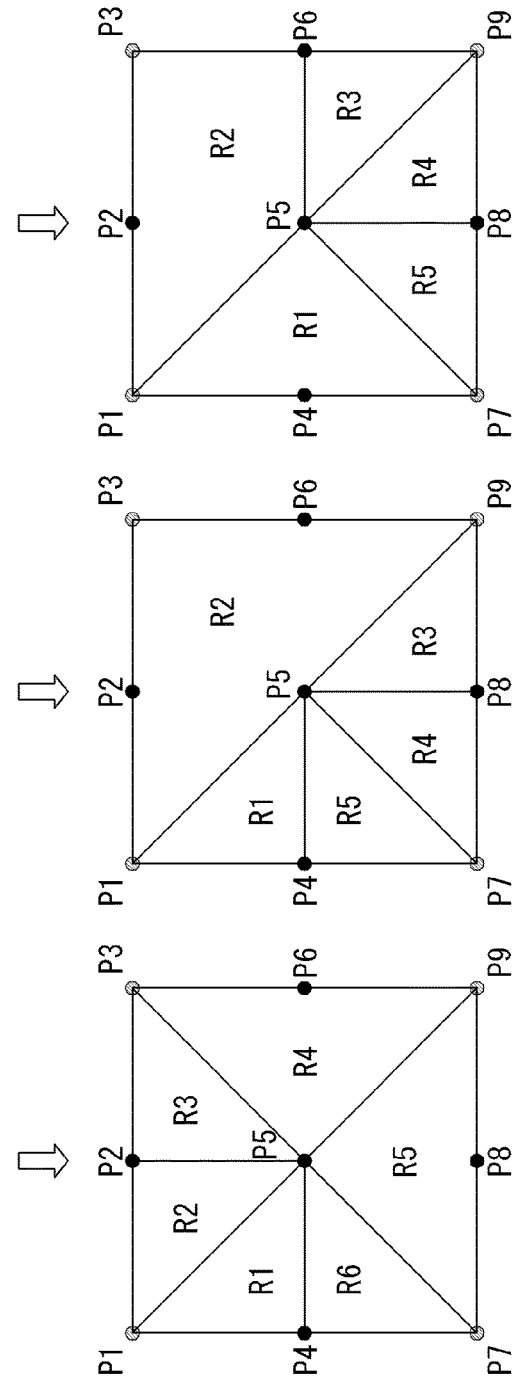

FIG. 8 is a diagram illustrating a polygon unit partition according to an embodiment of the present invention.

Referring to FIG. 8(a), four polygon units A1, A2, A3 and A4 are generated using P5 that is determined within a processing block and vertexes P1, P3, P7 and P9 of the processing block.

Furthermore, in each of the polygon regions, the polygon is changeably partitioned into sub-polygons. Herein, the meaning of changeable partition is to partition each polygon into sub-polygons by determining the positions of P2, P4, P6 and P8 in each side of the processing block, and merge the partitioned sub-polygons from the same polygon by considering the rate-distortion cost and the like. That is, for each of the polygon unit A1, A2, A3 or A4 generated using P5, P1, P3, P7 and P9, the optimal polygon unit partition structure of which rate-distortion cost is the minimum is determined.

In more detail, the rate-distortion cost is calculated for each polygon unit, and the rate-distortion cost is calculated for each of the sub-polygon units partitioned within the corresponding polygon unit.

The comparison is made between the rate-distortion cost for the polygon unit and the summation of the rate-distortion cost for each of the sub-polygon units generated within the corresponding polygon unit, and then, the polygon unit partition structure that causes the minimum rate-distortion cost is determined.

Accordingly, in the case that the structure that is partitioned from the inside of the polygon unit into the sub-polygon units is the optimal partition structure of which rate-distortion cost is minimum, the structure that is partitioned from the inside of the polygon unit into the sub-polygon units is determined. On the contrary, in the case that the structure that is not partitioned from the inside of the polygon unit into the sub-polygon units is the optimal partition structure of which rate-distortion cost is minimum, the structure that is not partitioned from the inside of the polygon unit into the sub-polygon units is determined. That is, the sub-polygon units that are partitioned inside the polygon unit may be merged.

As such, the sub-polygon units are generated by determining all of the positions P2, P4, P6 and P8 in each side of the processing block, and then, the adjacent sub-polygon units generated within A1, A2, A3 and A4 may be merged by considering the rate-distortion cost.

FIG. 8(a) exemplifies the case that the sub-polygon units generated inside A3 and A4 are merged, and finally, polygon units R4 and R5 are generated, respectively. And the sub-polygon units generated inside A1 and A2 are not merged, and finally, R1 and R6, R2 and R3 are generated.

Referring to FIG. 8(b), by using P5 determined within the processing block and the vertexes P1, P3, P7 and P9 of the processing block, four polygon units B1, B2, B3 and B4 are changeably generated. That is, this means that the position of P5 is determined within the processing block and partitioned into four polygons, and one or more adjacent polygons are merged by considering the rate-distortion cost, and the like.

In more particular, the rate-distortion cost is calculated for each of the partitioned polygon units. Furthermore, the rate-distortion cost is calculated in the structure in which one or more adjacent polygon units are merged into four polygon units. Then, the polygon unit partition structure of which rate-distortion cost is the minimum is determined. That is, one or more adjacent polygon units may be merged.

Furthermore, the polygon unit that is not merged in the polygon unit partition structure determined as above may be further partitioned into smaller ones and the sub-polygon units may be determined.

FIG. 8(b) exemplifies the case that B2 and B3 regions are merged and R2 polygon unit is generated. And B1 and B4 regions that are not merged are further partitioned into R1 and R5, and R3 and R4, respectively.

Referring to FIG. 8(c), by using P5 determined within the processing block, P2, P4, P6 and P8 that are determined in each side of the processing block and the vertexes P1, P3, P7 and P9 of the processing block, eight polygon units are generated, and the polygon unit partition structure of which rate-distortion cost is the minimum.

In other words, the rate-distortion cost is calculated for each of the partitioned polygon units. Furthermore, the rate-distortion cost is calculated in the structure in which one or more adjacent polygon units are merged into eight polygon units. Then, the polygon unit partition structure of which rate-distortion cost is the minimum is determined. That is, one or more adjacent polygon units may be merged.

In FIG. 8(c), by determining all the positions of P5, P2, P4, P6 and P8, eight polygon units C1, C2, C3, C4, C5, C6, C7 and C8 are generated, and one or more adjacent polygon units are merged. In FIG. 8(c), C2, C3 and C4 are merged and R2 is generated, and C1 and C8 are merged and R1 is generated.

Meanwhile, a single processing block may be partitioned by the partition structure in which the Quad-tree structure and the polygon unit partition structure are mixed. As such, the partition structure in which the Quad-tree shape and the polygon unit shape are mixed may be referred to as a hybrid structure. In addition, the unit that is generated by using the hybrid structure may be referred to as a hybrid unit (HU). The HU may be referred to as a Hybrid Coding Unit (HCU), a Hybrid Prediction Unit (HPU), or a Hybrid Transform Unit (HTU). This will be described by reference to the following drawing.

Figure 9:
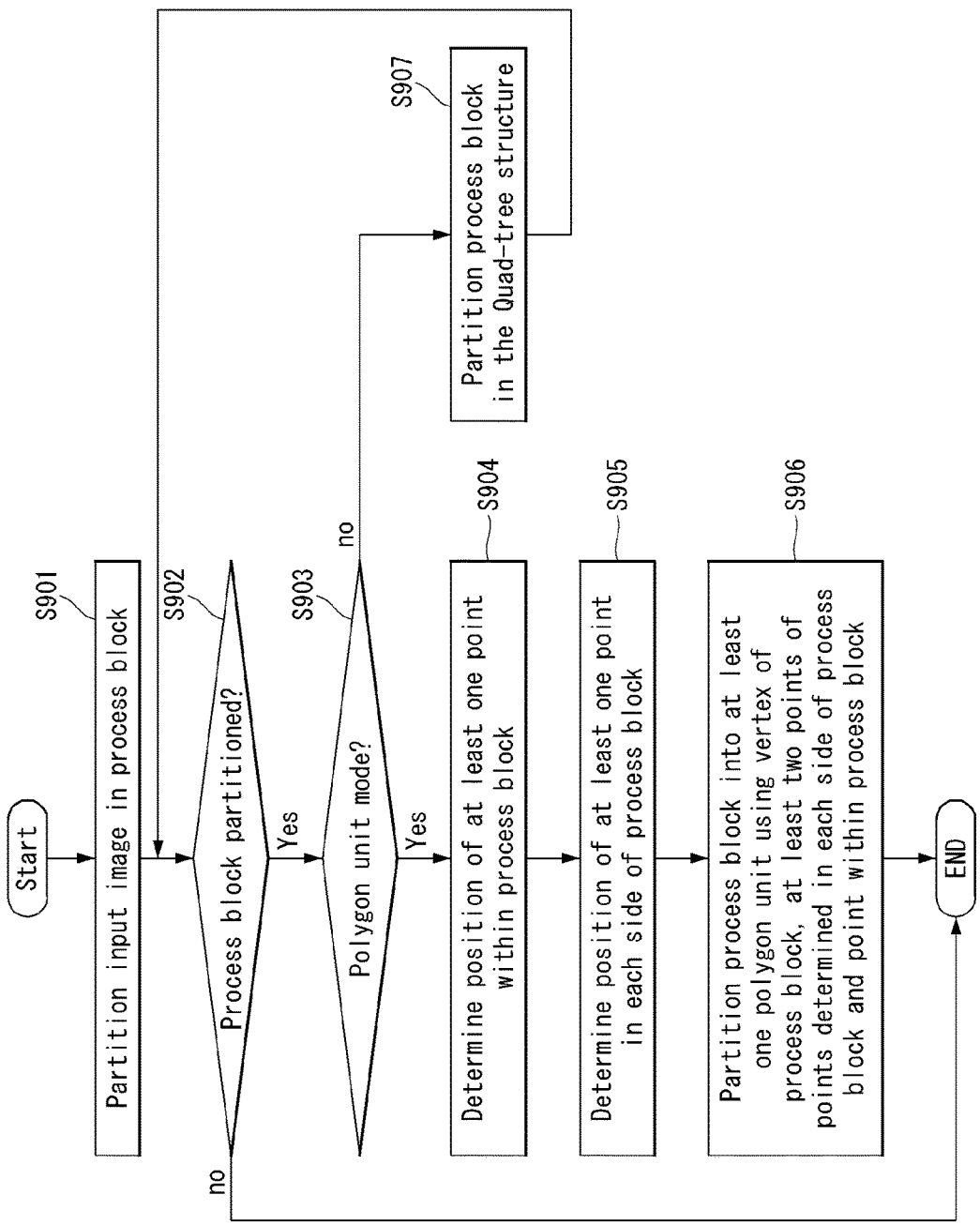
FIG. 9 is a diagram illustrating a coding method based on a polygon unit according to an embodiment of the present invention.

FIG. 9 is a diagram illustrating a coding method based on a polygon unit according to an embodiment of the present invention.

Referring to FIG. 9, the encoder partitions an input image by a unit of processing block (step, S901). Herein, the processing block means a block of square shape.

The encoder determines whether to partition the processing block further (step, S902).

As a result of the determination in step, S902, when it is determined that the processing block now being coded is not to be partitioned any more, the encoder performs coding by a unit of processing block.

Meanwhile, as a result of the determination in step, S902, when it is determined that the processing block now being coded is to be partitioned, the encoder determines whether to partition the processing block currently to be coded in the partition structure (i.e., polygon mode) in the polygon unit shape or in the partition structure (i.e., block mode) in the Quad-tree shape (step, S903).

As a result of the determination in step, S903, when it is determined to partition the processing block in the polygon mode, the encoder determines the position of at least one point within the processing block currently to be coded (step, S904). Furthermore, the encoder determines the position of at least one point in each side of the processing block currently to be coded (step, S905).

Here is exemplified the method for the encoder to determine a position of at least one point within the processing block now being coded, and to determine a position of at least one point in each side of the current processing block, it is also permissible to perform in reverse order. That is, the encoder may determine a position of at least one point in each side of the processing block now being coded, and then, determine a position of at least one point within the current processing block. In this case, the order of step, S904 and step, S905 may be interchanged.

The encoder generates a polygon unit by partitioning the processing block currently to be coded into at least one polygon unit using a vertex of the processing block currently to be coded, at least two points of the points determined in each side of the current processing block and the point determined within the current processing block (step, S906).

Furthermore, the encoder performs coding by a unit of polygon unit.

On the contrary, as a result of the determination in step, S903, when it is determined to partition the processing block in the block mode, the encoder partitions the processing block in the Quad-tree structure (step, S907).

Furthermore, returning to the step before step, S902 and it is determined whether to partition the processing block that is partitioned in the Quad-tree structure, and the process described above is progressed until the processing block is not partitioned any more.

Figure 10:
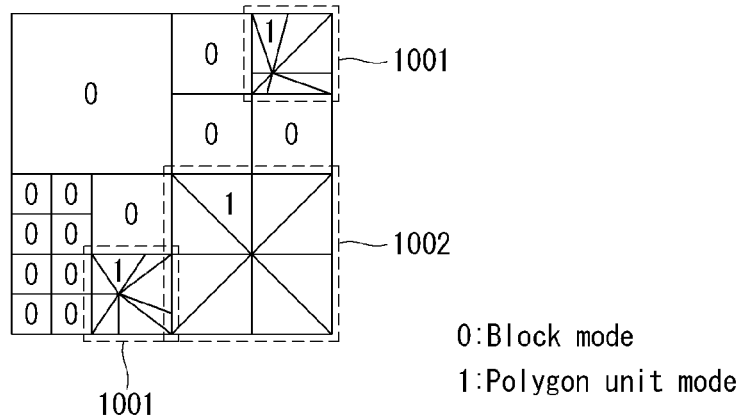
FIG. 10 is a diagram illustrating a polygon unit partition according to an embodiment of the present invention.

FIG. 10 is a diagram illustrating a polygon unit partition according to an embodiment of the present invention.

Referring to FIG. 10, when the size of the processing block of the highest level is 2N×2N, the processing block of the highest level has the smallest depth value (i.e., level 0).

Furthermore, the processing block of the highest level may be partitioned in the Quad-tree shape, and as a result, four lower level processing blocks that have the depth of level 1 may be generated. That is, the processing block of the highest level may be partitioned into four lower level processing blocks of N×N size.

Similarly, a single processing block that has N×N size may be further partitioned into the processing block that has the depth of level 2 of N/2×N/2 size, and the processing block of N/2×N/2 size may be further partitioned into the processing block that has the depth of level 3 of N/4×N/4 size. That is, such a partition process of the processing block may be performed recursively, and all of the processing blocks are not required to be partitioned in the same shape.

In this case, regardless of the partition depth (i.e., level) of the processing block, a single processing block may be partitioned into the polygon units according to the method described in FIG. 7 and FIG. 8.

However, the processing block that is partitioned into the polygon units is not partitioned in the Quad-tree shape any more. That is, the polygon unit corresponds to a leaf node.

That is, the processing block in which a single processing block of 2N×2N size is partitioned into the polygon units is not partitioned in the Quad-tree shape any more. Similarly, the processing block in which the processing block of N×N size or N/2×N/2 size is partitioned into the polygon units is not partitioned in the Quad-tree shape any more.

FIG. 10 exemplifies the case that a processing block 1001 of N/2×N/2 size and a processing block 1002 of N×N size are partitioned into the polygon units. In FIG. 10, for the convenience of description, the case is assumed that a single processing block is partitioned into total eight polygons. As such, the processing block that is partitioned in the polygon unit partition structure is not further partitioned in the Quad-tree shape any more regardless of the partition depth of the corresponding processing block.

As such, when the Quad-tree partition structure and the polygon unit partition structure are mixed and used to partition a single processing block, the indication information is required on whether each of the processing block is partitioned in the Quad-tree shape or in the polygon unit shape. For example, a partition mode flag (e.g., coding unit mode flag) is defined. And '0' indicates the partition structure (i.e., block mode) of the Quad-tree shape, and '1' indicates the partition structure (i.e., polygon unit mode) of the polygon unit shape.

In other words, the decoder may determine whether the processing block that is currently decoded is partitioned in the block mode or decoded in the polygon unit mode by receiving the flag information that indicates the partition mode from the encoder.

This will be described in more detail.

As an example, for a unit of coding unit (CU), the hybrid structure described above may be applied. That is, in this case, the processing block corresponds to the coding unit.

Hereinafter, in the syntax exemplified in this specification, the syntax element defined in the conventional HEVC may refer to the HEVC standard document, and the detailed description for this is omitted.

Table 1 exemplifies the syntax for the hybrid structure of a CU unit.

TABLE 1

| | Descriptor |
|---|---|
| coding_unit( x0, y0, log2CbSize ) { | |
|     if( hybrid_coding_unit_enabled_flag ) | |
|         cu_hybrid_flag | ae(v) |
|     if( cu_hybrid_flag) { | |
|     ...* | |
|     } | |
|     else { | |
|     if( transquant_bypass_enabled_flag ) | |
|         cu_transquant_bypass_flag | ae(v) |
|     if( slice_type != I ) | |
|         cu_skip_flag[ x0 ][ y0 ] | ae(v) |
|     ... | |
|     } | |
| } | |

Referring to Table 1, 'coding_unit(x0, y0, log 2CbSize)' is a syntax element for specifying a CU (i.e., processing block) being now decoded. Herein, x0 and y0 indexes represent a position of the top-left point of current CU, as an example, is specified to a relative position from the top-left point of a picture. In addition, log 2CbSize represents a size of current CU.

'hybrid_coding_unit_enabled_flag' is a flag that represents whether the CU has the hybrid structure, represents that 'cu_hybrid_flag' is existed when the flag is '1', and represents that 'cu_hybrid_flag' is not existed when the flag is '0'.

'cu_hybrid_flag' is a flag that represents that the current CU is coded in the hybrid CU mode. That is, the flag indicates that the current CU is partitioned in the mixture of the Quad-tree shape and the polygon unit shape. When 'cu_hybrid_flag' is '1', the flag represents that the corresponding CU is an HCU, and in this case, a new syntax ' . . . *' may be added. When 'cu_hybrid_flag' is '0', the coding unit syntax of the conventional HEVC is called. Here, when 'cu_hybrid_flag' is not existed, the value is regarded as '0'.

As described above, when the hybrid structure is applied, a decoding apparatus may determine whether the current CU may have the hybrid structure by receiving 'hybrid_coding_unit_enabled_flag' from an encoding apparatus, and may determine whether the current CU is coded in the hybrid CU mode by receiving 'cu_hybrid_flag'.

As another example, as a unit of prediction unit (PU), the hybrid structure described above may be applied. That is, the processing block corresponds to the prediction unit, in this case.

Table 2 exemplifies a prediction block partition mode in the HEVC.

TABLE 2

| part_mode | PartMode |
|---|---|
| 0 | PART_2Nx2N |
| 1 | PART_2NxN |
| 2 | PART_Nx2N |
| 3 | PART_NxN |
| 4 | PART_2NxnU |
| 5 | PART_2NxnD |
| 6 | PART_nLx2N |
| 7 | PART_nRx2N |

Referring to Table 2, in the HEVC, eight partition modes PartMode are defined as illustrated in FIG. 4. Here, as described above, PART_2N×2N and PART_N×N may be used in the intra-prediction mode and the inter-prediction mode. Furthermore, PART_N×2N, PART_2N×N, PART_nL×2N, PART_nR×2N, PART_2N×nU and PART_2N×nD may be used only in the inter-prediction mode.

According to the prediction mode that is applied to the current CU, one of the modes defined in Table 2a may be determined.

In the conventional partition mode PartMode shown in Table 2, the partition mode PartMode of the polygon type is additionally defined, and the PU partition mode shown in Table 3 below may be determined.

TABLE 3

| part_mode | PartMode |
|---|---|
| 0 | PART_2Nx2N |
| 1 | PART_2NxN |
| 2 | PART_Nx2N |
| 3 | PART_NxN |
| 4 | PART_2NxnU |
| 5 | PART_2NxnD |
| 6 | PART_nLx2N |
| 7 | PART_nRx2N |
| 8 | PART_polygon |

Referring to Table 3, in the conventional partition mode PartMode shown in Table 2, the partition mode PartMode of the polygon type may be additionally defined (i.e., PART_polygon).

Herein, the partition mode PART_polygon of the polygon type may be used regardless of whether the current CU is predicted in the intra-prediction mode or the inter-prediction mode.

Table 4 exemplifies the syntax for the hybrid structure of a PU unit.

TABLE 4

| coding_unit( x0, y0, log2CbSize ) { | Descriptor |
|---|---|
|   if( transquant_bypass_enabled_flag ) | |
|     cu_transquant_bypass_flag | ae(v) |
|   if( slice_type != I ) | |
|     cu_skip_flag[ x0 ][ y0 ] | ae(v) |
|   nCbS = ( 1 << log2CbSize ) | |
|   if( cu_skip_flag[ x0 ][ y0 ] ) | |
|     prediction_unit( x0, y0, nCbS, nCbS ) | |

TABLE 4-continued

| coding_unit( x0, y0, log2CbSize ) { | Descriptor |
|---|---|
|   else { | |
|     if( slice_type != I ) | |
|       pred_mode_flag | ae(v) |
|     if( CuPredMode[ x0 ][ y0 ] != MODE_INTRA \|\| log2CbSize == MinCbLog2SizeY ) | |
|       part_mode | ae(v) |
|     if( CuPredMode[ x0 ][ y0 ] == MODE_INTRA ) { | |
|       ... | |
|     } else { | |
|       if( PartMode == PART_2Nx2N ) | |
|         prediction_unit( x0, y0, nCbS, nCbS ) | |
|       else if( PartMode == PART_2NxN ) { | |
|         prediction_unit( x0, y0, nCbS, nCbS / 2 ) | |
|         prediction_unit( x0, y0 + ( nCbS / 2 ), nCbS, nCbS / 2 ) | |
|       } else if( PartMode == PART_Nx2N ) { | |
|         prediction_unit( x0, y0, nCbS / 2, nCbS ) | |
|         prediction_unit( x0 + ( nCbS / 2 ), y0, nCbS / 2, nCbS ) | |
|       } else if( PartMode == PART_2NxnU ) { | |
|         prediction_unit( x0, y0, nCbS, nCbS / 4 ) | |
|         prediction_unit( x0, y0 + ( nCbS / 4 ), nCbS, nCbS * 3 / 4 ) | |
|       } else if( PartMode == PART_2NxnD ) { | |
|         prediction_unit( x0, y0, nCbS, nCbS * 3 / 4 ) | |
|         prediction_unit( x0, y0 + ( nCbS * 3 / 4 ), nCbS, nCbS / 4 ) | |
|       } else if( PartMode == PART_nLx2N ) { | |
|         prediction_unit( x0, y0, nCbS / 4, nCbS ) | |
|         prediction_unit( x0 + ( nCbS / 4 ), y0, nCbS * 3 / 4, nCbS ) | |
|       } else if( PartMode == PART_nRx2N ) { | |
|         prediction_unit( x0, y0, nCbS * 3 / 4, nCbS ) | |
|         prediction_unit( x0 + ( nCbS * 3 / 4 ), y0, nCbS /4, nCbS ) | |
|       } else if( PartMode == PART_NxN ) { | |
|         prediction_unit( x0, y0, nCbS / 2, nCbS / 2 ) | |
|         prediction_unit( x0 + ( nCbS / 2 ), y0, nCbS / 2, nCbS / 2 ) | |
|         prediction_unit( x0, y0 + ( nCbS / 2 ), nCbS / 2, nCbS / 2 ) | |
|         prediction_unit( x0 + ( nCbS / 2 ), y0 + ( nCbS / 2 ), nCbS / 2, nCbS / 2 ) | |
|       } else { /* PART_polygon */ | |
|         polygon_prediction_unit( ) | |
|       } | |
|     } | |
|     if( !pcm_flag[ x0 ][ y0 ] ) { | |
|       if( CuPredMode[ x0 ][ y0 ] != MODE_INTRA && | |
|         !( PartMode == PART_2Nx2N && merge_flag[ x0 ][ y0 ] ) ) | |
|         rqt_root_cbf | ae(v) |
|       if( rqt_root_cbf ) { | |
|         MaxTrafoDepth = ( CuPredMode[ x0 ][ y0 ] == MODE_INTRA ? | |
|             ( max_transform_hierarchy_depth_intra + IntraSplitFlag ) : | |
|             max_transform_hierarchy_depth_inter ) | |
|         transform_tree( x0, y0, x0, y0, log2CbSize, 0, 0 ) | |
|       } | |
|     } | |
|   } | |
| } | |

Referring to Table 4, when calling the PU syntax in the conventional CU syntax, the PU (i.e., PART_polygon) of the polygon type may be additionally called.

A decoder calls the partition mode part_mode when the prediction mode of the current CU is not the intra-mode or the size of the current CU is the minimum CU (CuPredMode [x0][y0]!=MODE_INTRA∥log 2CbSize==MinCb Log 2SizeY).

'part_mode' specifies the partition mode of the current CU as shown in Table 3. The meaning of part_mode is determined based on the prediction mode 'CuPredMode[x0] [y0]' of the current CU.

As such, the decoder may determine which mode the corresponding processing block is partitioned by calling the partition mode part_mode information received from the encoder.

Table 4 exemplifies the case that the syntax element 'polygon_prediction_unit( )' that calls the PU of the polygon type is added when the CU prediction mode is not the intra-mode, that is, the inter-mode (CuPredMode[x0] [y0]==MODE_INTER).

That is, when the PU of the polygon type is selected, the syntax element 'polygon_prediction_unit( )' that calls the PU of the polygon type that performs different function from the conventional prediction_unit( ) syntax is added, and the prediction of the prediction block that has the polygon structure is performed.

Meanwhile, in the example described above, although the example is described that the block mode and the polygon unit mode are determined as the processing block unit (e.g., coding unit or prediction unit, etc.), the block mode and the polygon unit mode may also be determined as the processing block unit of the maximum size.

When the block mode is applied to a specific maximum processing block, the corresponding maximum processing block may be repeatedly partitioned in the Quad-tree shape, but the lower level processing blocks are not partitioned in the polygon unit shape.

On the contrary, when the polygon unit mode is applied to a specific maximum processing block, the corresponding maximum processing block may be partitioned only in the polygon unit shape.

Meanwhile, when the processing block is partitioned into the polygon units with the polygon mode being applied, the position information of the polygon vertex that forms the polygon unit should be transmitted to the decoder. This will be described by reference to the following drawing.

Figure 11:
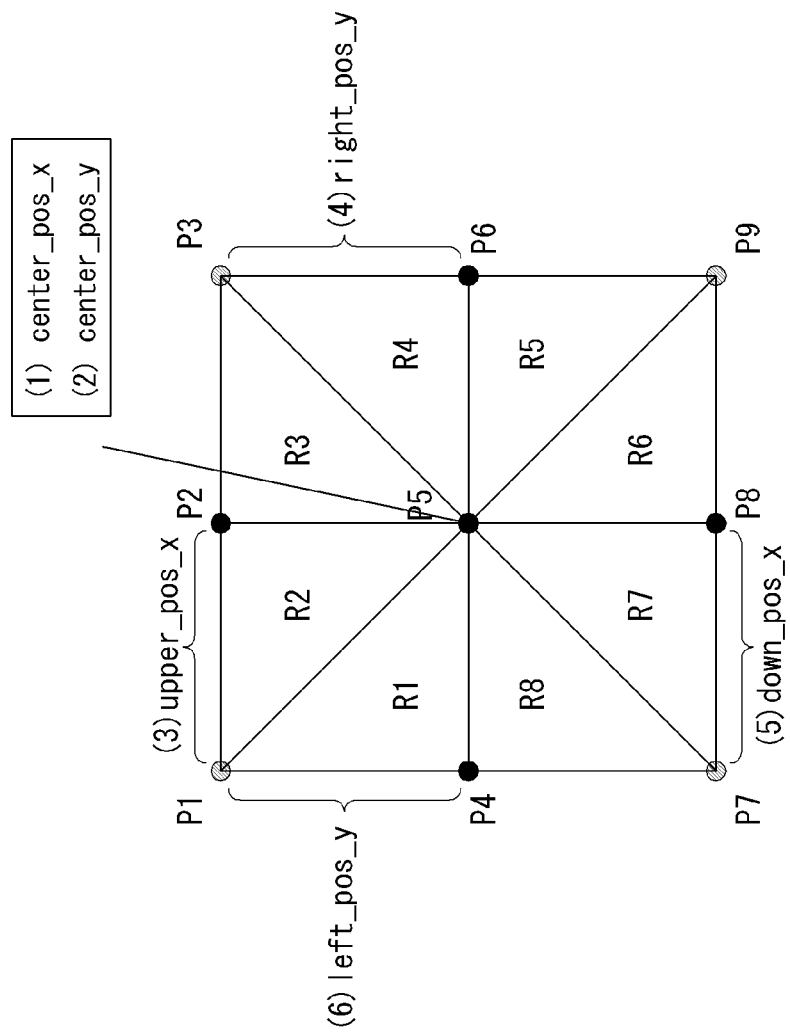
FIG. 11 is a diagram for describing a coordinate of a polygon unit according to an embodiment of the present invention.

FIG. 11 is a diagram for describing a coordinate of a polygon unit according to an embodiment of the present invention.

Referring to FIG. 11, the decoder may receive the horizontal/vertical coordinate of the top-left point P1 of the vertex of a processing block and the size information of the processing block from the encoder, and may specify the position of the remaining vertexes P3, P7 and P9 of the processing block based on the received information.

In addition, other position information of the points P5, P2, P4, P6 and P8 of which positions are changeably determined should be transmitted to the decoder.

In FIG. 11, 'center_pos_x' and 'center_pos_y' represent the horizontal coordinate and the vertical coordinate of the point located inside the processing block, respectively. Furthermore, 'upper_pos_x' represents the horizontal coordinate of the point located in the upper side of the processing block. 'right_pos_y' represents the vertical coordinate of the point located in the right side of the processing block. 'down_pos_x' represents the horizontal coordinate of the point located in the lower side of the processing block. 'left_pos_y' represents the vertical coordinate of the point located in the left side of the processing block.

Here, the position information of the polygon vertex that forms the polygon unit may be represented by a relative displacement based on the coordinate of the top-left point of the processing block to which the corresponding polygon unit is belonged.

Here, the position information of the polygon vertex that forms the polygon unit may be represented by a relative displacement based on the coordinate of the center point of the processing block to which the corresponding polygon unit is belonged.

Such a 'displacement' means the variation of the position from a reference point, and may be expressed by the difference of the horizontal axis and/or the vertical axis or expressed by the distance from the center point and the angle (assuming the angle of the vertical axis across the center point to be 0°/360°).

Meanwhile, as shown in the example of FIG. 8 above, when a polygon unit is merged to an adjacent polygon unit, it is permissible that a part of the position information of the polygon vertex is not transmitted to the decoder. For example, in the case of FIG. 8(a), the position information of P6 located in the right side of the processing block and P8 located in the lower side of the processing block may not be transmitted to the decoder.

The decoder may derive the vertical coordinate of the point located in the upper side and the lower side of the processing block and the horizontal coordinate of the left side and the right side of the processing block from the coordinate of the top-left point P1 of the vertexes of the processing block and the size information of the processing block.

Table 5 exemplifies the syntax for the vertex coordinate of a polygon unit.

TABLE 5

| | Descriptor |
|---|---|
| if (cu_polygon_flag) { | |
|    center_pos_x | ae(v) |
|    center_pos_y | ae(v) |
|    upper_pos_x | ae(v) |
|    right_pos_y | ae(v) |
|    down_pos_x | ae(v) |
|    left_pos_y | ae(v) |
| } | |

Referring to Table 5, 'cu_polygon_flag' is a flag indicating that the current CU is coded in the polygon mode. When 'cu_polygon_flag' is '1', the syntax elements 'center_pos_x', 'center_pos_y', 'upper_pos_x', 'right_pos_y', 'down_pos_x' and 'left_pos_y' that represent the position of the polygon vertexes are called.

As described above, when a polygon unit is merged to an adjacent polygon unit, it is permissible that a part of the position information of the polygon vertex is not transmitted to the decoder. In this case, some syntax elements in the above Table 5 may be omitted.

By receiving the position information of the polygon vertexes together with the coordinate of the top-left point of the processing block and the size information of the processing block from the encoder, the decoder may determine which partition structure of the polygon unit each processing block is partitioned in.

Meanwhile, in FIG. 5 to FIG. 11 above, although the method of partitioning the processing block into the polygon units is described by determining the point located inside a single processing block and the point located in each of the sides, a single processing block may be partitioned in a type selected from the predetermined partition types (or patterns) of the polygon unit. This will be described by reference to the following drawing.

Figure 12:
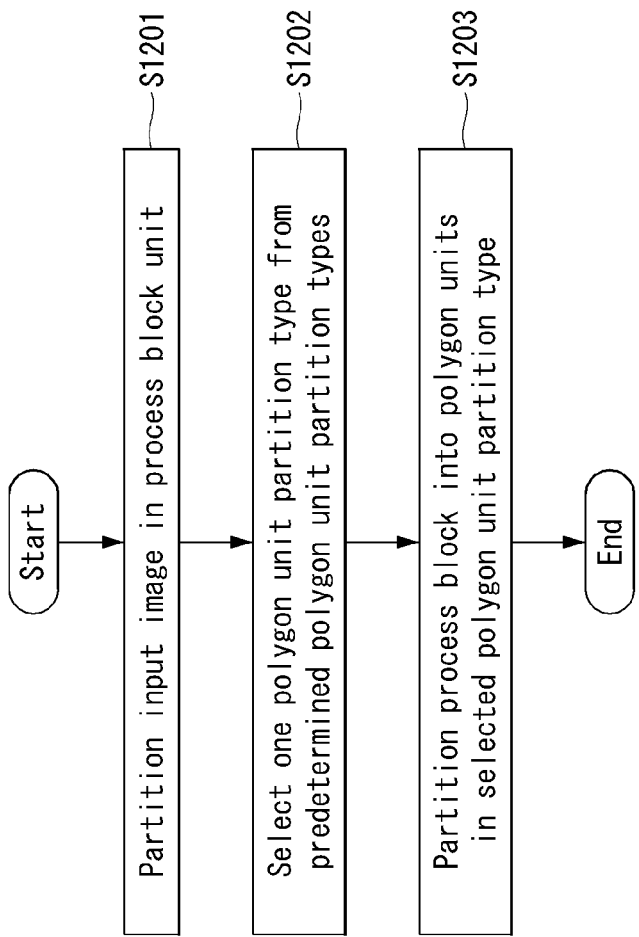
FIG. 12 is a diagram for describing a coding method based on a polygon unit according to an embodiment of the present invention.

FIG. 12 is a diagram for describing a coding method based on a polygon unit according to an embodiment of the present invention.

Referring to FIG. 12, the encoder partitions an input image by the unit of processing block (step, S1201). Herein, the processing block means the block of a square shape.

The encoder selects one of predetermined polygon unit partition types (step, S1202). The polygon unit partition type will be described below in more detail.

The encoder generates a polygon unit by partitioning the processing block now being coded into the polygon units in the polygon unit partition type selected in step, S1202 (step, S1203).

Furthermore, the encoder performs coding by the unit of polygon unit.

Hereinafter, the polygon unit partition type will be described.

Figure 13:
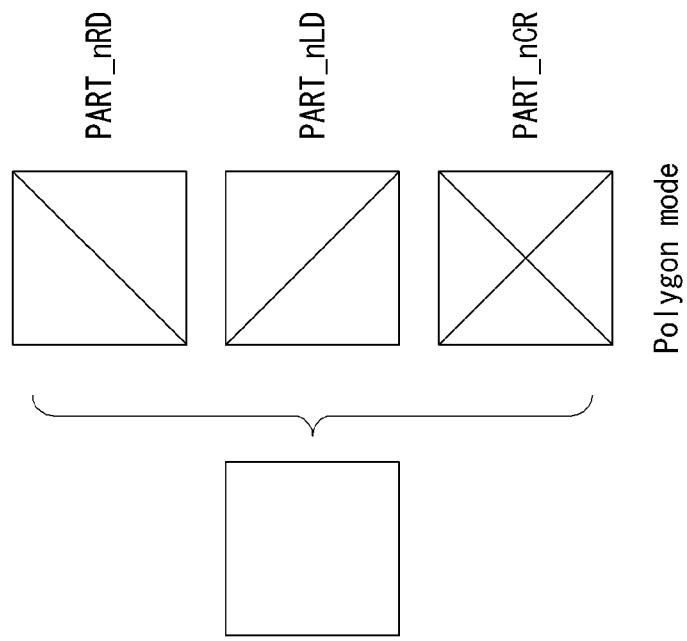
FIG. 13 is a diagram illustrating a polygon unit partition type according to an embodiment of the present invention.

FIG. 13 is a diagram illustrating a polygon unit partition type according to an embodiment of the present invention.

Similar to the partition type of the prediction block (PU) that is predefined in the HEVC described in FIG. 4 above, the partition type of a polygon unit may be predetermined.

Referring to FIG. 13, the type PART_nRD that is partitioned into two polygon units by the segment connecting the upper right vertex and the lower left vertex of the processing block, the type PART_nLD that is partitioned into two polygon units by the segment connecting the top-left vertex and the lower right vertex of the processing block and the type RART_nCR that is partitioned into four polygon units using two vertexes of the four vertexes and the center point of the processing block may be predefined.

However, the polygon unit partition type illustrated in FIG. 13 is just an example, but the present invention is not limited thereto.

Table 6 exemplifies the polygon unit partition type.

TABLE 6

| CuPredMode[x0][y0] | part_mode | IntraSplitFlag | PartMode |
|---|---|---|---|
| MODE_INTRA | 0 | 0 | PART_2Nx2N |
|  | 1 | 1 | PART_NxN |
| MODE_INTER | 0 | 0 | PART_2Nx2N |
|  | 1 | 0 | PART_2NxN |
|  | 2 | 0 | PART_Nx2N |
|  | 3 | 0 | PART_NxN |
|  | 4 | 0 | PART_2NxnU |
|  | 5 | 0 | PART_2NxnD |
|  | 6 | 0 | PART_nLx2N |
|  | 7 | 0 | PART_nRx2N |
|  | 8 | 0 | PART_nRD |
|  | 9 | 0 | PART_nLD |
|  | 10 | 0 | PART_nCR |

Referring to Table 6, the partition types (PART_nRD, PART_nLD and PART_nCR) of the polygon unit may be defined in addition to the conventional partition mode PartMode shown in Table 2.

Table 6 exemplifies the case that the partition types (PART_nRD, PART_nLD and PART_nCR) of the polygon unit are added in the inter-prediction mode, but the partition types of the polygon unit may also be added in the intra-prediction mode.

Compared with Table 3 above, in Table 3 above is defined the partition mode of the polygon type only, and may be indicated whether the current processing block is partitioned into the polygon units. That is, the information on which shape the polygon unit partition structure is constructed is not included, so that the decoder additionally requires the information on the polygon vertex.

On the contrary, in Table 6, the decoder may determine which shape of the polygon unit of the current processing block is partitioned on which shape of the polygon unit may be determined in the decoder from the partition type of the polygon unit. Accordingly, in this case, the encoder may not transmit the coordinate information (refer to FIG. 11) on the polygon vertex to the decoder.

Table 7 exemplifies the syntax for the polygon unit partition type.

TABLE 7

|  | Descriptor |
|---|---|
| coding_unit( x0, y0, log2CbSize ) { |  |
|     if( transquant_bypass_enabled_flag ) |  |
|         cu_transquant_bypass_flag | ae(v) |
|     if( slice_type != I ) |  |
|         cu_skip_flag[ x0 ][ y0 ] | ae(v) |
|     nCbS = ( 1 << log2CbSize ) |  |
|     if( cu_skip_flag[ x0 ][ y0 ] ) |  |
|         prediction_unit( x0, y0, nCbS, nCbS ) |  |
|     else { |  |
|         if( slice_type != I ) |  |
|             pred_mode_flag | ae(v) |
|         if( CuPredMode[ x0 ][ y0 ] != MODE_INTRA \|\| log2CbSize == MinCbLog2SizeY ) |  |
|             part_mode | ae(v) |
|         if( CuPredMode[ x0 ][ y0 ] == MODE_INTRA ) { |  |
|             ... |  |
|         } else { |  |
|             if( PartMode == PART_2Nx2N ) |  |
|                 prediction_unit( x0, y0, nCbS, nCbS ) |  |
|             else if( PartMode == PART_2NxN ) { |  |
|                 prediction_unit( x0, y0, nCbS, nCbS / 2 ) |  |
|                 prediction_unit( x0, y0 + ( nCbS / 2 ), nCbS, nCbS / 2 ) |  |
|             } else if( PartMode == PART_Nx2N ) { |  |
|                 prediction_unit( x0, y0, nCbS / 2, nCbS ) |  |
|                 prediction_unit( x0 + ( nCbS / 2 ), y0, nCbS / 2, nCbS ) |  |
|             } else if( PartMode == PART_2NxnU ) { |  |
|                 prediction_unit( x0, y0, nCbS, nCbS / 4 ) |  |
|                 prediction_unit( x0, y0 + ( nCbS / 4 ), nCbS, nCbS * 3 / 4 ) |  |
|             } else if( PartMode == PART_2NxnD ) { |  |
|                 prediction_unit( x0, y0, nCbS, nCbS * 3 / 4 ) |  |
|                 prediction_unit( x0, y0 + ( nCbS * 3 / 4 ), nCbS, nCbS / 4 ) |  |
|             } else if( PartMode == PART_nLx2N ) { |  |
|                 prediction_unit( x0, y0, nCbS / 4, nCbS ) |  |
|                 prediction_unit( x0 + ( nCbS / 4 ), y0, nCbS * 3 / 4, nCbS ) |  |
|             } else if( PartMode == PART_nRx2N ) { |  |
|                 prediction_unit( x0, y0, nCbS * 3 / 4, nCbS ) |  |
|                 prediction_unit( x0 + ( nCbS * 3 / 4 ), y0, nCbS / 4, nCbS ) |  |
|             } else if( PartMode == PART_NxN ) { |  |
|                 prediction_unit( x0, y0, nCbS / 2, nCbS / 2 ) |  |
|                 prediction_unit( x0 + ( nCbS / 2 ), y0, nCbS / 2, nCbS / 2 ) |  |

TABLE 7-continued

| | Descriptor |
|---|---|
| ```
            prediction_unit( x0, y0 + ( nCbS / 2 ), nCbS / 2, nCbS / 2 )
            prediction_unit( x0 + ( nCbS / 2 ), y0 + ( nCbS / 2 ), nCbS / 2, nCbS / 2 )
        } else if( PartMode == PART_nRD ) {
            polygon_prediction_unit( )
        } else if( PartMode == PART_nLD ) {
            polygon_prediction_unit( )
        } else {
            polygon_prediction_unit( )
        }
    }
    if( !pcm_flag[ x0 ][ y0 ] ) {
        if( CuPredMode[ x0 ][ y0 ] != MODE_INTRA &&
            !( PartMode = = PART_2Nx2N && merge_flag[ x0 ][ y0 ] ) )
            rqt_root_cbf
        if( rqt_root_cbf ) {
            MaxTrafoDepth = ( CuPredMode[ x0 ][ y0 ] = = MODE_INTRA ?
                ( max_transform_hierarchy_depth_intra + IntraSplitFlag )
:
                max_transform_hierarchy_depth_inter )
            transform_tree( x0, y0, x0, y0, log2CbSize, 0, 0 )
        }
    }
}
``` | ae(v) |

Referring to Table 7, when calling the PU syntax in the conventional CU syntax, the partition types (PART_nRD, PART_nLD and PART_nCR) of the polygon unit may be additionally called.

A decoder calls the partition mode part_mode when the prediction mode of the current CU is not the intra-mode or the size of the current CU is the minimum CU (CuPredMode[x0][y0]!=MODE_INTRA||log 2CbSize==MinCb Log 2 SizeY).

'part_mode' specifies the partition mode of the current CU as shown in Table 6. The meaning of part_mode is determined based on the prediction mode 'CuPredMode[x0][y0]' of the current CU.

As such, the decoder may determine in which polygon unit partition type the corresponding processing block is partitioned by calling the partition mode part_mode information received from the encoder.

Table 7 exemplifies the case that the syntax element 'polygon_prediction_unit( )' that calls the partition types (PART_nRD, PART_nLD and PART_nCR) of the polygon unit is added when the CU prediction mode is not the intra-mode, that is, the inter-mode (CuPredMode[x0][y0]==MODE_INTER).

That is, when a type is selected from the partition types (PART_nRD, PART_nLD and PART_nCR) of the polygon types, the syntax element 'polygon_prediction_unit( )' that calls the PU of the partition type of the selected polygon unit is added, and the prediction of the prediction block that has the polygon structure of the selected type is performed.

Figure 14:
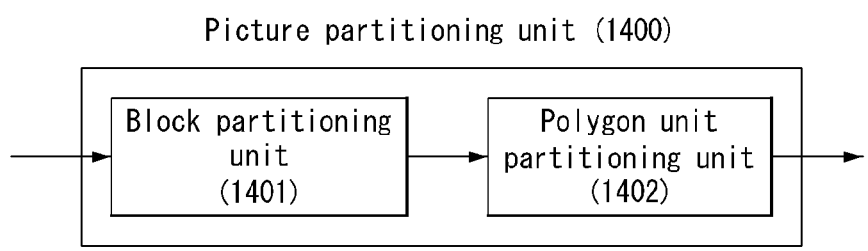
FIG. 14 illustrates a schematic inner block diagram of a picture partitioning unit that performs a polygon unit partition according to an embodiment of the present invention.

FIG. 14 illustrates a schematic inner block diagram of a picture partitioning unit that performs a polygon unit partition according to an embodiment of the present invention.

Referring to FIG. 14, a picture partitioning unit 1400 implements the function, process and/or method proposed in FIG. 3 to FIG. 13 above. Specifically, the picture partitioning unit 1400 may include a block partitioning unit 1401 and a polygon unit partitioning unit 1402.

Herein, the picture partitioning unit 1400 may correspond to the picture partitioning unit 110 shown in FIG. 1.

The block partitioning unit 1401 partitions the input image that is inputted to the encoder by a unit of processing block. Furthermore, the input image is outputted by a unit of processing block.

The polygon unit partitioning unit 1402 receives the input image from the block partitioning unit 1401 by a unit of processing block, and partitions the processing block now being coded by a unit of polygon unit.

Here, the polygon unit partitioning unit 1402 may partition the current processing block into at least one polygon unit by determining the position of at least one point in the processing block now being coded and in each side of the corresponding processing block, and by using at least two points of the vertexes of the processing block currently to be coded and the point determined in each side and the point determined in the current processing block.

In addition, the polygon unit partitioning unit 1402 may select one of predetermined polygon unit partition types, and may partition the processing block currently to be coded into polygon unit in the selected polygon unit partition type.

Meanwhile, as described above, when a processing block is partitioned into the polygon unit, the position information of the determined point inside the processing block and the point determined in each side or the polygon unit partition type information should be forwarded to the decoder.

When the polygon unit partition type is not predetermined, the position information of the determined point inside the processing block and the point determined in each side should be forwarded to the decoder. However, a method for decreasing the amount of information is required since the amount of information is too big to forward the position information for all polygon vertexes.

Accordingly, the present invention proposes a method for predicting the position information of the vertexes that form a polygon unit from the adjacent processing block that is decoded previously or other image (or picture). Accordingly, the case that the polygon unit is not predetermined is assumed in the present invention below.

Figure 15:
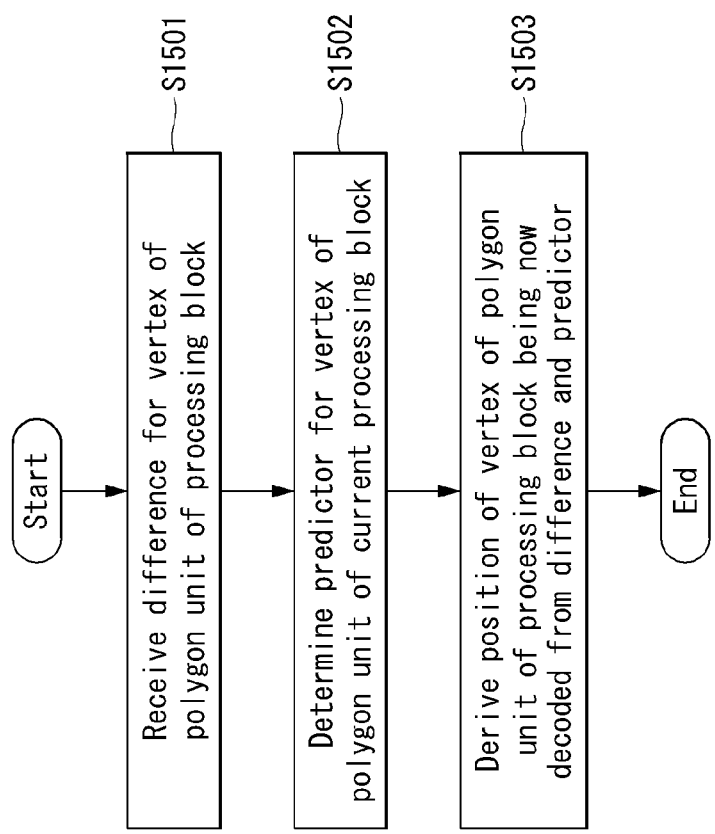
FIG. 15 is a diagram illustrating a decoding method based on a polygon unit according to an embodiment of the present invention.

FIG. 15 is a diagram illustrating a decoding method based on a polygon unit according to an embodiment of the present invention.

Referring to FIG. 15, the decoder receives a difference for the vertex of the polygon unit of the processing block being now decoded from the encoder (step, S1501).

Herein, the difference for the vertex of the polygon unit of the processing block being now decoded means a difference between a predictor for the vertex of the polygon unit of an adjacent processing block that has been decoded previously or the current processing block determined from other picture and a position of the vertex of the polygon unit of the current processing block.

The difference for a vertex of the polygon unit of the processing block being now decoded will be described in more detail below.

The decoder determines a predictor for the vertex of the polygon unit of the processing block being now decoded (step, S1502). Herein, the predictor for the vertex of the polygon unit of the processing block being now decoded may be determined from the adjacent processing block that is decoded previously or other picture in temporal direction.

The predictor for the vertex of the polygon unit of the processing block being now decoded will be described in more detail below.

The decoder derives a position of the vertex of the polygon unit of the processing block being now decoded from the difference and the predictor for the vertex of the polygon unit of the processing block being now decoded (step, S1503).

As such, by deriving the position of the vertex of the polygon unit of the processing block being now decoded, the decoder may determine the polygon unit partition structure of the current processing block. Furthermore, the decoder performs decoding by a unit of polygon based on the polygon unit partition structure of the current processing block which is determined.

Figure 16:
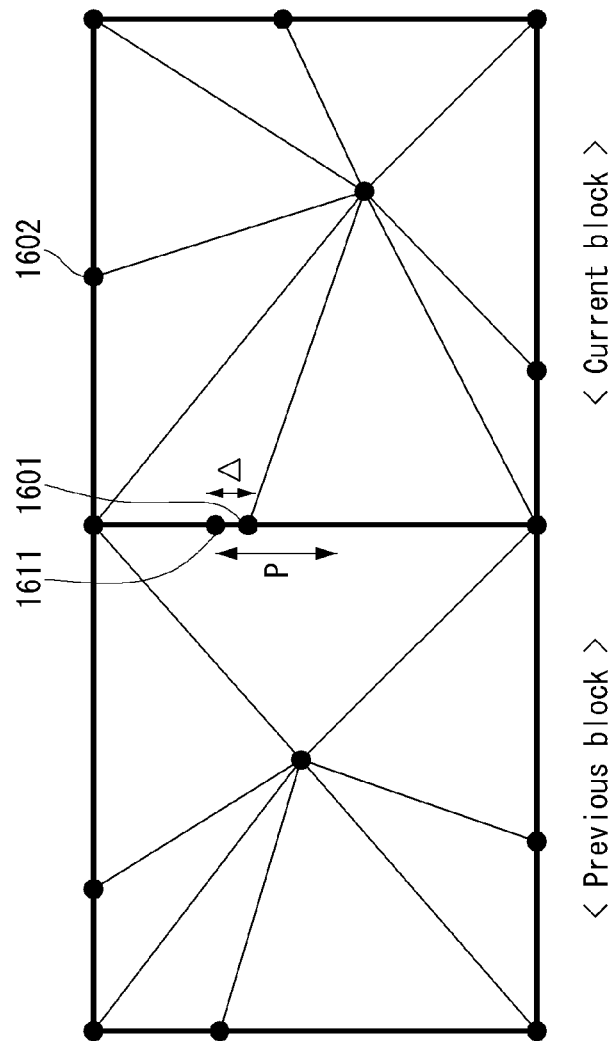
FIG. 16 is a diagram illustrating a prediction method of a polygon unit partition structure according to an embodiment of the present invention.

FIG. 16 is a diagram illustrating a prediction method of a polygon unit partition structure according to an embodiment of the present invention.

Since the probability is high that the same object in the input image belongs to the current processing block and the adjacent processing block, the polygon units generated within each of the processing block may have continuity with each other.

Accordingly, the position information of the polygon unit vertex located in the adjacent side of the adjacent processing block may be used for predicting the position information of the vertex of the current polygon unit. That is, for the vertex of the polygon unit located in a left (upper) side of the current processing block, the position information of the vertex of the polygon unit located in the right (lower) side of an adjacent processing block adjacent to the left (upper) of the current processing block may be used as a predictor.

Referring to FIG. 16, since each of the processing blocks are sequentially encoded/decoded according to the raster scan order, the position information of the vertex of the polygon unit that belongs to the processing block adjacent to the left of the current processing block is already determined.

An encoder determines the position (i.e., coordinate or displacement) of a vertex 1611 of the polygon unit located in the right side of the processing block adjacent to the left that has been decoded previously as a predictor. Furthermore, the encoder transmits the difference Δ between the position predictor of the vertex of the determined polygon unit and the vertex 1601 position of the polygon unit located in the left side of the current processing block to the decoder.

Herein, since the difference is a difference compared with the predictor in the processing block adjacent to the left side, the difference means a difference in the vertical axis direction. On the contrary, the difference with the predictor in the processing block adjacent to the upper side means a difference in the horizontal axis direction.

The decoder receives the difference Δ between the position predictor of the vertex of the polygon unit of the current processing block and the vertex 1601 position of the polygon unit located in the left side of the current processing block. Furthermore, the decoder determines the position information of the vertex 1611 of the polygon unit located in the right side of the processing block adjacent to the left side that is decoded previously as a predictor. Furthermore, the decoder derives the position of the vertex 1601 of the polygon unit of the current processing block based on the received difference Δ and the position predictor of the vertex of the polygon unit which is determined.

In FIG. 16, only the method is exemplified for predicting the position information of the vertex 1601 of the polygon unit located in the left side of the current processing block. However, by using the same method above, the vertex of the polygon unit located in the bottom side of the processing block adjacent to the upper side may be used in order to predict the position information on the vertex 1602 of the polygon unit located in the upper side of the current processing block.

In addition, in order to predict the position information on the vertex of the polygon unit located within the current processing block and on the vertex of the polygon unit located in the right (lower) side of the processing block, the vertex of the polygon unit of the adjacent processing block is unable to be used. Accordingly, the encoder may transmit the displacement value information based on a coordinate value or a center point (or a point located within the processing block).

As such, when the decoder acquires the position information of the vertexes of all polygon units within the current processing block, the decoder may derive the partition structure of the polygon unit in the current processing block.

Table 8 exemplifies the decoding syntax for the prediction process of a polygon unit partition structure.

TABLE 8

|  | Description |
|---|---|
| if (cu_polygon_flag) {  center_pos_x  center_pos_y  if(upper_cu_polygon_available) {   upper_pos_x_off   upper_pos_x = upper_cu_down_pos_x +   upper_pos_x_off  } else {   upper_pos_x  }  right_pos_y  down_pos_x  if(left_cu_polygon_available) {   left_pos_y_off   left_pos_y = left_cu_right_pox_y +   left_pos_y_off  } else {   left_pos_y  } } | ae(v) ae(v) ae(v) ae(v) ae(v) ae(v) ae(v) ae(v) |

Referring to Table 8, for the position (left_pos_y for a left side and upper_pos_x for an upper side) of the vertex of the polygon unit located in the left side and the upper side of the current CU (i.e., processing block), the process which is decoding the displacement (i.e., difference) only for the corresponding position is exemplified by using the vertex position in the adjacent CU as a predictor (predictor).

In Table 8, 'upper_pos_x_off' means the position difference between the vertex of the polygon unit located in the upper side of the current CU and the polygon vertex located in the bottom side of the CU adjacent to the upper side with the current CU. Further, 'left_pos_y_off' means the position difference between the vertex of the polygon unit located in the left side of the current CU and the polygon vertex located in the right side of the CU adjacent to the left side with the current CU.

'upper_cu_down_pos_x' means the position value with the current CU and the polygon vertex located in the bottom side of the CU adjacent to the upper side. In addition, 'left_cu_right_pox_y' means the position value with the current CU and the polygon vertex located in the right side of the CU adjacent to the left side.

For the upper side, it is checked that the vertex position of the polygon unit in the bottom side that is adjacent to the upper side is available (upper_cu_polygon_available). For example, since there is no CU adjacent to the upper side that has been previously decoded for the CU located in the top-left end of an image, the vertex position of the polygon unit of the bottom side of the CU adjacent to the upper side is unable to be used.

Furthermore, using the vertex position upper_cu_down_pos_x of the polygon unit in the bottom side of the CU adjacent to the upper side as a predictor (predictor), by adding a displacement (i.e., a difference; upper_pos_x_off), the vertex position value upper_pos_x of the polygon unit in the upper side of the current CU is derived.

Accordingly, since only the difference upper_pos_x_off from the vertex of the polygon unit located in the adjacent side of the adjacent processing block, not the vertex position value of the polygon unit itself, is coded and decoded, the amount of information may be efficiently decreased.

The coding/decoding method for the polygon partition vertex position left_pos_y in the left side may be performed in the same way above.

Meanwhile, as described above, when the partition structure of the Quad-tree shape (i.e., block mode) and the partition structure of the polygon unit shape (i.e., polygon unit mode) are mixed and used, a current processing block may be adjacent to a plurality of processing blocks, not to a single processing block in the left or upper side. For example, whereas the current processing block has 2N×2N size, the processing block adjacent to the left side may be partitioned in the Quad-tree shape once more and may be two processing blocks of N×N size. In this case, the number of vertexes of the polygon unit for each of the processing blocks that are determined to be in the side adjacent to with each other may be different.

In addition, even when the current processing block has the same size as the adjacent processing block, more vertexes of the polygon unit may be determined in the adjacent processing block than in the current processing block. That is, the number of vertexes of the polygon unit for each of the processing blocks that are determined to be in the side adjacent to with each other may be different.

A method for predicting a polygon unit partition structure in such a case will be described by reference to the following drawing.

Figure 17:
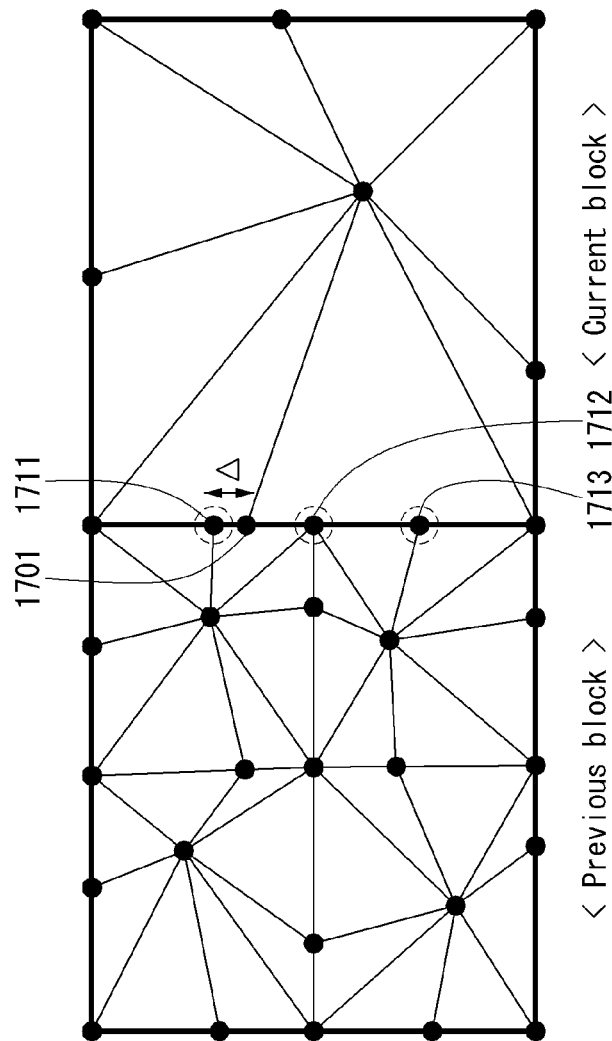
FIG. 17 is a diagram illustrating a prediction method of a polygon unit partition structure according to an embodiment of the present invention.

FIG. 17 is a diagram illustrating a prediction method of a polygon unit partition structure according to an embodiment of the present invention.

FIG. 17 exemplifies the case that the polygon unit partition structure of an adjacent processing block is further subdivided compared to the polygon unit partition structure of the current processing block.

In this case, the predictor that is determined from the position information of the vertexes of a plurality of polygon units located in an adjacent side of an adjacent processing block may be used for predicting the position information of the vertex of the current polygon unit. That is, for the vertex of the polygon unit located in the left (upper) side of the current processing block, the predictor that is determined from the vertex position information of a plurality of polygon units located in the right (lower) side of a processing block adjacent to the left (upper) side of the current processing block.

1) The position information of the polygon unit that is selected from the vertexes of a plurality of polygon units located in an adjacent side of an adjacent processing block may be used for a predictor. Furthermore, the selected polygon unit vertex may be indicated by an indicator. That is, the encoder may transmit the index information of the selected polygon unit vertex to the decoder.

Referring to FIG. 7, the encoder determines the position information of a vertex (e.g., 1711) of a polygon unit among the vertexes 1711, 1712 and 1713 of a plurality of polygon unit that are located in the right side of a processing block adjacent to the left side which has been previously decoded as a predictor. Furthermore, the encoder transmits the difference Δ between the position predictor of the vertex of the determined polygon unit and the vertex 1701 of the polygon unit located in the left side of the current prediction block, and the index information of the selected vertex (e.g., 1711) of the polygon unit to the decoder.

Herein, since the difference is a difference from the predictor in the processing block adjacent to the left side, the difference means a difference in the vertical axis direction. On the contrary, the difference from the predictor in the processing block adjacent to the upper side means a difference in the horizontal axis direction.

The decoder receives the difference Δ between the predictor and the vertex 1701 of the polygon unit located in the left side of the current prediction block, and the index information of the selected polygon unit (e.g., 1711) from the encoder. Furthermore, the decoder determines the position information of the vertex (e.g., 1711) of the selected polygon unit in the processing block adjacent to the left side using the received index information as a predictor. Furthermore, the decoder derives the position of the vertex 1701 of the polygon unit of the current processing block based on the received difference Δ and the determined position predictor of the vertex of the polygon unit.

2) The position information of the polygon unit vertex located in an adjacent side of an adjacent processing block may be transformed to a displacement value based on a center point, and a representative value (e.g., average value or median value) may be used for the predictor from the displacement values.

Herein, the center point designates a center in an adjacent side (the left side of the current processing block or the right side of the left processing block in FIG. 17) between adjacent processing blocks.

Referring to FIG. 17, the encoder determines the representative value (e.g., average value or median value) for the displacements of the vertexes 1711, 1712 and 1713 of a plurality of polygon unit that are located in the right side of the processing block adjacent to the left side which has been previously decoded as a predictor. Furthermore, the encoder transmits the difference Δ between the position predictor of the vertex of the determined polygon unit and the vertex 1701 of the polygon unit located in the left side of the current prediction block to the decoder.

The decoder receives the difference Δ between the predictor and the vertex 1701 of the polygon unit located in the left side of the current prediction block. Furthermore, the decoder determines the representative value (e.g., average value or median value) for the displacements of the vertexes 1711, 1712 and 1713 of a plurality of polygon unit within a processing block adjacent to the left side as a predictor. Furthermore, the decoder derives the position of the vertex 1711 of the polygon unit of the current processing block based on the received difference Δ and the determined position predictor of the vertex of the polygon unit.

3) The position information of the polygon unit vertex located in the left (upper) side of the current processing block and a plurality of polygon unit vertexes that are located in an adjacent side of an adjacent processing block is transformed into a displacement value based on a center point.

Herein, the center point designates a center in an adjacent side (the left side of the current processing block or the right side of the left processing block in FIG. 17) between adjacent processing blocks.

Furthermore, a predictor is a point, which is the smallest in difference of the displacement absolute values with the polygon unit vertex located in the left (upper) side of the current processing block among a plurality of polygon unit vertexes located in an adjacent side of an adjacent processing block.

Referring to FIG. 17, the encoder determines the point (e.g., 1711) of which difference of the displacement absolute values with the polygon unit vertex of the left side of the current processing block among the vertexes 1711, 1712 and 1713 of a plurality of polygon unit that are located in the right side of a processing block adjacent to the left side which has been previously decoded as a predictor. Furthermore, the encoder transmits the difference Δ between the determined position predictor and the vertex 1701 of the polygon unit in the left side of the current prediction block, and the index information of the selected vertex (e.g., 1711) of the polygon unit as the decoder.

The decoder receives the difference Δ between the predictor and the vertex 1701 of the polygon unit located in the left side of the current prediction block, and the index information of the selected polygon unit (e.g., 1711) from the encoder. Furthermore, the decoder determines the position information of the vertex (e.g., 1711) of the selected polygon unit in the processing block adjacent to the left side using the received index information as a predictor. Furthermore, the decoder derives the position of the vertex 1711 of the polygon unit of the current processing block based on the received difference Δ and the determined position predictor of the vertex of the polygon unit.

In FIG. 17, only the method is exemplified for predicting the position information of the vertex 1701 of the polygon unit located in the left side of the current processing block. However, by using the same method above, the vertex of the polygon unit located in the bottom side of the processing block adjacent to the upper side may be used in order to predict the position information on the vertex of the polygon unit located in the upper side of the current processing block.

In addition, in order to predict the position information on the vertex of the polygon unit located within the current processing block and on the vertex of the polygon unit located in the right (lower) side of the processing block, the vertex of the polygon unit of the adjacent processing block is unable to be used. Accordingly, the encoder may transmit the displacement value information based on a coordinate value or a center point (or a point located within the processing block).

As such, when the decoder acquires the position information of the vertexes of all polygon units within the current processing block, the decoder may derive the partition structure of the polygon unit in the current processing block.

Table 9 exemplifies the decoding syntax for a prediction process of a polygon unit partition structure.

TABLE 9

| | Descriptor |
|---|---|
| if (cu_polygon_flag) { | |
|     center_pos_x | ae(v) |
|     center_pos_y | ae(v) |
|     if(upper_cu_polygon_available) { | |
|         if(num_of_upper_pos_x_pred_cand > 1) { | |
|             upper_pos_x_pred_idx | ae(v) |
|         } else { | |
|             upper_pos_x_pred_idx = 0 | |
|         } | |
|         upper_pos_x_off | ae(v) |
|         upper_pos_x = upper_pos_x_pred_cand | |
|         [upper_pos_x_pred_idx] + | |
|     upper_pos_x_off | |
|     } else { | |
|         upper_pos_x | ae(v) |
|     } | |
|     right_pos_y | ae(v) |
|     down_pos_x | ae(v) |
|     if(left_cu_polygon_available) { | |
|         if(num_of_left_pos_y_pred_cand > 1) { | |
|             left_pos_y_pred_idx | |
|         } else { | |
|             left_pos_y_pred_idx = 0 | |
|         } | |
|         left_pos_y_off | ae(v) |
|         left_pos_y = left_pos_y_pred_cand | |
|         [left_pos_y_pred_idx] + | |
|     left_pos_y_off | |
|     } else { | |
|         left_pos_y | ae(v) |
|     } | |
| } | |

Referring to Table 9, Table 9 exemplifies a process of determining a predictor by decoding an index for designating one among candidates, when there are several predictor (predictor) candidates for a polygon unit vertex position.

In Table 9, 'upper_pos_x_off' means the position difference between the vertex of the polygon unit located in the upper side of the current CU (i.e., processing block) and the polygon vertex located in the bottom side of the CU adjacent to the upper side with the current CU. Further, 'left_pos_y_off' means the position difference between the vertex of the polygon unit located in the left side of the current CU and the polygon vertex located in the right side of the CU adjacent to the left side with the current CU.

In addition, 'upper_pos_x_pred_idx' is an index for predicting the vertex position of the polygon in the upper side of the current CU, and 'left_pos_y_pred_idx' is an index for predicting the vertex position of the polygon in the left side of the current CU.

In this case, when there is one available predictor (predictor) candidate, the corresponding index may not be signaled.

Furthermore, in the case that only one candidate is left by obtaining the average or a median value with several prediction predictors, it is not required to send an index (Table 3).

For the upper side, it is checked that the vertex position of the polygon unit in the bottom side that is adjacent to the upper side is available (upper_cu_polygon_available). For example, since there is no CU adjacent to the upper side that is previously decoded for the CU located in the top-left end of an image, the vertex position of the polygon unit of the bottom side of the CU adjacent to the upper side is unable to be used.

Furthermore, when there is a plurality of predictor candidates within a processing block adjacent to the upper side (num_of_upper_pos_x_pred_cand>1), 'upper_pos_x_pred_idx' value is determined, and otherwise, 'upper_pos_x_pred_idx' is set to zero.

Furthermore, using the polygon vertex position (upper_pos_x_pred_cand [upper_pos_x_pred_idx]) in the bottom side of the CU adjacent to the upper side that is indicated by 'upper_pos_x_pred_idx' as a predictor (predictor), the vertex position value upper_pos_x is derived by adding a displacement (i.e., difference) upper_pos_x_off.

The coding/decoding method for the polygon partition vertex position left_pos_y in the left side may be performed in the same way above.

Meanwhile, the size of the current processing block may be smaller than the size of the processing block adjacent to the left side or the upper side. For example, whereas the current processing block has N×N size, the processing block adjacent to the left side may have 2N×2N size. In this case, the number of vertexes of the polygon unit for each of the processing blocks that are determined to be in an adjacent side with each other may be different.

In addition, even when the current processing block has the same size as the adjacent processing block, more vertexes of the polygon unit may be determined in the adjacent processing block than in the current processing block. That is, the number of vertexes of the polygon unit for each of the processing blocks that are determined to be in an adjacent side with each other may be different.

A method for predicting a polygon unit partition structure in such a case will be described by reference to the following drawing.

Figure 18:
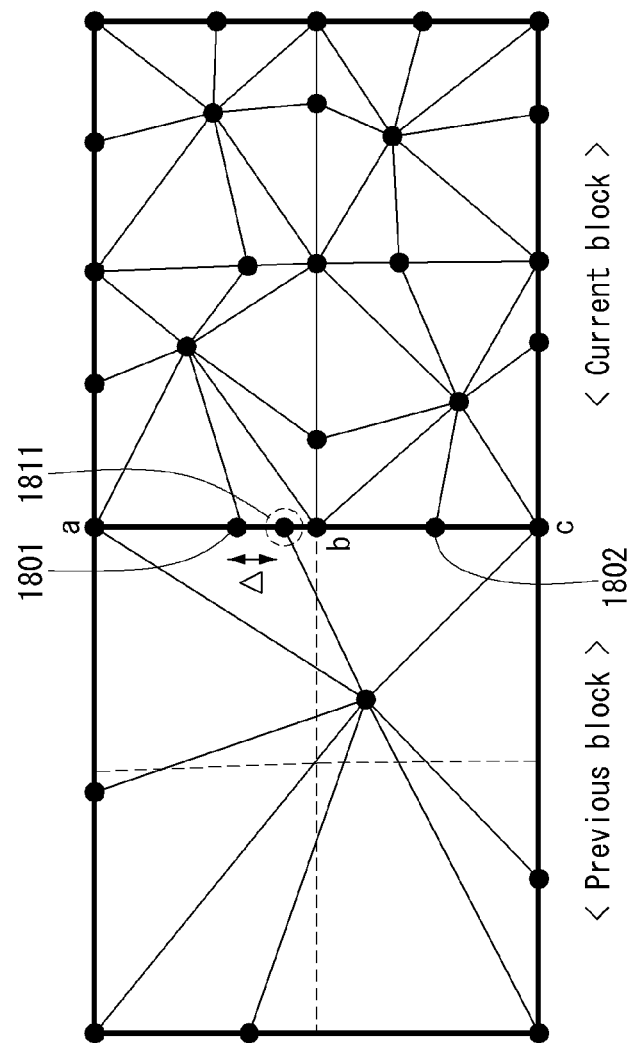
FIG. 18 is a diagram illustrating a prediction method of a polygon unit partition structure according to an embodiment of the present invention.

FIG. 18 is a diagram illustrating a prediction method of a polygon unit partition structure according to an embodiment of the present invention.

FIG. 18 exemplifies the case that the polygon unit partition structure of the current processing block is further subdivided than the polygon unit partition structure of an adjacent processing block.

In this case, the predictor that is determined from the position information of the polygon unit vertexes located in an adjacent side of an adjacent processing block may be used for predicting the position information of the vertex of the current polygon unit. That is, for a part of a plurality of polygon unit vertexes that are located in the left (upper) side of the current processing block, the predictor that is determined from the position information of the polygon unit vertex located in the right (lower) side of a processing block adjacent to the left (upper) side is used.

More specifically, each of the vertexes of a plurality of polygon units that are determined in the left (upper) side of the current processing block may have an available range of a displacement value (i.e., a range in which a vertex of the polygon unit may be located), and may be predicted only in the case that the polygon unit vertex located in an adjacent side of an adjacent processing block is included within the available range of a displacement value.

In other words, the position information of the polygon unit vertex located in the left (upper) side of the current processing block may be predicted from the polygon unit vertex of the adjacent processing block that belongs to the range in which it may be located.

Referring to FIG. 18, it is assumed that the upper end vertex in the left side of the current processing block is referred to as 'a', the vertex at the lower end is referred as 'c', and the center point of the left side is referred to as 'b'. Here, each of the polygon unit vertexes 1801 and 1802 located in the left side of the current processing block has a range in which it may be located. That is, the polygon unit vertex 1801 may be located between 'a' and 'b', and the polygon unit vertex 1802 may be located between 'b' and 'c'.

Since the polygon unit vertex 1811 located in the right side of a processing block adjacent to the left side is located between 'a' and 'b', in order to predict the polygon unit vertex 1801 of the current processing block, the polygon unit vertex 1811 position of the adjacent processing block may be used.

An encoder determines the vertex 1811 of the polygon unit located in the right side of the processing block adjacent to the left side which has been previously decoded to belong to which an available range (a-b) of a displacement value of a polygon vertex among the left polygon vertexes of the current processing block. Furthermore, the encoder determines the position information of the vertex 1811 of the polygon unit located in the right side of the processing block adjacent to the left side which has been previously decoded as the predictor for the polygon unit vertex 1801 located in the corresponding displacement value range (a-b) among the left polygon vertexes of the current processing block. Furthermore, the encoder transmits the difference Δ between the determined predictor and the vertex 1801 of the polygon unit located in the corresponding displacement value range (a-b) to the decoder.

Herein, since the difference is a difference from the predictor in the processing block adjacent to the left side, the difference means a difference in a vertical axis direction. On the contrary, the difference from the predictor in the processing block adjacent to the upper side means a difference in a horizontal axis direction.

The decoder receives the difference Δ between the predictor and the vertex 1801 of the polygon unit located in the left side of the current prediction block from the encoder. Furthermore, the decoder determines the position information of the vertex (e.g., 1811) of the selected polygon unit in the processing block adjacent to the left side. Furthermore, the decoder derives the position of the vertex 1801 of the polygon unit of the current processing block based on the received difference Δ and the determined position predictor of the vertex of the polygon unit.

On the other hand, the position of the polygon unit vertex 1802 in which the polygon unit vertex of the adjacent processing block is not included within the available displacement among the polygon unit vertexes 1801 and 1802 of the current processing block may not be predicted using the point of the adjacent processing block. Accordingly, the position of the polygon unit vertex 1802 may be indicated by the displacement value based on the coordinate value or the center point (or a point located in the processing block). Similarly, the position information of the polygon unit vertex located within the current processing block and the polygon unit vertex located in the right (lower) side of the processing block may also be indicated by the displacement value based on the coordinate value or the center point (or a point located in the processing block).

In FIG. 18, only the method is exemplified for predicting the position information of the vertex 1801 of the polygon unit located in the left side of the current processing block. However, by using the same method above, the vertex of the polygon unit located in the bottom side of the processing block adjacent to the upper side may be used in order to predict the position information on the vertex of the polygon unit located in the upper side of the current processing block.

Table 10 exemplifies the decoding syntax for a prediction process of a polygon unit partition structure.

TABLE 10

| | Descriptor |
|---|---|
| if (cu_polygon_flag) { | |
|     center_pos_x | ae(v) |
|     center_pos_y | ae(v) |
|     if(upper_cu_polygon_available) { | |
|         upper_pos_x_off | ae(v) |
|         upper_pos_x = upper_pos_x_pred + upper_pos_x_off | |
|     } else { | |
|         upper_pos_x | ae(v) |
|     } | |
|     right_pos_y | ae(v) |
|     down_pos_x | ae(v) |
|     if(left_cu_polygon_available) { | |
|         left_pos_y_off | ae(v) |
|         left_pos_y = left_pos_y_pred + left_pos_y_off | |
|     } else { | |
|         left_pos_y | ae(v) |
|     } | |
| } | |

Referring to Table 10, 'upper_pos_x_off' means the position difference between the vertex of the polygon unit located in the upper side of the current CU (i.e., processing block) and the polygon vertex located in the bottom side of the adjacent CU to the upper side with the current CU. Further, 'left_pos_y_off' means the position difference between the vertex of the polygon unit located in the left side of the current CU and the polygon vertex located in the right side of the adjacent CU to the left side with the current CU.

'upper_pos_x_pred' means the position value of the polygon vertex located at the bottom side of the CU adjacent to the upper side of the current CU. 'left_pos_y_pred' means the position value of the polygon vertex located in the right side of the CU adjacent to the left side of the current CU.

For the upper side, it is checked that the vertex position of the polygon unit in the bottom side that is adjacent to the upper side is available (upper_cu_polygon_available). When the polygon vertex of the bottom side of the CU adjacent to the upper side belongs to the available range of a displacement value of the polygon vertex in the upper side of the current CU, '1' may be indicated. On the contrary, when the polygon vertex of the bottom side of the CU adjacent to the upper side does not belong to the available range of a displacement value of the polygon vertex in the upper side of the current CU, '0' may be indicated.

Furthermore, using the polygon vertex position (upper_pos_x_pred) in the bottom side of the CU adjacent to the upper side as a predictor (predictor), the vertex position value upper_pos_x in the upper side of the current CU is derived by adding a displacement (i.e., difference) upper_pos_x_off.

The coding/decoding method for the polygon partition vertex position left_pos_y in the left side may be performed in the same way above.

Meanwhile, as described above, when the partition structure of the Quad-tree shape (i.e., block mode) and the partition structure of the polygon unit shape (i.e., polygon unit mode) are mixed and used, the block mode and the polygon unit mode may be determined by a unit of the processing block. Even in this case, the partition point of the adjacent processing block may be used for predicting the polygon unit vertex within the processing block to which the polygon unit mode is applied. This will be described by reference to the following drawing.

Figure 19:
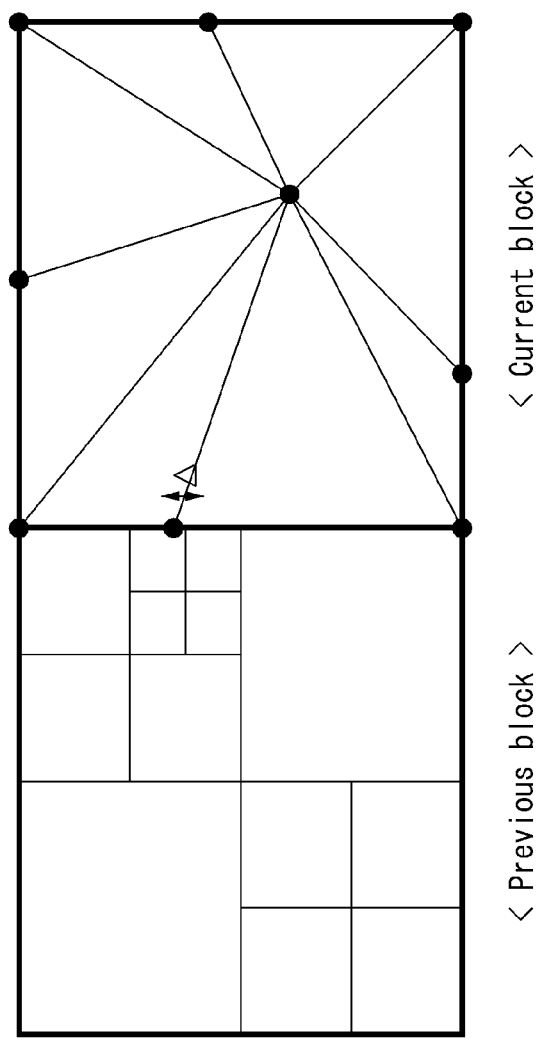
FIG. 19 is a diagram illustrating a prediction method of a polygon unit partition structure according to an embodiment of the present invention.

FIG. 19 is a diagram illustrating a prediction method of a polygon unit partition structure according to an embodiment of the present invention.

FIG. 19 exemplifies the case that the polygon unit mode is applied to the current processing block, and the block mode is applied to the processing block adjacent to the left side.

In this case, by assuming that an adjacent processing block is partitioned in the polygon unit mode even though the block mode is applied to the adjacent processing block, the description above by reference to FIG. 16 to FIG. 18 may be applied in the same way.

In other words, when the number of block partition point in an adjacent side of an adjacent processing block in the left (upper) side is the same as the number of point located in an adjacent side of the current processing block, the method according to the example of FIG. 16 may be applied in the same way. Similarly, when the number of block partition point in an adjacent side of an adjacent processing block in the left (upper) side is more than the number of point located in an adjacent side of the current processing block, the method according to the example of FIG. 17 may be applied in the same way. In addition, when the number of block partition point in an adjacent side of an adjacent processing block in the left (upper) side is less than the number of point located in an adjacent side of the current processing block, the method according to the example of FIG. 18 may be applied in the same way.

That is, when the adjacent processing block is partitioned in the polygon mode, and the vertex of the polygon unit and the adjacent processing block are partitioned in the block mode in FIG. 16 to FIG. 18 above, the block partition point plays the same role in that the block partition point distinguishes all processing blocks into subdivided units (i.e., polygon unit or lower level block). Accordingly, the 'vertex of the polygon unit' and the 'block partition point' mentioned in this specification may be commonly referred to as a 'partition point'.

Meanwhile, so far the method is described for predicting the polygon unit partition structure of a current processing block spatially from an adjacent processing block, but the polygon unit partition structure of a current processing block may be temporally predicted. In this specification, the block that is temporally used as the prediction information of the polygon unit partition structure is referred to as a 'prediction block'. This will be described by reference to the following drawing.

Figure 20:
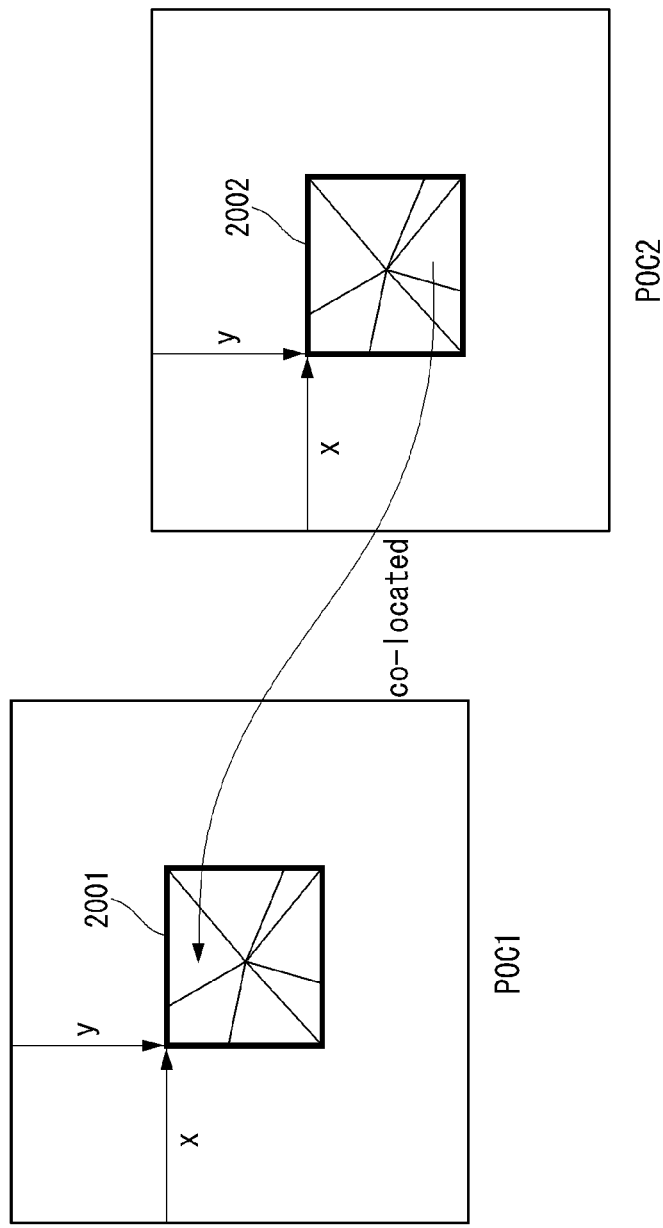
FIG. 20 is a diagram illustrating a prediction method of a polygon unit partition structure according to an embodiment of the present invention.

FIG. 20 is a diagram illustrating a prediction method of a polygon unit partition structure according to an embodiment of the present invention.

In FIG. 20, it is assumed that the picture including a current processing block 2002 is picture order count (POC) 2 and the picture including a prediction block 2001 is POC 1.

Referring to FIG. 20, in order to determine the polygon unit partition structure for the current processing block 2002, the polygon unit partition structure information may be used as a predictor for the prediction block 2001 that is co-located in the same position with the other picture in the temporal direction.

An encoder determines the position (i.e., coordinate or displacement) of the vertex of the polygon unit within the prediction block 2001 that is co-located with the picture previously decoded as the predictor. Furthermore, the encoder transmits the difference between the determined predictor and the vertex position of the polygon unit within the current processing block to the decoder.

Here, since the difference is determined from the prediction block that is co-located with the other picture, the difference for the vertex of the left side/right side means the difference in a vertical axis and the difference for the vertex of the upper side/bottom side means the difference in a horizontal axis. And the difference for the vertex of the polygon unit within the processing block means the difference in the vertical axis and the horizontal axis.

In this case, in order for the decoder to distinguish the pictures that include the prediction block 2001, the picture index (e.g., POC) is required to distinguish the information in a temporal direction (i.e., prediction direction) for the picture used for a prediction and the prediction block 2001. Accordingly, the encoder transmits the picture index (e.g., POC) that includes the prediction block 2001 and the prediction direction information to the decoder.

The decoder receives the difference Δ between the vertex position of the polygon unit within the current processing block 2002 and the predictor for it, the picture index that includes the prediction block 2001 and the prediction direction information. Furthermore, the decoder determines the polygon unit vertex position information co-located within the prediction block 2001 as the predictor using the picture index and the prediction direction information. Furthermore, the decoder derives the position of the vertex of the polygon unit of the current processing block 2002 based on the received difference Δ and the determined predictor.

As such, the decoder may derive the partition structure of the polygon unit within the current processing block by deriving the position information of the vertexes of all polygon units within the current processing block.

Meanwhile, when satisfying the condition (i.e., the condition under a predetermined threshold value) that the motion vector value is close to zero for each of the polygon units within the current processing block, the prediction in the temporal direction as above may be used for predicting the vertex of the polygon unit of the current processing block.

Table 11 exemplifies the decoding syntax for a prediction process of a polygon unit partition structure.

TABLE 11

| | Descriptor |
|---|---|
| if (cu_polygon_flag) { | |
| ...... | |
| if(derive_polygon_partition_info_from_collocated_cu) { | |
|     center_pos_x_pred = collocated_center_pos_x | |
|     center_pos_y_pred = collocated_center_pos_y | |
|     upper_pos_x_pred = collocated_upper_pos_x | |
|     right_pos_y_pred = collocated_right_pos_y | |
|     down_pos_x_pred = collocated_down_pos_x | |
|     left_pox_y_pred = collocated_left_pos_y | |

TABLE 11-continued

| | Descriptor |
|---|---|
| if(merge_flag[ x0 ][ y0 ]) { | |
|     center_pos_x_off = 0 | |
|   center_pos_y_off = 0 | |
| upper_pos_x_off = 0 | |
|     right_pos_y_off = 0 | |
|     down_pos_x_off = 0 | |
| left_pox_y_off = 0 | |
|   } else { | |
|     center_pos_x_off | ae(v) |
| center_pos_y_off | ae(v) |
| upper_pos_x_off | ae(v) |
| right_pos_y_off | ae(v) |
| down_pos_x_off | ae(v) |
| left_pox_y_off | ae(v) |
|   } | |
| center_pos_x = center_pos_x_pred + center_pos_x_off | |
| center_pos_y = center_pos_y_pred + center_pos_y_off | |
| upper_pos_x = upper_pos_x_pred + upper_pos_x_off | |
| right_pos_y = right_pos_y_pred + right_pos_y_off | |
| down_pos_x = down_pos_x_pred + right_pos_y_off | |
| left_pox_y = left_pox_y_pred + left_pox_y_off | |
|   } else { | |
|     ... | |
|   } | |
| ...... | |

In FIG. 11, each of 'center_pos_x_pred' and 'center_pos_y_pred' represents a predictor of the horizontal direction and the vertical direction respectively for the polygon vertex that is determined in the current CU (that is, the processing block). In the same manner, each of the 'upper_pos_x_pred' and 'down_pos_x_pred' represents a predictor of the horizontal direction for the polygon vertexes that are determined in the upper side and the bottom side of the current CU, and each of the 'right_pos_y_pred' and 'left_pox_y_pred' represents a predictor of the vertical direction for the polygon vertexes that are determined in the upper side and the bottom side of the current CU.

Furthermore, each of the 'collocated_center_pos_x' and 'collocated_center_pos_y' represents a position of the horizontal direction and the vertical direction (i.e., coordinate or displacement) of the polygon vertexes that are determined in inside of the prediction CU, respectively. Likewise, each of the 'collocated_upper_pos_x' and 'collocated_down_pos_x' represents a position of the horizontal direction (i.e., coordinate or displacement) of the polygon vertexes that are determined in the upper side and the bottom side of the prediction CU respectively, and each of the 'collocated_right_pos_y', 'collocated_left_pos_y' represents a position of the horizontal direction (i.e., coordinate or displacement) of the polygon vertexes that are determined in the right side and the left side of the forecasting CU respectively.

Each of the 'center_pos_x_off' and 'center_pos_y_off' represents a difference of the horizontal and vertical direction between the polygon vertexes inside of the current CU and the prediction CU respectively. Similarly, each of the 'upper_pos_x_off' and 'down_pos_x_off' represents a difference of the horizontal direction between the polygon vertexes of the upper side and the bottom side inside of the current CU and the prediction CU respectively, and each of the 'right_pos_y_off' and 'left_pox_y_off' represents a difference of the vertical direction between the polygon vertexes of the right side and the left side inside of the current CU and the prediction CU, respectively.

'derive_polygon_partition_info_from_collocated_cu' indicates whether to use the information of the polygon partition of the prediction CU co-located with the temporal direction as a predictor (predictor). When the co-located prediction CU is coated in a polygon mode, 'derive_polygon_partition_info_from_collocated_cu' may be set to 1. When 'derive_polygon_partition_info_from_collocated_cu' is set to 1, the polygon vertex position of the prediction CU is determined as a predictor (predictor) for the polygon vertex of the current CU.

'merge_flag[x0][y0]' is a flag that indicates a merge mode, and an offset value (i.e., a difference) for the vertex position of the polygon unit is set to be different depending on the flag value. When 'merge_flag[x0][y0]' is '1', the offset value is allocated for each of the positions of the polygon vertexes, otherwise, the offset value is separately allocated for each of the positions of the corresponding polygon vertexes. That is, the position offset value (i.e., a difference) is transmitted from the encoder to the decoder for each of the vertexes of the polygon unit.

Furthermore, the final position of the polygon vertex of the current CU is decoded by adding a predictor (predictor) and an offset value.

On the other hand, when 'derive_polygon_partition_info_from_collocated_cu' is '0', another prediction method is used, or a prediction is not applied.

In addition, a motion vector (MV) of the polygon unit of the current processing block may be predicted from an adjacent processing block (or polygon unit) that has been previously decoded or a prediction block (or polygon unit) of another picture.

Figure 21:
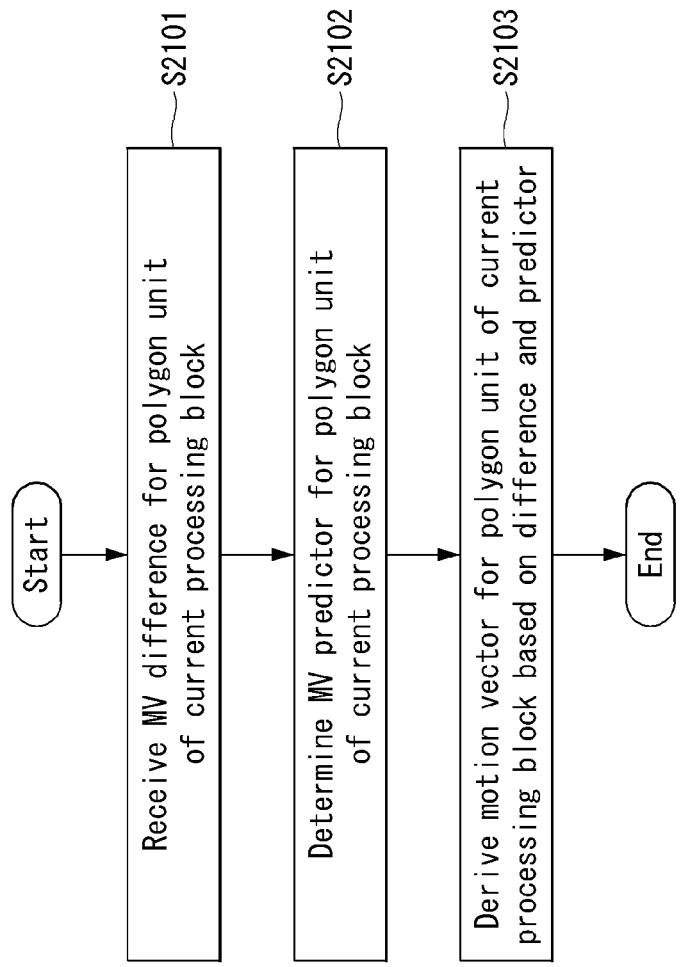
FIG. 21 is a diagram illustrating a decoding method based on a polygon unit according to an embodiment of the present invention.

FIG. 21 is a diagram illustrating a decoding method based on a polygon unit according to an embodiment of the present invention.

Referring to FIG. 21, the decoder receives a MV difference for the polygon unit of the current processing block from the encoder (step, S2101).

Herein, the MV difference of the polygon unit of the processing block being now decoded, means a difference between a predictor (predictor) determined from an adjacent processing block (or polygon unit) that has been previously decoded or a prediction block (or polygon unit) of another picture, and a motion vector of the polygon unit of the current processing block.

Further details will be described below for the MV difference of the polygon unit of the processing block being now decoded.

A decoder determines a MV predictor (predictor) of the polygon unit of the processing block that is currently decoded (step, S2102).

Herein, the MV predictor of the polygon unit of the processing block being now decoded may be determined from an adjacent processing block (or polygon unit) that has been previously decoded or a prediction block (or polygon unit) of another picture.

Additionally, an MV predictor of the polygon unit of the processing block being now decoded may be determined by a unit of the polygon unit or by a unit of the processing block.

Further details will be described below for the MV predictor of the polygon unit of the processing block being now decoded.

Based on an MV difference and a predictor of the polygon unit of the processing block being now decoded, a motion vector for the polygon unit of the processing block being now decoded is derived (step, S2103).

As such, by drawing the motion vector for the polygon unit of the processing block being now decoded, the decoder may decode the processing block by a unit of the polygon unit.

Referring to FIG. 20 again, in order to determine a motion vector for each of the polygon unit within the current processing block 2002, the motion vector for the prediction block 2001 co-located with another picture may be used as a predictor.

An encoder determines the motion vector of each polygon unit of the prediction block 2001 co-located with the picture that has been previously decoded as a predictor. Furthermore, the encoder transmits a difference Δ between the predictor determined and the motion vector of the polygon unit within the current processing block to the decoder.

Herein, the difference Δ for the motion vector means a two-dimensional difference of the vertical and horizontal directions.

In addition, the encoder transmits the picture index (e.g., POC) that includes the prediction block 2001 and the information of the temporal direction (i.e., a prediction direction) of the picture that is used for the prediction to the decoder.

The decoder receives the difference Δ between the motion vector of the polygon unit within the current processing block 2002 and the predictor for it, the picture index that includes the prediction block 2001 and the prediction direction information. Furthermore, the decoder determines the motion vector for the polygon unit co-located within the prediction block 2001 as the predictor using the picture index and the prediction direction information. Furthermore, the decoder derives the motion vector of the polygon unit of the current processing block 2002 based on the received MV difference Δ and the determined MV predictor.

As such, the decoder may decode the current processing block by a unit of the polygon unit by deriving the motion vector of all polygon units within the current processing block.

Table 12 exemplifies the decoding syntax for a motion vector prediction process of a polygon unit.

TABLE 12

| | Descriptor |
|---|---|
| if (cu_polygon_flag) {<br>......<br>  if(derive_polygon_motion_info_from_collocated_cu) {<br>    for(i = 0;i < 8;i++) {<br>      polygon_mv_x_pred[ i ] =<br>      collocated_polygon_mv_x[ i ]<br>      polygon_mv_y_pred[ i ] =<br>      collocated_polygon_mv_y[ i ]<br>    }<br>    if(merge_flag[ x0 ][ y0 ]) {<br>      for(i = 0;i < 8;i++) {<br>        polygon_mv_x_off[ i ] = 0<br>        polygon_mv_y_off[ i ] = 0<br>      }<br>    } else {<br>      for(i = 0;i < 8;i++) {<br>        polygon_mv_x_off[ i ]<br>        polygon_mv_y_off[ i ]<br>      }<br>    }<br>    for(i = 0;i < 8;i++) {<br>      polygon_mv_x[ i ] =<br>      polygon_mv_x_pred[ i ] +<br>polygon_mv_x_off[ i ] | <br><br><br><br><br><br><br><br><br><br><br><br><br><br><br><br>ae(v)<br>ae(v) |

TABLE 12-continued

| | Descriptor |
|---|---|
| polygon_mv_y[ i ] =<br>polygon_mv_y_pred[ i ] +<br>polygon_mv_y_off[ i ]<br>}<br>} else {<br>...<br>}<br>...... | |

In Table. 12, 'polygon_mv_x_pred[i]' and 'polygon_mv_y_pred[i]' represent a MV predictor for each of the polygon units of the current CU (i.e., the processing block). Furthermore, 'collocated_polygon_mv_x[i]' and 'collocated_polygon_mv_y[i]' represent a MV predictor for each polygon units of the prediction CU co-located with the current CU. Furthermore, 'polygon_mv_x_off[i]' and 'polygon_mv_y_off[i]' represent a MV difference of the polygon unit of the current CU and the polygon unit of the prediction CU. Additionally, 'polygon_mv_x[i]' and 'polygon_mv_y[i]' represent a motion vector value for each of the polygon units of the current CU.

'derive_polygon_motion_info_from_collocated_cu' indicates whether to use the MV value of the prediction CU co-located with the temporal direction. When the co-located prediction CU is coated in a polygon mode, 'derive_polygon_motion_info_from_collocated_cu' may be set to 1.

Similar to the prediction of the polygon unit partition structure, 'merge_flag[x0][y0]' is a flag that indicates a merge mode, and an offset value (i.e., a difference) for the motion vector of the polygon unit is set to be different depending on the flag value. When 'merge_flag[x0][y0]' is '1', the offset value is allocated to be zero for each of the polygon units, otherwise, the offset value is separately allocated for each of the corresponding polygons. In this case, the MV offset value (i.e., a difference) for each of the polygon units is transmitted from the encoder to the decoder.

In Table 12, by assuming that eight polygon units (R1~R8) are constructed to maximum for a single CU, for loop made up of eight repetition is performed. However, this is just an example, a single CU may include the fewer number of polygon units when adjacent polygon units are merged, as exemplified in FIG. 8 above. In this case, for loop may be performed, that is repeated as many as the number of polygon units that construct the corresponding CU.

In the example of FIG. 20 above, the motion vector is predicted for each polygon unit. However, in order to predict the motion vector for each polygon unit, the polygon unit of the same shape is required for the picture that is previously decoded for predicting the predictor.

However, as exemplified by FIG. 12 and FIG. 13 above, when a regular shape of polygon unit partition type is predetermined, it may be easy to find the polygon unit of the same shape in the other picture temporally, but when each of the vertexes of the polygon unit is changeably determined as shown in FIG. 5 to FIG. 12, it may be difficult to find the polygon unit of the same shape in the other picture temporally.

Accordingly, the motion vector may be predicted by a unit of the processing block, and this will be described by reference to the following drawing.

Figure 22:
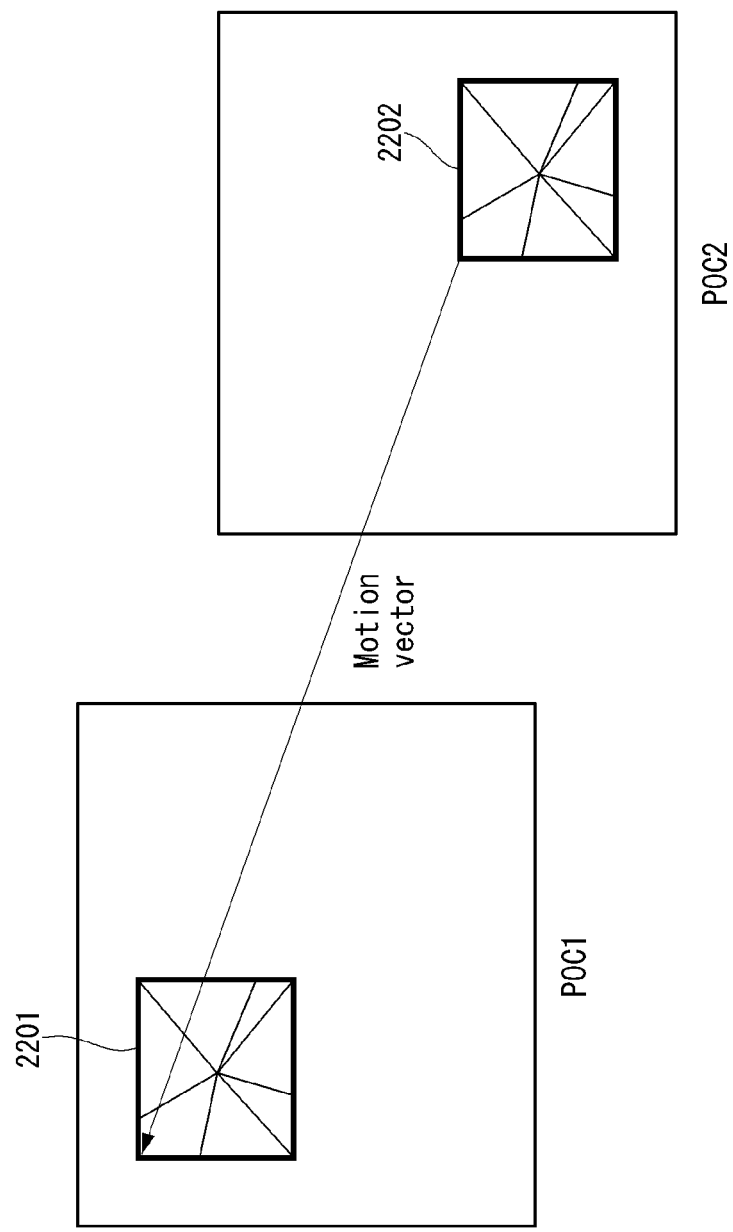
FIG. 22 is a diagram illustrating a prediction method of a motion vector of a polygon unit according to an embodiment of the present invention.

FIG. 22 is a diagram illustrating a prediction method of a motion vector of a polygon unit according to an embodiment of the present invention.

In FIG. 22, it is assumed that the picture including a current processing block 2202 is picture order count (POC) 2, and the picture including a prediction block 2201 is POC 1.

Referring to FIG. 22, in order to determine the motion vector for the current processing block 2202, the motion vector value for the prediction block 2201 in a temporal direction may be utilized for the prediction.

An encoder determines the prediction block 2201 of which rate-distortion cost has the minimum value among the candidate blocks that are available for the inter-prediction. Furthermore, an amount of displacement of the position of the prediction block 2201, that is, a motion vector value is determined based on the position of the current processing block 2202. That is, the motion vector predictor that is applied to each polygon unit in the current processing block 2202 corresponds to the motion vector value that is determined by a unit of the current processing block 2202. In other words, the motion vector of the processing block corresponds to the motion vector predictor in an aspect of each polygon unit. Accordingly, hereinafter, the motion vector of the processing block is referred to as the motion vector predictor.

Furthermore, the encoder transmits the difference Δ between the determined motion vector predictor and the motion vector value for each polygon unit in the current processing block to the decoder. In addition, the encoder transmits the picture index (e.g., POC) including the prediction block 2201 and the information in a temporal direction (i.e., prediction direction) for the picture that is used for the prediction to the decoder.

The decoder receives the difference Δ between the motion vector predictor and the motion vector value for each polygon unit in the current processing block, the picture index including the prediction block 2201, and the prediction direction. Furthermore, the decoder determines the prediction block 2201 of which rate-distortion cost has the minimum value among the candidate blocks that are available for the inter-prediction by using the picture index and the prediction direction, and determines the amount of displacement (i.e., difference) of the position of the prediction block 2201 as the motion vector predictor based on the position of the current processing block 2202. Furthermore, the decoder derives the motion vector value for each polygon unit of the current processing block 2202 based on the received motion vector difference Δ for each polygon unit and the determined predictor.

Furthermore, the decoder decodes the current processing block in a unit of polygon unit by deriving the motion vectors of all polygon units within the current processing block.

As such, when the motion vector value is identically used as the motion vector predictor for the polygon unit in a unit of the processing block, a single motion vector predictor is enough per a single processing block, thereby the bit for indicating the motion vector predictor being saved.

In addition, the polygon unit partition structure of the current processing block is not dependent on the polygon unit partition structure of the prediction block. That is, the polygon unit partition structure of the current processing block may be independently determined according to the method described above regardless of the prediction block.

Table 13 exemplifies the decoding syntax for a motion vector prediction process of a polygon unit.

TABLE 13

| | Descriptor |
|---|---|
| if (cu_polygon_flag) { | |
| ...... | |
|     cu_polygon_mv_x | ae(v) |
|     cu_polygon_mv_y | ae(v) |
|     for(i = 0;i < 8;i++) { | |
|         polygon_mv_x_off[ i ] | ae(v) |
|         polygon_mv_y_off[ i ] | ae(v) |
|     } | |
|     for(i = 0;i < 8;i++) { | |
|         polygon_mv_x[ i ] = cu_polygon_mv_x + polygon_mv_x_off[ i ] | |
|         polygon_mv_y[ i ] = cu_polygon_mv_y + polygon_mv_y_off[ i ] | |
|     } | |
| ...... | |
| } | |

In Table 13, 'cu_polygon_mv_x' and 'cu_polygon_mv_y' mean the motion vectors for all CU (i.e., processing block). That is, as described above, the motion vector of the processing block corresponds to the motion vector predictor for each polygon unit.

Furthermore, 'polygon_mv_x_off[i]' and 'polygon_mv_y_off[i]' represent the difference Δ between the motion vector predictor and the motion vector values for each polygon unit in the current CU.

'polygon_mv_x[i]' and 'polygon_mv_y[i]' represent the motion vector values for each polygon unit within the current CU.

The motion vector values for each polygon unit within the current CU is derived by summing a single predictor (i.e., 'cu_polygon_mv_x' and 'cu_polygon_mv_y') and the difference (i.e., 'polygon_mv_x_off[i]' and 'polygon_mv_y_off[i]') for each of the corresponding polygon unit.

In Table 12, by assuming that eight polygon units (R1~R8) are constructed to maximum for a single CU, for loop made up of eight repetition is performed. However, this is just an example, a single CU may include the fewer number of polygon units when adjacent polygon units are merged, as exemplified in FIG. 8 above. In this case, for loop may be performed, that is repeated as many as the number of polygon units that construct the corresponding CU.

In the embodiment described above, the motion vector predictor for the polygon unit is determined in the same way in a unit of processing block, but the motion vector predictor may be independently determined for each polygon unit in the processing block. This will be described by reference to the following drawing.

Figure 23:
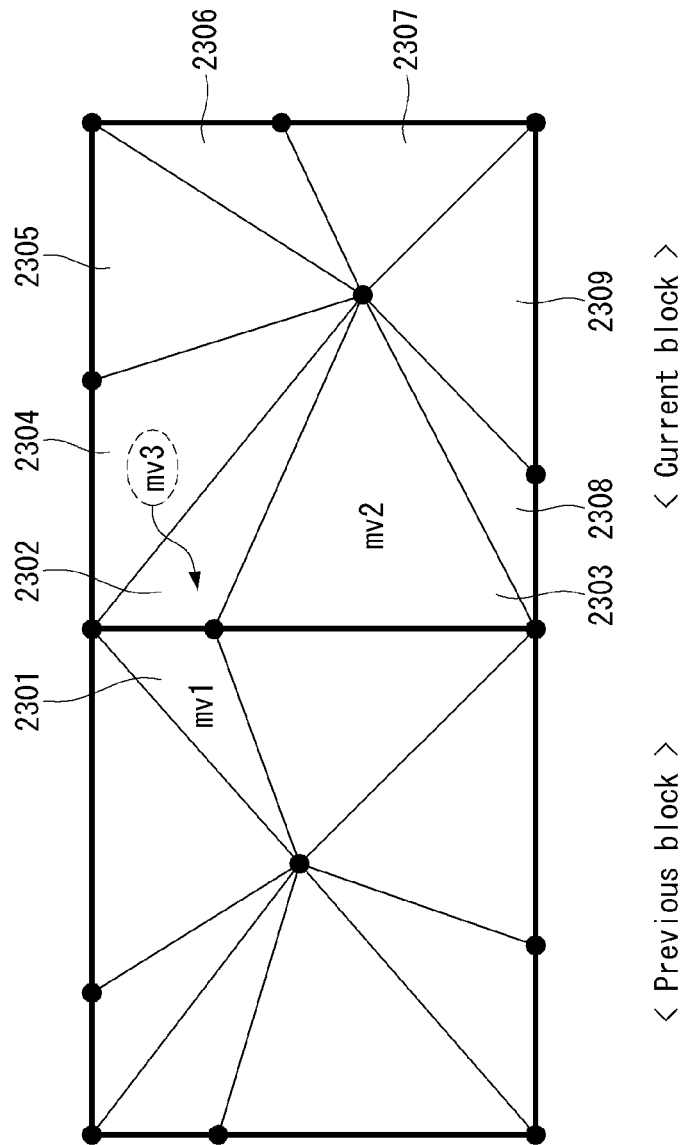
FIG. 23 is a diagram illustrating a prediction method of a motion vector of a polygon unit according to an embodiment of the present invention.

FIG. 23 is a diagram illustrating a prediction method of a motion vector of a polygon unit according to an embodiment of the present invention.

In order to predict the motion vector for each polygon unit within a current processing block, the motion vector of an adjacent polygon unit that is already coded is used. Herein, the polygon unit that is already coded may be included in the current processing block, or included in the processing block adjacent to the current processing block.

First, when a side of the polygon unit contacts (or overlaps) the left or upper side of the current processing block, in order to derive the motion vector of the corresponding polygon unit, the motion vector of the polygon unit within the adjacent processing block may be used as a predictor.

Furthermore, any one side of the polygon unit does not contact (or overlap) the left or upper side of the current processing block, in order to derive the motion vector of the corresponding polygon unit, the motion vector of the adjacent polygon unit within the current processing block may be used as a predictor.

Referring to FIG. 23, for the polygon units 2302, 2303, 2304 and 2305 that contact the left side (or upper side) of the processing block among the polygon units within the current processing block, the encoder determines the motion vector value of the adjacent polygon unit within the processing block adjacent to the left side (or upper side) as a predictor. For example, the motion vector value of the adjacent polygon unit 2301 within the adjacent processing block may be determined to be the motion vector predictor for the polygon unit 2302.

In addition, for the polygon units 2306, 2307, 2308 and 2309 that do not contact the left side (or upper side) of the processing block among the polygon units within the current processing block, the encoder determines the motion vector value of the adjacent polygon unit within the processing block adjacent as a predictor.

Further, when there is the adjacent polygon unit which is already coded within the current processing block according to a coding order among the polygon units 2302, 2303, 2304 and 2305 that contact the left or upper side of the processing block, the motion vector of the adjacent polygon unit within the current processing block may be used as a predictor. Likewise, when there is the adjacent polygon unit which is already coded according to a coding order among the remaining polygon units 2306, 2307, 2308 and 2309 that do not contact the left or upper side of the processing block, the motion vector of the adjacent polygon unit may be used as a predictor.

For example, assuming the case that the polygon unit 2302 is coded after the polygon unit 2304 is coded, in order to derive the motion vector predictor of the polygon unit 2302, the motion vector of the polygon unit 2301 within the adjacent processing block or the polygon unit 2304 within the current processing block may be used.

That is, the encoder configures the motion vectors of the adjacent polygon unit within the adjacent processing block for each polygon unit or within the current processing block as prediction candidates, and by selecting one among these, derives the motion vector predictor. In addition, the prediction candidates may also be generated again from the processing blocks that are collocated in the same position within a picture.

As such, when there is a plurality of prediction candidates that are available since there is a plurality of polygon units adjacent to the polygon unit, the motion vector for the polygon unit adjacent to the longest side of the current polygon unit may be selected as the predictor. That is, in the above example, the polygon unit 2302 may use both of the motion vector of the polygon unit 2301 within the adjacent processing block and the motion vector of the polygon unit 2304 within the current processing block, but may select the motion vector of the polygon unit 2304 adjacent to the longest side of the current polygon unit 2302 as the predictor.

Furthermore, the encoder transmits the difference Δ between the determined motion vector predictor and the motion vector of the polygon unit within the current processing block, and the index of the polygon unit that is selected to derive the motion vector predictor to the decoder.

The decoder receives the difference Δ between the motion vector and the motion vector predictor for each polygon unit within the current processing block, and the index of the polygon unit that is selected to derive the motion vector predictor from the encoder. Furthermore, using the index of the polygon unit, the decoder determines the motion vector of the polygon unit that is indicated by the corresponding index as the motion vector predictor. Furthermore, the decoder derives the motion vector for each polygon unit of the current processing block based on the received motion vector difference Δ and the determined motion vector predictor.

Table 14 exemplifies the decoding syntax for a motion vector prediction process of a polygon unit.

TABLE 14

| | Descriptor |
|---|---|
| if (cu_polygon_flag) {<br>　......<br>　for(i = 0;i < 8;i++) {<br>　　polygon_mv_cand_idx[ i ］<br>　}<br>　if(merge_flag[ x0 ][ y0 ]) {<br>　　for(i = 0;i < 8;i++) {<br>　　　polygon_mv_x_off[ i ] = 0<br>　　　polygon_mv_y_off[ i ] = 0<br>　　}<br>　} else {<br>　　for(i = 0;i < 8;i++) {<br>　　　polygon_mv_x_off[ i ]<br>　　　polygon_mv_y_off[ i ]<br>　　}<br>　}<br>　for(i = 0;i < 8;i++) {<br>　　polygon_mv_x[ i ] =<br>　　polygon_mv_x_cand[ polygon_mv_cand_idx[ i ]<br>] + polygon_mv_x_off[ i ]<br>　　polygon_mv_y[ i ] = polygon_mv_y_cand[<br>　　polygon_mv_cand_idx[ i ]<br>] + polygon_mv_y_off[ i ]<br>　}<br>　......<br>} | <br><br><br>ae(v)<br><br><br><br><br><br><br><br><br><br><br>ae(v)<br>ae(v) |

In table 14, 'polygon_mv_cand_idx[i]' indicates the index of a polygon unit that has been selected to determine a motion vector predictor for each polygon unit within a CU (i.e., a processing block). Furthermore, 'polygon_mv_x_cand[ ]' and 'polygon_mv_y_cand[ ]' indicate motion vector predictor candidates which are available within a neighbor processing block or a current processing block.

'polygon_mv_x_off[i]' and 'polygon_mv_y_off[i]' represent the differences Δ between the motion vector for each polygon unit within the current CU and the motion vector predictor.

Furthermore, 'polygon_mv_x[I]' and 'polygon_mv_y[i]' represent the motion vector values for each polygon unit within the current CU.

When 'merge_flag[x0][y0]' is '1', the motion vector differences of all polygon units are set to 0, and when 'merge_flag[x0][y0]' is '0', the motion vector difference is configured for each polygon unit. That is, the encoder transmits the motion vector difference to the decoder for each polygon unit.

The motion vector values for each polygon unit within the current CU is derived by summing the motion vector predictor (i.e., 'polygon_mv_x_cand[ ]' and 'polygon_mv_y_cand[ ]') for the corresponding polygon unit and the difference (i.e., 'polygon_mv_x_off[i]' and 'polygon_mv_y_off [i]').

In Table 14, by assuming that eight polygon units (R1~R8) are constructed to maximum for a single CU, for loop made up of eight repetition is performed. However, this is just an example, a single CU may include the fewer number of polygon units when adjacent polygon units are merged, as exemplified in FIG. 8 above. In this case, for loop may be performed, that is repeated as many as the number of polygon units that construct the corresponding CU.

Figure 24:
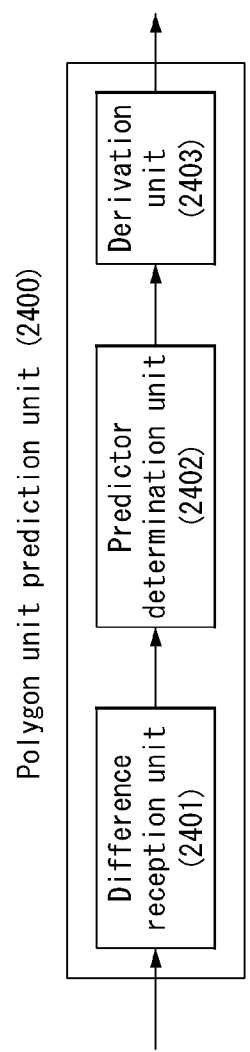
FIG. 24 illustrates a schematic inner block diagram of a polygon unit prediction unit that performs a prediction for a polygon unit according to an embodiment of the present invention.

FIG. 24 illustrates a schematic inner block diagram of a polygon unit prediction unit that performs a prediction for a polygon unit according to an embodiment of the present invention.

Referring to FIG. 24, a polygon unit prediction unit 2400 implements the function, process and/or method proposed in FIG. 15 to FIG. 23 above. Specifically, the polygon unit prediction unit 2400 may include a difference reception unit 2401, a predictor determination unit 2402 and a derivation unit 2403. Herein, the difference reception unit 2401 and the derivation unit 2403 may correspond to the add unit 235 in FIG. 2, and the predictor determination unit 2402 may correspond to the prediction unit 260.

The difference reception unit 2401 receives the vertex of the polygon unit of the processing block being now decoded or the difference for a motion vector.

The predictor determination unit 2402 determines the predictor for the vertex of the polygon unit of the processing block being now decoded or the motion vector predictor. The predictor determination unit 2402 may determine the predictor for the vertex of the polygon unit of the processing block being now decoded or the motion vector predictor from an adjacent processing block that is previously decoded or the other picture in a temporal direction.

The derivation unit 2403 may derive the vertex position of the polygon unit of the processing block being now decoded based on the difference and the predictor for the vertex of the polygon unit of the processing block being now decoded. In addition, the derivation unit 2403 may derive the motion vector of the polygon unit of the processing block being now decoded based on the motion vector difference and the motion vector predictor of the polygon unit of processing block being now decoded.

Hereinafter, the present invention proposes a method of predicting motion information of a polygon vertex.

In the description of the present invention, a motion vector denotes a multi-dimensional vector (e.g., two-dimension or three-dimension) used for inter-prediction. A motion vector provides the offset of coordinates within a reference picture from coordinates within a picture that is decoded.

A motion vector may be indicated by each motion vector component for an x axis (horizontal direction) and a y axis (vertical direction) that form an xy plane. Hereinafter, the motion vector collectively refers to each motion vector component for the x axis (horizontal direction) and the y axis (vertical direction). Furthermore, a motion vector predictor and a motion vector difference likewise collectively refer to each component for the x axis (horizontal direction) and the y axis (vertical direction).

Furthermore, in this specification, a 'polygon vertex' belonging to a processing block' collectively refers to a polygon vertex corresponding to a corner of a processing block, one or more vertexes located in the respective sides of a processing block, and one or more vertexes located within a processing block.

Hereinafter, in describing an embodiment of the present invention, for convenience of description, the terms of a coding unit (CU) (or coding block), a prediction unit (PU) (or prediction block) and a transform unit (TU) (or transform block) are described, but this is only an example and the present invention is not limited thereto. That is, as described above, a coding unit/prediction unit/transform unit may be replaced with a processing unit (or processing block) having a specific size or form.

A) Motion Information Prediction Method for Each Polygon Vertex

Figure 25:
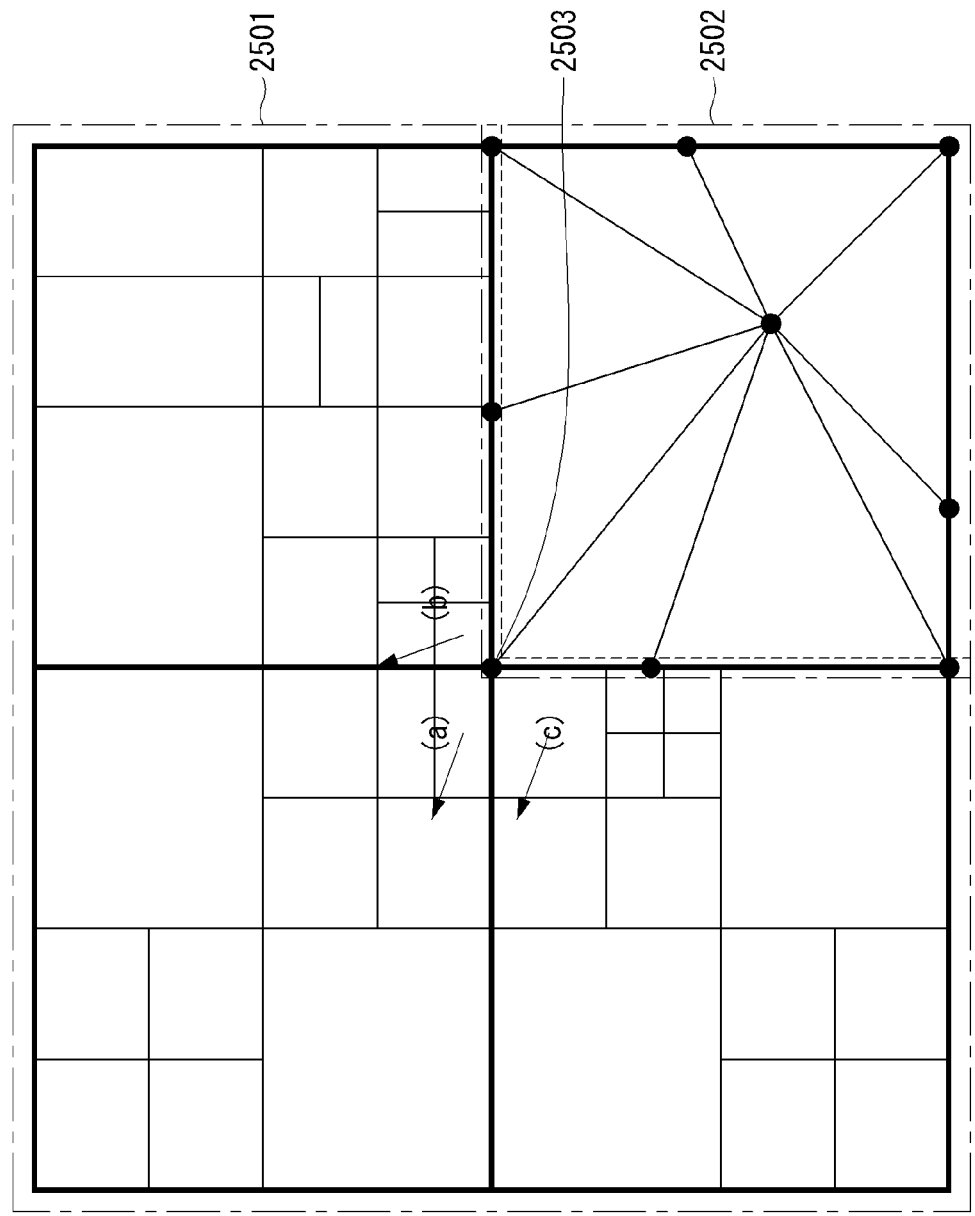
FIG. 25 is a diagram illustrating a method of predicting a motion vector for a vertex of a polygon unit according to an embodiment of the present invention.

FIG. 25 is a diagram illustrating a method of predicting a motion vector for a vertex of a polygon unit according to an embodiment of the present invention.

If the motion vector of neighbor blocks are available with respect to a specific one vertex of a polygon unit (or polygon partition block), a prediction motion vector may be derived using the motion vectors of neighbor blocks.

In this case, a block neighboring the vertex of a polygon means a block formed of a side or point to which the corresponding polygon vertex belongs. In the example of FIG. 25, a block (a), a block (b) and a block (c) correspond to blocks neighboring the top-left vertex 2501 of a block configured in a polygon unit.

Referring to FIG. 25, there is shown an example in which a current processing block is a processing block 2502 (hereinafter referred to as a 'polygon processing block') consisting of polygon units and a surrounding processing block is a processing block 2501 (hereinafter referred to as a 'quad-tree processing block') determined by quad-tree partition as in HEVC.

In this case, the motion vector (shown by arrows in FIG. 25) of PUs (or neighboring PUs neighboring the vertex of a polygon unit) ((a), (b) and (c) in FIG. 25) belonging to the processing block neighboring the vertex of the polygon unit becomes a candidate for calculating the motion vector of a vertex predictor of a polygon unit (in the case of FIG. 25, a motion vector predictor for the top-left vertex 2503 of a current polygon CU).

The motion vector predictor of a corresponding vertex may be derived based on a candidate list of motion vector predictors configured using the above method. For example, the motion vector predictor of a corresponding vertex may be determined based on motion vector predictor index information indicative of a specific motion vector predictor of a candidate list of motion vector predictors. In this case, the encoder may code the motion vector predictor index information and provide the decoder with the coded motion vector predictor index information. For another example, a corresponding motion vector predictor for a polygon vertex may be determined to be an average value or median of candidate values belonging to a candidate list of motion vector predictors. For another example, a corresponding motion vector predictor for a polygon vertex may be determined by applying a weighted sum or weighted average (e.g., based on the distance between the vertex of a current polygon unit and the center of surrounding PUs belonging to the candidate list, etc.) to candidate values belonging to the candidate list of the motion vector predictors.

A motion vector may be independently determined for each of three vertexes that form one polygon unit using the above method. In this case, a motion compensation process of a polygon unit is described below with reference to the following figure.

Figure 26:
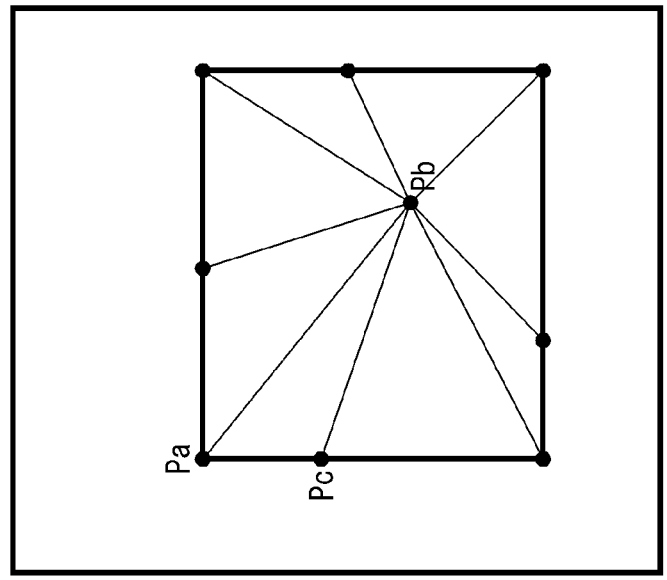
FIG. 26 is a diagram for illustrating a motion compensation process of a polygon unit according to an embodiment of the present invention.
Figure 26:
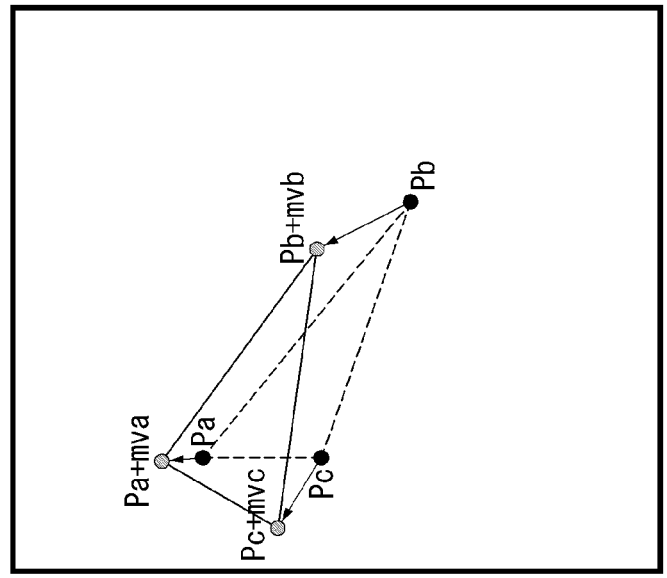

FIG. 26 is a diagram for illustrating a motion compensation process of a polygon unit according to an embodiment of the present invention.

As in FIG. 26, if a motion vector is determined for each of the three vertexes of one polygon unit (or polygon partition block) (P_a: P_a+mv_a, P_b: P_b+mv_b, and P_c: P_c+mv_c), the corresponding polygon unit corresponds to one partition block warped in a reference frame (or reference picture).

In this case, since the shape of the corresponding polygon unit and the shape of a partition block corresponding to the corresponding polygon unit are different, a corresponding sample value is fetched by searching the location of a sample for a corresponding reference frame for each pixel (or sample) through affine transform in a motion compensation process.

The affine transform is determined through three vertexes pairs between a current polygon unit and a corresponding partition block of the reference frame.

Equation 1 illustrates an affine transform equation.

$$u = a + bx + cy$$
$$v = d + ex + fy \qquad \text{[Equation 1]}$$

In Equation 1, if <(x, y), (u, v)> is a vertex pair (e.g., p_a corresponds to (x, y), and p_a+mv_a corresponds to (u, v) in FIG. 26), a total of six equations are derived through the three vertex pairs. Accordingly, six unknown quantities (i.e., 6 vertex coordinates) can be calculated through a linear equation.

As described above, a prediction sample within a polygon unit is derived from a sample value within a corresponding partition unit calculated based on Equation 1. That is, a prediction unit for a corresponding polygon unit is generated as a corresponding sample value within a partition unit.

B. Simple Polygon Unit and Complex Polygon Unit

Figure 27:
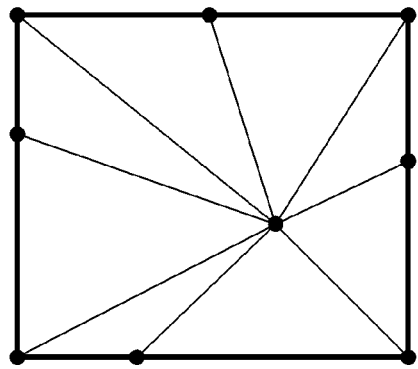
FIG. 27 is a diagram illustrating a method of partitioning a polygon unit according to an embodiment of the present invention.
Figure 27:
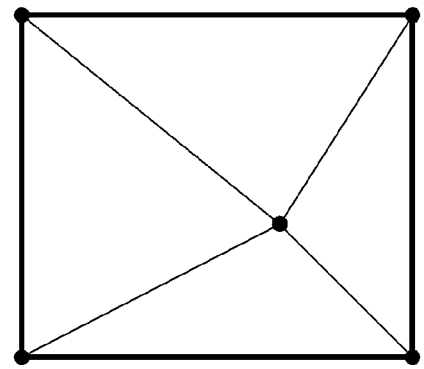
Figure 27:
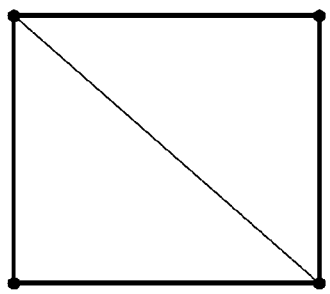
Figure 27:
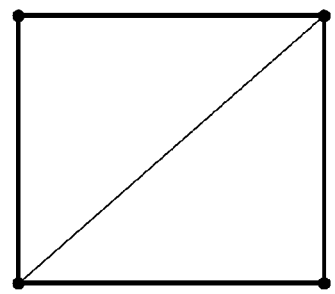
Figure 27:
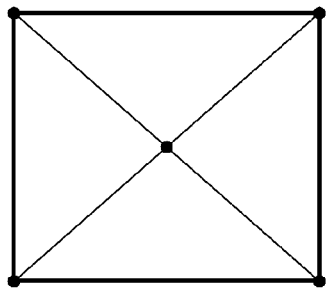
Figure 27:
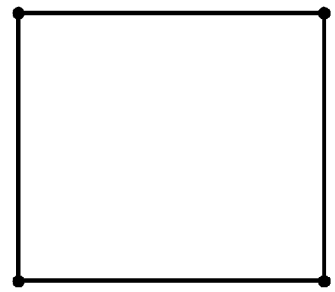

FIG. 27 is a diagram illustrating a method of partitioning a polygon unit according to an embodiment of the present invention.

As in FIG. 27(*a*), a polygon unit whose partition is determined from displacement for four points located at the respective sides of a processing block and one point within the processing block is referred to as a "complex polygon unit."

That is, a complex polygon unit means a polygon unit generated using four points located at the respective sides of a processing block, one point within the processing block, and the four vertexes of the processing block. A maximum of eight polygon units may be generated within one processing block.

As in FIG. 27(*b*), a polygon unit whose partition is determined based on only displacement for one point within a processing block is referred to as a "simple polygon unit."

As in the aforementioned partition method of a simple polygon unit and partition method of a complex polygon unit, a flag for identifying a polygon partition method may be defined. The encoder may code a flag for identifying a polygon partition method for each processing block and provide the coded flag to the decoder.

In this case, the decoder checks the flag for identifying a polygon partition method for each processing block, decodes location information for five polygon vertexes in the case of a complex polygon unit, but decodes location information for one polygon vertex in the case of a simple polygon unit.

Furthermore, a polygon partition method may be determined depending on the size of a processing block. For example, a complex polygon unit may be applied to a processing block having a size of a predetermined size or more, and a simple polygon unit may be applied to a processing block having a size less than a predetermined size. In this case, there is an advantage in that the encoder does not need to code information about a polygon partition method for each processing block and to provide the coded information to the decoder.

In this case, the decoder checks a size for each processing block, decodes location information for five polygon vertexes in the case of a processing block having a large size (i.e., partition according to a complex polygon unit), but decodes location information for one polygon vertex in the case of a processing block having a small size (i.e., partition according to a simple polygon unit).

Furthermore, as in FIG. 27(c), a partition method of a simpler polygon unit is possible. In this case, since the location of each polygon vertex is fixed (or since the form of each polygon unit is fixed), location information for each polygon vertex may not need to be coded.

In this case, as in FIG. 13, Table 6 and Table 7, only partition type information of a polygon unit may be coded and provided to the decoder.

In the case of FIG. 27(a), a motion vector may be independently determined with respect to four points located at the respective sides of a processing block, one point within the processing block, and the four vertexes of the processing block. Furthermore, a prediction polygon unit may be generated using the aforementioned affine transform for each polygon unit.

In the case of FIG. 27(b), a motion vector may be independently determined with respect to an internal one point and the four vertexes of a processing block. Furthermore, a prediction polygon unit may be generated using the aforementioned affine transform for each polygon unit.

Furthermore, in the case of FIG. 27(c), a motion vector may be independently determined with respect to the four vertexes of a processing block. Furthermore, a prediction unit may be generated using the aforementioned affine transform.

C) Motion Vector Coding Order for Polygon Vertexes

Figure 28:
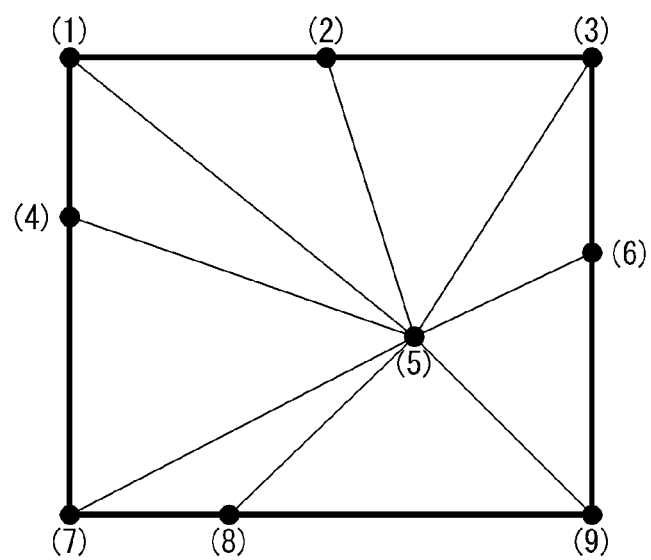
FIG. 28 is a diagram for illustrating the coding/decoding order of vertexes of a polygon unit according to an embodiment of the present invention.

FIG. 28 is a diagram for illustrating the coding/decoding order of vertexes of a polygon unit according to an embodiment of the present invention.

Assuming that polygon unit vertexes are configured as in FIG. 28, the coding order of motion vectors for each polygon unit vertex may be determined as below.

For convenience of description, the coding order of each polygon vertex is illustrated below, but the decoding order of each polygon vertex may be determined in the same manner as the coding order.

1) First, after a motion vector for four vertexes (vertexes (1), (3), (7) and (9) in FIG. 28) forming the corners of a processing block is coded, a motion vector for the remaining polygon vertexes may be coded.

For example, the coding of a motion vector for polygon vertexes (vertexes (2), (4), (6) and (8) in FIG. 28) located at the respective sides of the processing block and the coding of a motion vector for a polygon vertex (a vertex (5) in FIG. 28) located within the processing block internal may be performed on the remaining polygon vertexes. In this case, the polygon vertexes located at the respective sides of the processing block may be coded in a clockwise order (i.e., order of the vertexes (2), (6), (8) and (4)) or may be coded in a counterclockwise order (i.e., order of the vertexes (2), (4), (8) and (6)) or may be coded in a raster-scan order (i.e., order of the vertexes (2), (4), (6) and (8)).

For example, if motion vector prediction is performed on the polygon vertex (2), a motion vector value for the polygon vertexes (1) and (3) and a motion vector for a block (e.g., PU) neighboring the top of the corresponding polygon vertex (2) may be used for motion vector prediction for the corresponding polygon vertex (2). For example, a motion vector value for the neighbor polygon vertexes (1) and (3) and a motion vector value for a block (e.g., PU) neighboring the top of the corresponding polygon vertex (2) may be configured as a candidate list for deriving the motion vector predictor of the polygon vertex (2). Furthermore, a motion vector predictor for the corresponding polygon vertex (2) may be derived based on the candidate list of motion vector predictors configured as described above. For example, a motion vector predictor for the corresponding polygon vertex (2) may be determined based on motion vector predictor index information indicative of a specific candidate value of the candidate list of the motion vector predictors. In this case, the encoder may code the motion vector predictor index information and provide the coded motion vector predictor index information to the decoder. For another example, the motion vector predictor for the corresponding polygon vertex (2) may be determined to be an average value or median of candidate values belonging to the candidate list of the motion vector predictors. For another example, a motion vector predictor for the corresponding polygon vertex (2) may be determined by applying a weighted sum or weighted average (e.g., based on the distance between the vertex of a current polygon unit and a polygon vertex belonging to the candidate list or the center of surrounding PUs, etc.) to candidate values belonging to the candidate list of the motion vector predictors.

2) As in the order of the numbers of the polygon vertexes in FIG. 28, a motion vector for each polygon vertex may be coded according to a raster-scan order.

For example if a motion vector for the polygon vertex (5) is coded, the motion vectors of the polygon vertexes (1), (2), (3) and (4) may be used for motion vector prediction for the corresponding polygon vertex (5). For example, the motion vector values of the neighbor polygon vertexes (1), (2), (3) and (4) that have been first coded may be configured as a candidate list for deriving the motion vector predictor of the polygon vertex (5). Furthermore, the motion vector predictor of the corresponding polygon vertex (5) may be derived based on a candidate list of motion vector predictors configured as above. For example, the motion vector predictor of the corresponding polygon vertex (5) may be determined based on motion vector predictor index information indicative of a specific candidate value of the candidate list of the motion vector predictors. In this case, the encoder may code the motion vector predictor index information and provide the coded motion vector predictor index information to the decoder. For another example, the motion vector predictor of the corresponding polygon vertex (5) may be determined to be an average value or median of candidate values that belong to a candidate list of motion vector predictors belonging to a candidate for a motion vector predictor. For another example, the motion vector predictor of the corresponding polygon vertex (5) may be determined by applying a weighted sum or weighted average (e.g., based on the distance between the vertex of a current polygon unit and a polygon vertex belonging to the candidate list or the center of surrounding PUs, etc.) to candidate values belonging to the candidate list of the motion vector predictors.

As described above, the configuration of a candidate list of motion vector predictors may be different depending on the coding order of a motion vector for each polygon vertex. Accordingly, an optimum coding order may be selected depending on the availability of the motion vectors of surrounding blocks (e.g., PUs) neighboring a corresponding processing block or the configuration of a current polygon processing block (i.e., a partition form of a polygon unit). In this case, the encoder may code coding order information for a polygon vertex belonging to a corresponding processing block and provide the coded coding order information to the decoder.

D) Motion Vector Coding Method for all of Polygon Processing Blocks

After a representative motion vector for all of polygon processing blocks is coded, the difference of the representative motion vector may be coded with respect to the motion vector of each of polygon vertexes forming the polygon processing block (i.e., polygon vertexes belonging to the polygon processing block) may be coded. That is, a representative motion vector for a processing block may be used as a motion vector predictor for a polygon vertex belonging to the corresponding processing block.

Figure 29:
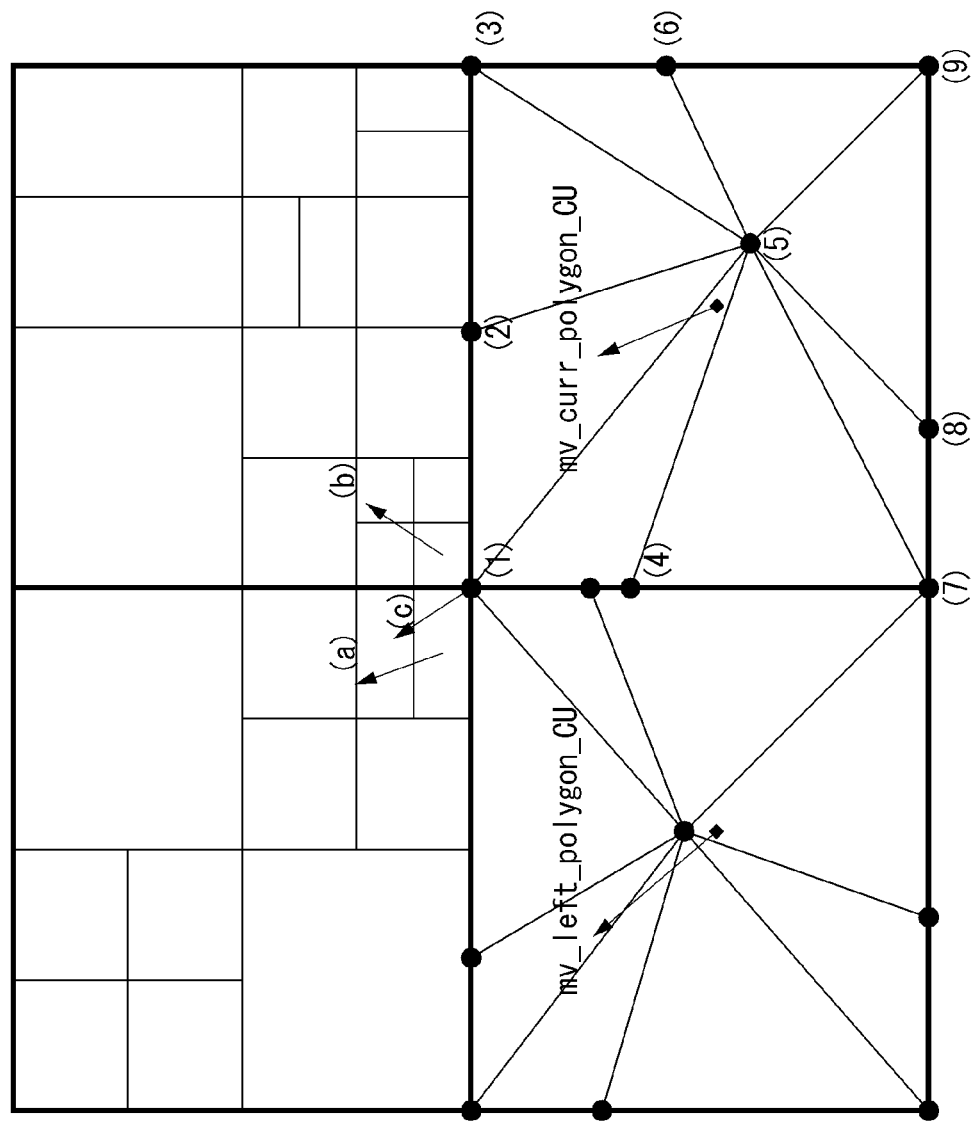
FIG. 29 is a diagram illustrating a method of predicting a motion vector for a vertex of a polygon unit according to an embodiment of the present invention.

FIG. 29 is a diagram illustrating a method of predicting a motion vector for a vertex of a polygon unit according to an embodiment of the present invention.

In FIG. 29, 'mv_curr_polygon_CU' indicates a representative motion vector for a processing block (e.g., CU) currently being coded, and only an offset from each 'mv_curr_polygon_CU' value may be coded with respect to vertexes from (1) to (9).

In this case, the representative motion vector may correspond to the motion vector of a specific polygon vertex belonging to the current processing block (e.g., a polygon vertex corresponding to the top-left vertex of the current processing block or a polygon vertex located within the current processing block), an average value or median of a motion vector for a polygon vertex belonging to the current processing block, etc., for example.

In this case, 1) the representative motion vector may be coded by applying an existing coding method, and 2) the representative motion vector may be coded using a predictor, such as the representative motion vector of a neighbor polygon processing block or 3) the representative motion vector may be coded using a predictor, such as the motion vector of a neighbor polygon vertex (i.e., the motion vector of a polygon vertex belonging to a neighbor polygon processing block) if a neighbor processing block (e.g., CU) is a polygon processing block.

For example, in the case of 1), a motion vector for a neighbor prediction unit (PU) (in the case of FIG. 29, prediction units (a) and (b)) may be used as a prediction candidate for mv_curr_polygon_CU prediction by applying a conventional motion vector prediction method. That is, a motion vector predictor candidate list for a representative motion vector of a current processing block may be configured as a motion vector for a neighbor prediction unit.

For another example, in the case of 2), a representative motion vector for a neighbor polygon processing block (in the case of FIG. 29, a motion vector 'mv_left_polygon_CU' for a neighbor processing block on the left of a current processing block) may be used as a prediction candidate for mv_curr_polygon_CU prediction. That is, a motion vector predictor candidate list for the representative motion vector of a current processing block may be configured as a representative motion vector for a neighbor polygon processing block.

Furthermore, in FIG. 29, the prediction units (a) and (b) may also form a motion vector candidate list together. That is, a motion vector predictor candidate list for the representative motion vector of a current processing block may be configured as a representative motion vector for a neighbor polygon processing block and a motion vector for a neighbor prediction unit.

For another example, in the case of 3), the motion vector ((c) in FIG. 29) of the top-left vertex of a current processing block may be used as a prediction candidate for mv_curr_polygon_CU prediction. The reason for this is that the motion vector (c) of the top-left vertex of the processing block has already been coded because it is a vertex belonging to a left polygon processing block. Accordingly, a motion vector predictor candidate list for the representative motion vector of the current processing block may be configured as the motion vector of a polygon vertex belonging to a neighbor polygon processing block.

The cases a), b) and c) have been divided and described, for convenience of description, but this is only an example. One or more of the prediction candidates described in a), b) and c) may be combined to form a motion vector predictor candidate list for the representative motion vector of a current processing block.

E) Motion Vector Coding Method for Vertex Located at Square Side

Figure 30:
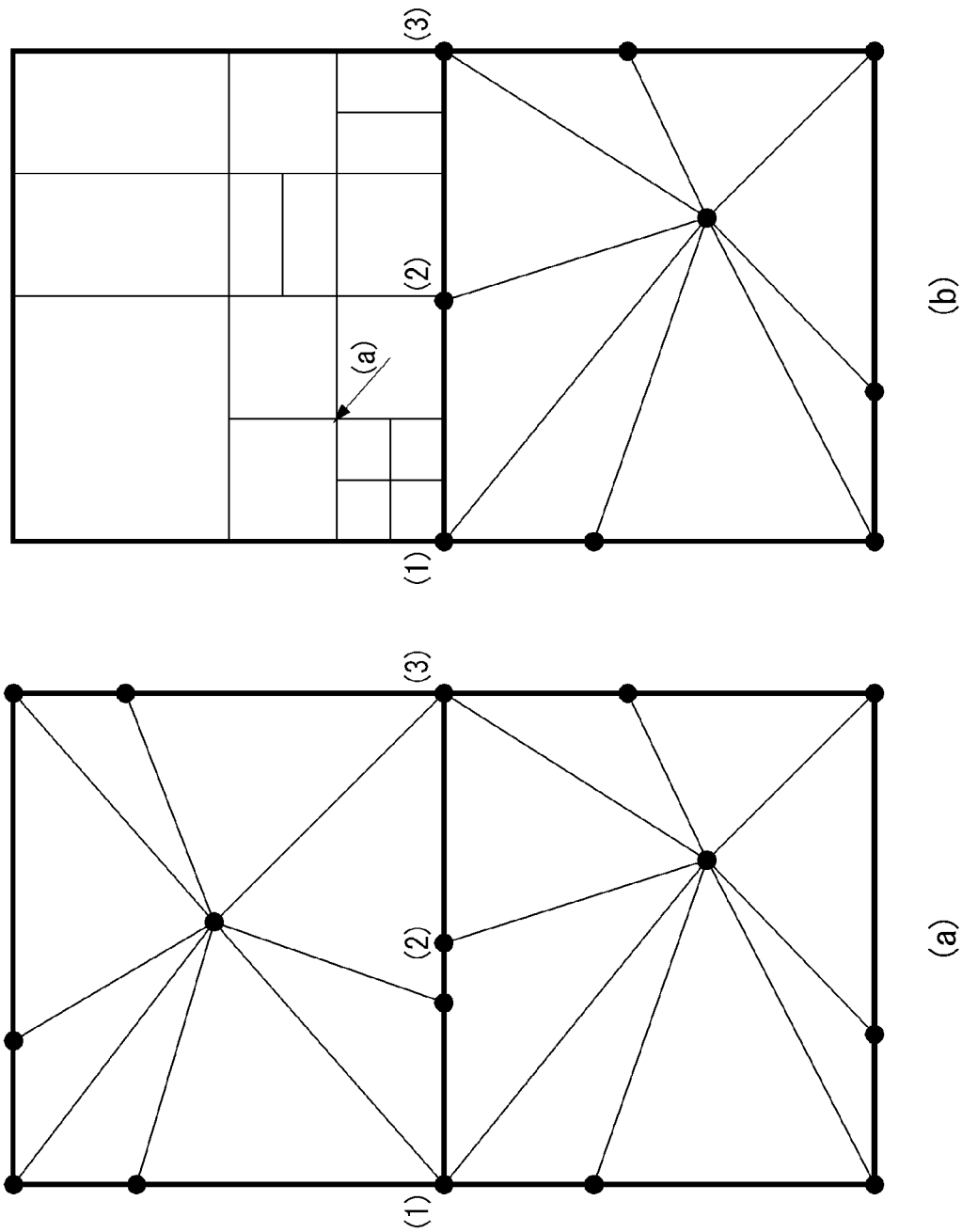
FIG. 30 is a diagram illustrating a method of predicting a motion vector for a vertex of a polygon unit according to an embodiment of the present invention.

FIG. 30 is a diagram illustrating a method of predicting a motion vector for a vertex of a polygon unit according to an embodiment of the present invention.

FIG. 30(*a*) illustrates a case where the motion vector of a polygon vertex located at a side neighboring a neighbor polygon processing block is predicted, and FIG. 30(*b*) illustrates a case where the motion vector of a polygon vertex located at a side neighboring a neighbor quad-tree processing block is predicted.

Referring to FIG. 30(*a*), the motion vector predictor of a corresponding polygon vertex (or motion vector predictor candidate list) may be derived as a motion vector (if available) for a polygon vertex neighboring the corresponding polygon vertex. In the case of FIG. 30(*a*), if a motion vector for a polygon vertex (2) is predicted, a motion vector predictor candidate list for the polygon vertex (2) may include the motion vectors of polygon vertexes (1) and (3) (if the motion vectors of the polygon vertexes (1) and (3) are available).

Furthermore, if the location of a corresponding polygon vertex has been determined, the motion vector predictor of the corresponding polygon vertex may be determined by interpolating the motion vectors of polygon vertexes that are close on both sides. In the case of FIG. 30(*a*), if the location of the polygon vertex (2) has been determined, a motion vector predictor for the polygon vertex (2) may be determined by interpolating the motion vectors of the polygon vertexes (1) and (3).

Furthermore, if the location of a corresponding polygon vertex has been determined, the motion vector of a polygon vertex that belongs to polygon vertexes belonging to a corresponding processing block and that is the closest to the corresponding polygon vertex may be determined to be the motion vector predictor of the corresponding polygon vertex. In the case of FIG. 30(*a*), if the location of the polygon vertex (2) has been determined, the motion vector of a polygon vertex (1) closest to the polygon vertex (2) may be determined to be a motion vector predictor for the polygon vertex (2).

Referring to FIG. 30(*b*), the motion vector predictor of a corresponding polygon vertex (or motion vector predictor candidate list) may be derived as a motion vector for a block (e.g., prediction block) neighboring the corresponding polygon vertex. In the case of FIG. 30(*b*), a motion vector predictor (or motion vector predictor candidate list) for the polygon vertex (2) may be derived as a motion vector (a) for an upper block neighboring the polygon vertex (2).

Furthermore, even in the case of FIG. 30(b), as in the example of FIG. 30(a), motion vectors for neighbor polygon vertexes (polygon vertexes (1) and (3)) may be considered to be motion vector candidates having the same status. That is, a motion vector predictor candidate list for a corresponding polygon vertex may be configured using a motion vector for a block neighboring the corresponding polygon vertex and a polygon vertex neighboring the corresponding polygon vertex.

F) Motion Vector Coding Method for Vertex at Center of (within) Polygon Processing Block A motion vector predictor for a corresponding polygon vertex may be determined by applying interpolation to the motion vectors of polygon vertexes corresponding to the four corners of a polygon processing block with respect to a vertex located in the center of (within) the polygon processing block. For example, referring back to FIG. 28, a motion vector predictor for the polygon vertex (5) may be determined by applying bilinear interpolation to the motion vectors of the polygon vertexes (1), (3), (7) and (9) corresponding to the four corners of the polygon processing block.

Furthermore, a motion vector predictor for a corresponding polygon vertex may be determined to be the motion vector of a polygon vertex located closest to a vertex located in the center of (within) a polygon processing block. Referring back to FIG. 28, the motion vector predictor of the polygon vertex (5) may be determined to be the motion vector of the polygon vertex (9) closest to the polygon vertex (5).

Figure 31:
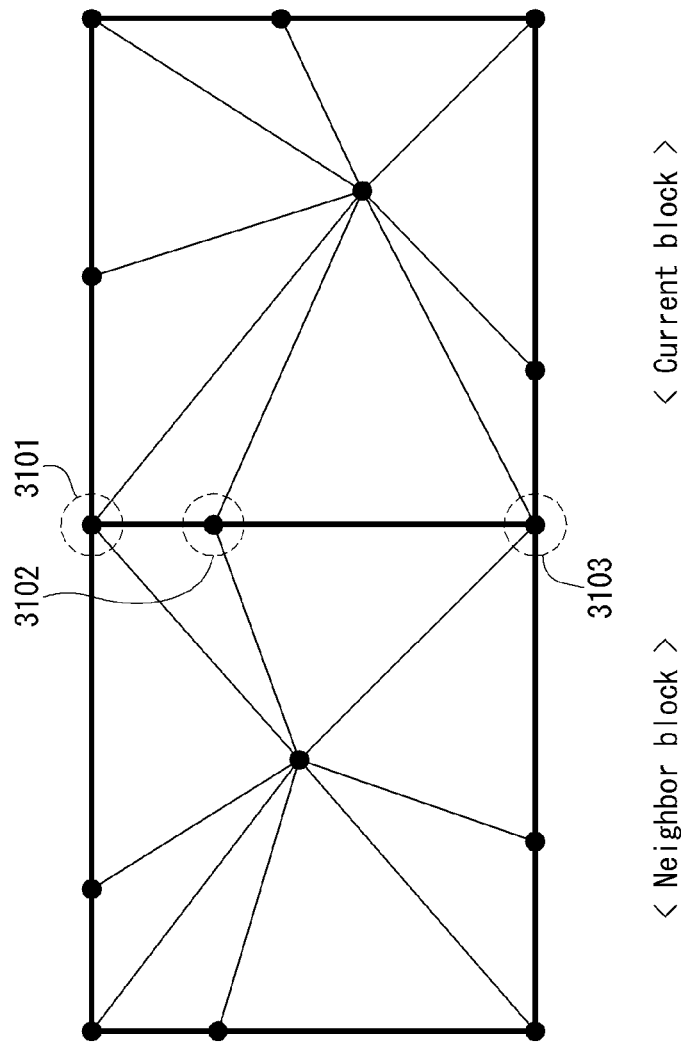
FIG. 31 is a diagram illustrating a method of predicting a motion vector for a vertex of a polygon unit according to an embodiment of the present invention.

G) Motion Vector Prediction Method if Surrounding (Neighbor) Processing Block is Polygon Processing Block FIG. 31 is a diagram illustrating a method of predicting a motion vector for a vertex of a polygon unit according to an embodiment of the present invention.

If a neighbor processing block is a polygon processing block, a motion vector value may be shared with respect to a neighbor vertex between neighbor processing blocks. For example, polygon vertexes corresponding to the four corners of a processing block can share a motion vector value because they have the same location (i.e., the coordinates of an x axis (horizontal direction) and/or a y axis (vertical direction) are the same) as vertexes corresponding to corners of a neighbor processing block. That is, the motion vectors of polygon vertexes (in the case of FIG. 31, polygon vertexes 3101 and 3103) corresponding to the corners of a current processing block may be determined to be the motion vectors of vertexes having the same location of a neighbor processing block.

Furthermore, the above is extended, and polygon vertexes that do not correspond to the corners of a processing block, but are located at sides neighboring a neighbor processing block may also share a motion vector value. That is, the motion vector of a polygon vertex located at a side neighboring a neighbor processing block may be determined to be the motion vector of a vertex of a neighbor processing block having the same location (in the case of FIG. 31, a polygon vertex 3102).

Furthermore, in the case of a polygon vertex that does not correspond to a corner of a processing block, but is located at a side neighboring a neighbor processing block, the motion vector predictor of the corresponding polygon vertex may be determined to be the motion vector of a polygon vertex located at a side neighboring the neighbor processing block (in the case of FIG. 31, the polygon vertex 3102). In this case, the encoder may code a corresponding motion vector difference so that it is signaled to the decoder.

However, polygon vertexes located at a side neighboring a neighbor processing block may not have the same location as the vertex of a neighbor processing block. Accordingly, the polygon vertexes may share a motion vector as described above only if they have the same location, or a motion vector predictor may be determined.

Furthermore, a motion vector predictor candidate list for a current polygon vertex may be configured using the motion vectors of polygon vertexes (e.g., polygon vertexes 3101 and 3103) of a current processing block neighboring a current polygon vertex (e.g., the polygon vertex 3102) and the vertexes of a neighbor processing block having the same location as the current polygon vertex by combining the methods described in E. In this case, a motion vector predictor for a corresponding polygon vertex may be derived based on the candidate list of the motion vector predictors configured as above. For example, a motion vector predictor for a corresponding polygon vertex may be determined based on motion vector predictor index information indicative of a specific candidate value of the candidate list of the motion vector predictors. In this case, the encoder may code the motion vector predictor index information and provide the coded motion vector predictor index information to the decoder. For another example, a motion vector predictor for a corresponding polygon vertex may be determined to be an average value or median of candidate values belonging to the candidate list of the motion vector predictors.

Figure 32:
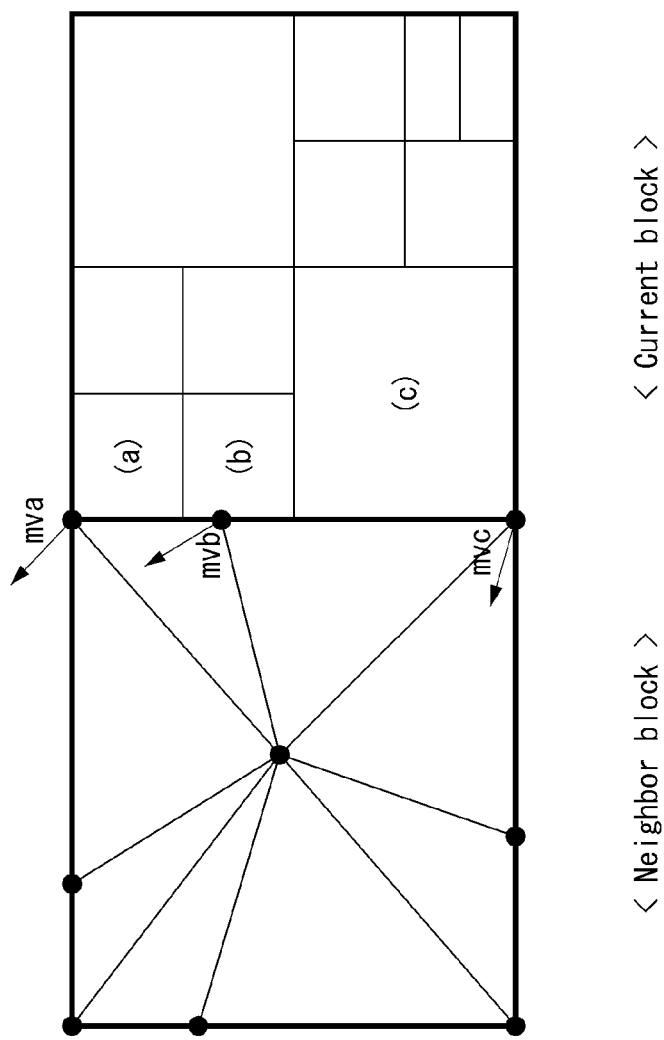
FIG. 32 is a diagram illustrating a method of predicting a motion vector of a quad-tree block according to an embodiment of the present invention.

H) Coding with Reference to Motion Vector of Polygon Processing Block in Quad-Tree Processing Block FIG. 32 is a diagram illustrating a method of predicting a the motion vector of a quad-tree block according to an embodiment of the present invention.

If a current processing block (e.g., CU or PU) is a quad-tree processing block and a processing block neighboring the current processing block is a polygon processing block, the motion vectors of vertexes neighboring a block currently being coded may be used as the motion vector predictor candidate of the current block.

In the case of FIG. 32, with respect to a block (a), the motion vector mva of a polygon vertex neighboring the block (a) may be used as a motion vector predictor candidate for the block (a). Likewise, with respect to a block (b) and a block (c), the motion vectors mvb and mvc of polygon vertexes neighboring the respective corresponding blocks may be used as a motion vector predictor candidate for the corresponding blocks.

Figure 33:
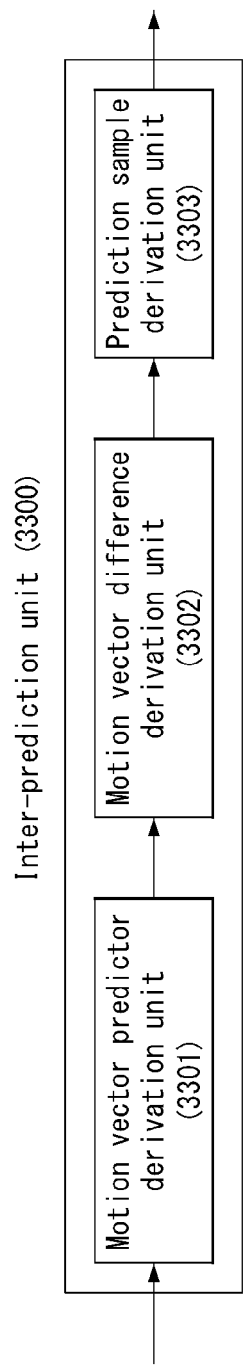
FIG. 33 is a diagram illustrating an inter-prediction unit performing coding/decoding based on a polygon unit according to an embodiment of the present invention.

FIG. 33 is a diagram illustrating the inter-prediction unit performing coding/decoding based on a polygon unit according to an embodiment of the present invention.

Referring to FIG. 33, the inter-prediction unit (181: refer to FIGS. 1 and 261: refer to FIG. 2) implements the functions, processes and/or methods proposed in FIGS. 5 to 32. Specifically, the inter-prediction unit 181, 261 may be configured to include a motion vector predictor derivation unit 3301, a motion vector difference derivation unit 3302 and a prediction sample derivation unit 3303.

The motion vector predictor derivation unit 3301 derives a motion vector predictor for a polygon vertex that forms a polygon unit.

The motion vector predictor derivation unit 3301 may derive a motion vector predictor for each of polygon vertexes that form a corresponding polygon unit by combining the methods described in A) to H) or one or more of the methods described in A) to H).

For the motion vector prediction of a polygon vertex, if a motion vector predictor candidate list for a corresponding polygon vertex includes a plurality of candidates, a motion vector predictor for the corresponding polygon vertex may be derived based on the configured motion vector predictor candidate list. In this case, if any one of candidate values belonging to the motion vector predictor candidate list is selected, the motion vector predictor derivation unit 3301 belonging to the decoder may receive index information indicative of the selected candidate value from the encoder.

The motion vector difference derivation unit 3302 derives the motion vector of a corresponding polygon vertex based on a motion vector difference and motion vector predictor for the polygon vertex.

In this case, the motion vector difference derivation unit 3302 belonging to the decoder may receive a motion vector difference for each polygon vertex from the encoder.

For example, the motion vector difference derivation unit 3302 may derive a motion vector for a corresponding polygon vertex by adding a motion vector difference for a polygon vertex and a motion vector predictor for the corresponding polygon vertex.

The prediction sample derivation unit 3303 derives the prediction sample (or pixel value) of a corresponding polygon unit from a partition unit specified by a motion vector within a reference picture (S3303).

In this case, the prediction sample derivation unit 3303 belonging to the decoder may receive information for specifying the reference picture from the encoder.

The prediction sample derivation unit 3303 may specify a corresponding partition unit within a reference picture using the motion vector of each of polygon vertexes that form a corresponding polygon unit using the method described in A). Furthermore, the prediction sample derivation unit 3303 may specify the prediction sample (or pixel value) of the polygon unit from a sample value within the corresponding partition unit. That is, the pixel value or interpolated value of a partition unit (i.e., reference region) specified by a motion vector within a reference picture may be used as the prediction sample of a polygon unit (or pixel value).

In this case, as in the description of FIG. 26, if the motion vector of each of the three vertexes of one polygon unit is determined, a prediction sample for samples belonging to a corresponding polygon unit may be derived from a sample value within a corresponding partition unit using affine transform. That is, the pixel value of a reference region derived through affine transform may be used as the prediction sample of a polygon unit (or pixel value).

Figure 34:
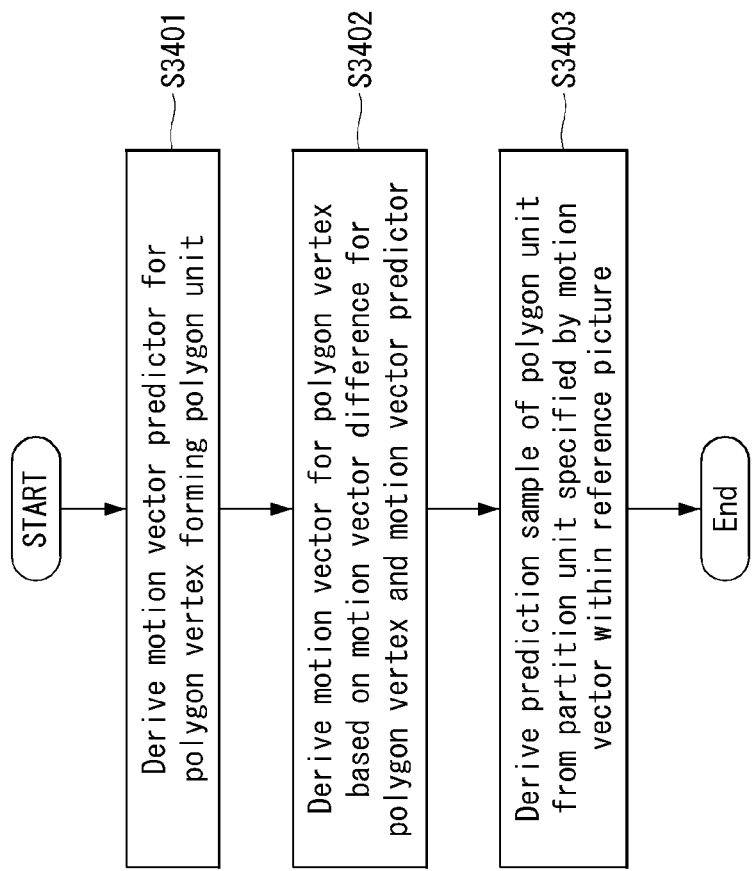
FIG. 34 is a diagram illustrating a method of decoding an image based on a polygon unit according to an embodiment of the present invention.

FIG. 34 is a diagram illustrating a method of decoding an image based on a polygon unit according to an embodiment of the present invention.

Referring to FIG. 34, the encoder/decoder derives the motion vector predictor for a polygon vertex that forms a polygon unit (S3401).

In this case, the encoder/decoder may derive a motion vector predictor for each polygon vertex that forms a corresponding polygon unit by combining the methods described in A) to H) or one or more of the methods described in A) to H).

For the motion vector prediction of a polygon vertex, if a motion vector predictor candidate list for a corresponding polygon vertex includes a plurality of candidates, a motion vector predictor for the corresponding polygon vertex may be derived based on the configured motion vector predictor candidate list. In this case, if any one of candidate values belonging to the motion vector predictor candidate list is selected, the decoder may receive index information indicative of the selected candidate value from the encoder.

The encoder/decoder derives a motion vector for the corresponding polygon vertex based on a motion vector difference for the polygon vertex and the motion vector predictor derived at step S3401 (S3402).

In this case, the decoder may be provided with a motion vector difference for each polygon vertex from the encoder.

For example, the encoder/decoder may derive a motion vector for a corresponding polygon vertex by adding the motion vector difference for the polygon vertex and the motion vector predictor for the corresponding polygon vertex derived at step S3401.

The encoder/decoder derives the prediction sample (or pixel value) of a corresponding polygon unit from a partition unit specified by a motion vector within a reference picture (S3403).

In this case, the decoder may be provided with information for specifying the reference picture from the encoder.

The encoder/decoder may specify a corresponding partition unit using a motion vector for each polygon vertex that forms a corresponding polygon unit using the method described in A). That is, the pixel value or interpolated value of a partition unit (i.e., reference region) specified by the motion vector within the reference picture may be used as the prediction sample of the polygon unit (or pixel value).

In this case, as in the description of FIG. 26, if the motion vector of each of the three vertexes of one polygon unit is determined, a prediction sample for samples belonging to the corresponding polygon unit may be derived from the sample value of the corresponding partition unit for each pixel (or sample) of the polygon unit using affine transform. That is, the pixel value of a reference region derived through affine transform may be used as the prediction sample of the polygon unit (or pixel value).

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

The aforementioned embodiments of the present invention have been disclosed for illustrative purposes, and those skilled in the art may improve, change, substitute, or add various other embodiments without departing from the technological spirit and scope of the present invention disclosed in the attached claims.

The invention claimed is:

1. A method of decoding an image by a decoder based on a polygon unit, the method comprising:
   determining an inner vertex position of an inner vertex located within a current block that constructs the image and a side vertex position of a side vertex located at a side of the current block, wherein the inner vertex position represents a position shared by all the polygon units partitioned from the current block;
   deriving a motion vector predictor for the inner vertex and the side vertex forming a first polygon unit from a motion vector from the current block,
   wherein the first polygon unit is partitioned from the current block;
   deriving a motion vector of the inner vertex and the side vertex based on a motion vector difference for the inner vertex and the side vertex, and the motion vector predictor; and
   deriving a prediction sample of the first polygon unit from a partition unit specified by the motion vector within a reference picture,
   wherein the prediction sample is determined to be a corresponding sample value within the partition unit using affine transform,
   wherein the side vertex position is determined based on (i) position information representing a position predictor of a vertex of a second polygon unit, and (ii) a difference value between the position predictor and the side vertex position of the first polygon unit,
   wherein the position information and the difference value are transmitted from an encoder to the decoder,
   wherein the position predictor is a point having the smallest in difference of a displacement absolute value with the side vertex position, among a plurality of vertexes of a neighboring block which is adjacent to the current block,
   wherein the plurality of the vertexes of the neighboring blocks are located at the side shared by the current block and the neighboring block.

2. The method of claim 1, wherein:
   a candidate list of the motion vector predictor comprises a motion vector of a block neighboring the side vertex and/or a motion vector of a polygon vertex neighboring the side vertex, and
   the motion vector predictor is derived from the candidate list of the motion vector predictor.

3. The method of claim 2, wherein the candidate list of the motion vector predictor is configured based on a decoding order of a polygon vertex forming the first polygon unit.

4. The method of claim 1, wherein after a motion vector for four vertexes corresponding to corners of the current block comprising the polygon unit is derived, a motion vector for remaining polygon vertexes of the current block is derived.

5. The method of claim 1, wherein a motion vector of a polygon vertex of the current block comprising the first polygon unit is derived based on a raster-scan order.

6. The method of claim 1, wherein:
   a representative motion vector of the current block comprising the polygon unit is derived, and
   the motion vector predictor is derived from the representative motion vector.

7. The method of claim 1, wherein the motion vector predictor is determined by interpolating motion vectors of a plurality of polygon vertexes close to the inner vertex or determined to be a motion vector of a polygon vertex closest to the inner vertex.

8. The method of claim 1, wherein a motion vector predictor for a polygon vertex located within the current block comprising the polygon unit is determined by interpolating motion vectors of four vertexes corresponding to corners of the current block or determined to be a motion vector of a polygon vertex closest to the polygon vertex.

9. The method of claim 1, wherein the motion vector predictor is derived from a motion vector of a vertex having a location identical with a location of the vertex in a block neighboring the current block.

10. An apparatus of a decoder for decoding an image based on a polygon unit, the apparatus comprising:
    a memory; and
    a processor coupled to the memory, and configured to:
    determine an inner vertex position of an inner vertex located within a current block that constructs the image and a side vertex position of a side vertex located at a side of the current block, wherein the inner vertex position represents a position of a vertex shared by all the polygon units partitioned from the current block;
    derive a motion vector predictor for the inner vertex and the side vertex forming a first polygon unit from a motion vector from the current block,
    wherein the first polygon unit is partitioned from the current block;
    derive a motion vector of the inner vertex and the side vertex based on a motion vector difference for the inner vertex and the side vertex, and the motion vector predictor; and
    derive a prediction sample of the first polygon unit from a partition unit specified by the motion vector within a reference picture,
    wherein the prediction sample is determined to be a corresponding sample value within the partition unit using affine transform,
    wherein the side vertex position is determined based on (i) position information representing a position predictor of a vertex of a second polygon unit, and (ii) a difference value between the position predictor and the side vertex position of the first polygon unit,
    wherein the position information and the difference value are transmitted from an encoder to the decoder,
    wherein the position predictor is a point having the smallest in difference of a displacement absolute value with the side vertex position, among a plurality of vertexes of a neighboring block which is adjacent to the current block, wherein the plurality of the vertexes of the neighboring blocks are located at the side shared by the current block and the neighboring block.

\* \* \* \* \*